(12) United States Patent
Honda

(10) Patent No.: US 8,769,974 B2
(45) Date of Patent: Jul. 8, 2014

(54) HEAT PUMP SYSTEM

(75) Inventor: Masahiro Honda, Oostende (BE)

(73) Assignee: Daikin Industries, Ltd., Osaka (JP)

( * ) Notice: Subject to any disclaimer, the term of this patent is extended or adjusted under 35 U.S.C. 154(b) by 498 days.

(21) Appl. No.: 13/202,608

(22) PCT Filed: Feb. 23, 2010

(86) PCT No.: PCT/JP2010/001179
§ 371 (c)(1),
(2), (4) Date: Aug. 22, 2011

(87) PCT Pub. No.: WO2010/098069
PCT Pub. Date: Sep. 2, 2010

(65) Prior Publication Data
US 2011/0302948 A1    Dec. 15, 2011

(30) Foreign Application Priority Data

Feb. 24, 2009   (JP) ................................ 2009-040892

(51) Int. Cl.
*F25B 7/00*     (2006.01)
*F25B 13/00*    (2006.01)
*F25B 41/04*    (2006.01)

(52) U.S. Cl.
USPC .................... 62/160; 62/175; 62/222; 62/225

(58) Field of Classification Search
CPC ............ F25B 1/00; F25B 13/00; F25B 17/02;
F25B 29/003; F25B 30/02; F25B 2313/004;
F25B 2313/027; F25B 2400/06; F25B
2400/075; F25B 2600/111; F25B 2600/25;
F25B 2700/172; F25D 2600/13
USPC .......... 62/159, 160, 175, 183, 185, 201, 222, 62/225
See application file for complete search history.

(56) References Cited

U.S. PATENT DOCUMENTS 8,015,836 B2 *   9/2011   Kameyama et al. ............ 62/335
2007/0199337 A1   8/2007   Otake et al.

FOREIGN PATENT DOCUMENTS

JP         60-48468  A    3/1985
JP         60-164157 A    8/1985
(Continued)

OTHER PUBLICATIONS

International Search Report of corresponding PCT Application No. PCT/JP2010/001179.

(Continued)

*Primary Examiner* — Marc Norman
(74) *Attorney, Agent, or Firm* — Global IP Counselors

(57) ABSTRACT

A heat pump system includes a heat source unit, a first usage unit, and a second usage unit. The heat source unit has a heat-source-side compressor, a heat-source-side heat exchanger, a heat-source-side blower and a heat-source-side switching mechanism. The first usage unit has at least a radiation amount adjusting element and a first usage-side flow rate adjustment valve. The second usage unit has at least a second usage-side flow rate adjustment valve. In a case in which the second usage unit performs an air-cooling operation and the first usage unit performs an aqueous medium heating operation, the amount of radiation adjusted by the radiation amount adjusting element or operating capacity of the heat-source-side blower is controlled in accordance with a state of the first usage-side flow rate adjustment valve and the second usage-side flow rate adjustment valve.

16 Claims, 12 Drawing Sheets

(56) References Cited

FOREIGN PATENT DOCUMENTS

| | | |
|---|---|---|
| JP | 1-210771 A | 8/1989 |
| JP | 2-169968 A | 6/1990 |
| JP | 7-225064 A | 8/1995 |
| JP | 10-141796 A | 5/1998 |
| JP | 2004-132647 A | 4/2004 |
| JP | 2007-232225 A | 9/2007 |

OTHER PUBLICATIONS

International Preliminary Report of corresponding PCT Application No. PCT/JP2010/001179.

* cited by examiner

HEAT PUMP SYSTEM

CROSS-REFERENCE TO RELATED APPLICATIONS

This U.S. National stage application claims priority under 35 U.S.C. §119(a) to Japanese Patent Application No. 2009-040892, filed in Japan on Feb. 24, 2009, the entire contents of which are hereby incorporated herein by reference.

TECHNICAL FIELD

The present invention relates to a heat pump system, and particularly relates to a heat pump system capable of heating an aqueous medium by utilizing a heat pump cycle.

BACKGROUND ART

Heat pump water heaters, such as the one described in (Japanese Laid-open Patent Publication No. 60-164157, are known which are capable of utilizing a heat pump cycle to heat water. Such a heat pump water heater has primarily a compressor, a refrigerant/water heat exchanger, and a heat-source-side heat exchanger, and is configured so that water is heated by the radiation of refrigerant in the refrigerant/water heat exchanger, and the hot water thereby obtained is fed to a storage tank.

SUMMARY

Technical Problem

In the conventional heat pump water heater described above, since operation is performed for cooling outside air as the heat source in the heat-source-side heat exchanger, an energy-saving heat pump system can be obtained by enabling the heat of cooling obtained by the refrigerant to be utilized for another application.

An object of the present invention is to obtain energy-saving effects in a heat pump system capable of heating an aqueous medium by utilizing a heat pump cycle.

Solution to Problem

A heat pump system according to a first aspect of the present invention comprises a heat source unit, a first usage unit, and a second usage unit. The heat source unit has a heat-source-side compressor, a heat-source-side heat exchanger, a heat-source-side blower, and a heat-source-side switching mechanism. The heat-source-side compressor compresses a heat-source-side refrigerant. The heat-source-side blower is a variable-capacity blower capable of adjusting the heat exchange efficiency of the heat-source-side heat exchanger. The heat-source-side switching mechanism is capable of switching between a heat-source-side radiating operation state for causing the heat-source-side heat exchanger to function as a radiator of the heat-source-side refrigerant, and a heat-source-side evaporating operation state for causing the heat-source-side heat exchanger to function as an evaporator of the heat-source-side refrigerant. The first usage unit has a first usage-side heat exchanger, a radiation amount adjusting element (means), and a first usage-side flow rate adjustment valve. The first usage-side heat exchanger is capable of functioning as a radiator of the heat-source-side refrigerant compressed by the heat-source-side compressor. The radiation amount adjusting element (means) adjusts the amount of radiation to an aqueous medium by radiation of the heat-source-side refrigerant in the first usage-side heat exchanger. The first usage-side flow rate adjustment valve is a valve capable of adjusting the flow rate of the heat-source-side refrigerant that flows through the first usage-side heat exchanger. The first usage unit is also capable of performing an aqueous medium heating operation, which is an operation for heating the aqueous medium by radiation of the heat-source-side refrigerant in the first usage-side heat exchanger. The second usage unit has a second usage-side heat exchanger and a second usage-side flow rate adjustment valve. The second usage-side heat exchanger is capable of at least functioning as an evaporator of the heat-source-side refrigerant in the heat-source-side radiating operation state of the heat-source-side switching mechanism. The second usage-side flow rate adjustment valve is capable of adjusting the flow rate of the heat-source-side refrigerant that flows through the second usage-side heat exchanger. The second usage unit is also capable of at least performing an air-cooling operation for cooling an air medium by evaporation of the heat-source-side refrigerant in the second usage-side heat exchanger. The radiation amount of the radiation amount adjusting element (means) or the operating capacity of the heat-source-side blower is controlled in accordance with the state of the first usage-side flow rate adjustment valve and the second usage-side flow rate adjustment valve in a case in which the second usage unit performs the air-cooling operation and the first usage unit performs the aqueous medium heating operation.

In this heat pump system, not only can operation be performed for heating an aqueous medium by radiation of the heat-source-side refrigerant in the first usage-side heat exchanger, but it is possible to perform operation for heating the aqueous medium by radiation of the heat-source-side refrigerant in the first usage-side heat exchanger, as well as to utilize the heat of cooling obtained by the heat-source-side refrigerant by heating of the aqueous medium for operation in which an air medium is cooled by evaporation of the heat-source-side refrigerant in the second usage-side heat exchanger. Therefore, in such cases as when the aqueous medium heated in the first usage unit is used to supply hot water, and the air medium cooled in the second usage unit is used for indoor air cooling, for example, it is possible to effectively utilize the heat of cooling, which was not effectively utilized by merely cooling outside air in the heat-source-side heat exchanger in the conventional heat pump water heater, and it is thereby possible to obtain energy-saving effects in a heat pump system capable of heating an aqueous medium by utilizing a heat pump cycle.

In such a case in which the second usage unit performs air-cooling operation, and operation is also performed which uses the aqueous medium heated in the first usage unit to supply hot water, the radiation amount of the radiation amount adjusting means or the operating capacity of the heat-source-side blower is controlled in the present invention in accordance with the state of the first usage-side flow rate adjustment valve and the second usage-side flow rate adjustment valve.

Consequently, in a case in which the heat-source-side refrigerant stagnates in the heat-source-side heat exchanger, for example, and the amount of refrigerant that flows into the second usage unit is inadequate, the opening degree of the second usage-side flow rate adjustment valve is likely to be greater than at least a predetermined opening degree, but by taking advantage of this state and controlling the operating capacity of the heat-source-side blower in accordance with the state of the second usage-side flow rate adjustment valve, the heat-source-side refrigerant that is stagnated in the heatsource-side heat exchanger can be directed to the second usage unit to overcome the problem of an inadequate amount of refrigerant in the second usage unit. In a case in which there is a large load (e.g., hot-water supply load) pertaining to heating the aqueous medium in the first usage unit, a state readily occurs in which the heat-source-side refrigerant stagnates in the first usage-side heat exchanger, and the opening degree of the first usage-side flow rate adjustment valve is greater than at least a predetermined opening degree, but by taking advantage of this state and controlling the radiation amount of the radiation amount adjusting means in accordance with the state of the first usage-side flow rate adjustment valve, the heat-source-side refrigerant can be made less prone to stagnate in the first usage-side heat exchanger.

Consequently, the heat-source-side refrigerant can be prevented from stagnating in a specific heat exchanger among the heat exchangers which function as radiators. It is therefore possible to prevent the heat exchange efficiency from decreasing due to stagnation of the heat-source-side refrigerant in a specific heat exchanger.

A heat pump system according to a second aspect of the present invention is the heat pump system according to the first aspect, wherein superheat-degree fixing control is performed for fixing the degree of superheat of the heat-source-side refrigerant in the second usage-side heat exchanger at a predetermined degree of superheat by adjusting the opening degree of the second usage-side flow rate adjustment valve. In the heat pump system, a control for decreasing the airflow rate of the heat-source-side blower is performed in a case in which the second usage-side flow rate adjustment valve reaches an opening degree equal to or greater than a predetermined opening degree.

In a case in which the heat-source-side refrigerant stagnates in the heat-source-side heat exchanger, and the amount of refrigerant that flows into the second usage unit is inadequate, the opening degree of the second usage-side flow rate adjustment valve is likely to be greater than at least a predetermined opening degree, but by taking advantage of this state and controlling the operating capacity of the heat-source-side blower in accordance with the state of the second usage-side flow rate adjustment valve, the heat-source-side refrigerant that is stagnated in the heat-source-side heat exchanger can be directed to the second usage unit to overcome the problem of an inadequate amount of refrigerant in the second usage unit.

Consequently, the heat-source-side refrigerant can be prevented from stagnating in the heat-source-side heat exchanger which functions as a radiator. It is therefore possible to prevent the heat exchange efficiency of the heat-source-side heat exchanger from decreasing.

A heat pump system according to a third aspect of the present invention is the heat pump system according to the first or second aspect, wherein the first usage-side heat exchanger is a heat exchanger for exchanging heat between the heat-source-side refrigerant and the aqueous medium.

A heat pump system according to a fourth aspect of the present invention is the heat pump system according to the third aspect, further comprising an aqueous medium circuit. The aqueous medium circuit circulates an aqueous medium for exchanging heat with the heat-source-side refrigerant in the first usage-side heat exchanger. The radiation amount adjusting means is a variable-capacity circulation pump. Subcooling-degree fixing control is performed for fixing the degree of subcooling of the heat-source-side refrigerant in the first usage-side heat exchanger at a predetermined degree of subcooling by adjusting the opening degree of the first usage-side flow rate adjustment valve. The capacity of the circulation pump is controlled so that the flow rate of the aqueous medium circulated through the aqueous medium circuit decreases in a case in which the first usage-side flow rate adjustment valve reaches an opening degree equal to or greater than a predetermined opening degree.

In the case of performing the air-cooling operation of the second usage unit, by heating the aqueous medium even without utilizing heat via the aqueous medium (e.g., utilizing hot-water supply), it is possible to utilize waste heat that occurs on the radiator side during air-cooling operation by the second usage unit. However, in a case in which air-cooling operation by the second usage unit is the main object, and waste heat recovery is performed which accompanies air-cooling operation by the second usage unit to enhance the energy efficiency of aqueous-medium heating operation in the first usage unit, in operating conditions in which the temperature of the aqueous medium is low, such as immediately after the start of air-cooling operation by the second usage unit and operation by the first usage unit, the load pertaining to heating the aqueous medium is often greater than the air-cooling load, due to the low temperature of the aqueous medium. When air-cooling operation by the second usage unit is continued in accordance with the load pertaining to heating the aqueous medium, an excessive amount of energy is required in relation to the air-cooling load, and efficiency is poor. Consequently, to prevent this situation, the load pertaining to heating the aqueous medium must be adapted to the air-cooling load pertaining to the second usage unit.

In this heat pump system, subcooling-degree fixing control is performed for fixing the degree of subcooling of the heat-source-side refrigerant in the first usage-side heat exchanger at a predetermined degree of subcooling by adjusting the opening degree of the first usage-side flow rate adjustment valve. Consequently, the opening degree of the first usage-side flow rate adjustment valve increases in the case that the load pertaining to heating the aqueous medium in the first usage unit is larger than the air-cooling load in the second usage unit.

Therefore, in this heat pump system, a variable-capacity circulation pump is provided, and in a case in which the first usage-side flow rate adjustment valve reaches an opening degree equal to or greater than a predetermined opening degree, the load pertaining to heating the aqueous medium in the first usage unit is determined to be larger than the air-cooling load in the second usage unit, and the capacity of the circulation pump is controlled so that the flow rate of the aqueous medium circulated through the aqueous medium circuit decreases.

The load pertaining to heating the aqueous medium in the first usage unit can thereby be kept low, and the load pertaining to heating the aqueous medium in the first usage unit can be made smaller than the air-cooling load in the second usage unit. Consequently, it is possible to prevent the operating efficiency of waste heat recovery in the first usage unit from decreasing while air-cooling operation is performed by the second usage unit.

A heat pump system according to a fifth aspect of the present invention is the heat pump system according to the first or second aspect, wherein the first usage-side heat exchanger is a heat exchanger for exchanging heat between the heat-source-side refrigerant and a usage-side refrigerant which is other than the heat-source-side refrigerant. The first usage unit further includes a usage-side compressor and a refrigerant/water heat exchanger. The usage-side compressor compresses the usage-side refrigerant. The refrigerant/water heat exchanger is capable of functioning as a radiator of the usage-side refrigerant and heating the aqueous medium. The first usage unit together with the first usage-side heat exchanger constitute a usage-side refrigerant circuit for circulating the usage-side refrigerant.

In this heat pump system, in the first usage-side heat exchanger, the usage-side refrigerant circulated through the usage-side refrigerant circuit is heated by radiation of the heat-source-side refrigerant, the usage-side refrigerant circuit utilizes the heat obtained from the heat-source-side refrigerant, and a refrigeration cycle can be obtained which has a higher temperature than the refrigeration cycle in the refrigerant circuit through which the heat-source-side refrigerant circulates. A high-temperature aqueous medium can therefore be obtained by radiation of the usage-side refrigerant in the refrigerant/water heat exchanger.

A heat pump system according to a sixth aspect of the present invention is the heat pump system according to the fifth aspect, further comprising an aqueous medium circuit. The aqueous medium circuit has a variable-capacity circulation pump. The aqueous medium circuit circulates an aqueous medium for exchanging heat with the usage-side refrigerant in the refrigerant/water heat exchanger. The radiation amount adjusting means is the variable-capacity circulation pump. Subcooling-degree fixing control is performed for fixing the degree of subcooling of the heat-source-side refrigerant in the first usage-side heat exchanger at a predetermined degree of subcooling by adjusting the opening degree of the first usage-side flow rate adjustment valve. The capacity of the circulation pump is controlled so that the flow rate of the aqueous medium circulated through the aqueous medium circuit decreases in a case in which the first usage-side flow rate adjustment valve reaches an opening degree equal to or greater than a predetermined opening degree.

In the case performing the air-cooling operation of the second usage unit, by heating the aqueous medium even without utilizing heat via the aqueous medium (e.g., utilizing hot-water supply), it is possible to utilize waste heat that occurs on the radiator side during air-cooling operation by the second usage unit. However, in a case in which air-cooling operation by the second usage unit is the main object, and waste heat recovery is performed which accompanies air-cooling operation by the second usage unit to enhance the energy efficiency of aqueous-medium heating operation in the first usage unit, in operating conditions in which the temperature of the aqueous medium is low, such as immediately after the start of air-cooling operation by the second usage unit and operation by the first usage unit, the load pertaining to heating the aqueous medium is often greater than the air-cooling load, due to the low temperature of the aqueous medium. When air-cooling operation by the second usage unit is continued in accordance with the load pertaining to heating the aqueous medium, an excessive amount of energy is required in relation to the air-cooling load, and efficiency is poor. Consequently, to prevent this situation, the load pertaining to heating the aqueous medium must be adapted to the air-cooling load pertaining to the second usage unit.

In this heat pump system, subcooling-degree fixing control is performed for fixing the degree of subcooling of the heat-source-side refrigerant in the first usage-side heat exchanger at a predetermined degree of subcooling by adjusting the opening degree of the first usage-side flow rate adjustment valve. Consequently, the opening degree of the first usage-side flow rate adjustment valve increases in the case that the load pertaining to heating the aqueous medium in the first usage unit is larger than the air-cooling load in the second usage unit.

Therefore, in this heat pump system, a variable-capacity circulation pump is provided, and in a case in which the first usage-side flow rate adjustment valve reaches an opening degree equal to or greater than a predetermined opening degree, the load pertaining to heating the aqueous medium in the first usage unit is determined to be larger than the air-cooling load in the second usage unit, and the capacity of the circulation pump is controlled so that the flow rate of the aqueous medium circulated through the aqueous medium circuit decreases.

The load pertaining to heating the aqueous medium in the first usage unit can thereby be kept low, and the load pertaining to heating the aqueous medium in the first usage unit can be made smaller than the air-cooling load in the second usage unit. Consequently, it is possible to prevent the operating efficiency of waste heat recovery in the first usage unit from decreasing while air-cooling operation is performed by the second usage unit.

A heat pump system according to a seventh aspect of the present invention is the heat pump system according to any of the first through sixth aspects, further comprising a discharge refrigerant communication tube, a liquid refrigerant communication tube, and a gas refrigerant communication tube. The discharge refrigerant communication tube is capable of directing the heat-source-side refrigerant to the outside of the heat source unit from a discharge of the heat-source-side compressor in any of the heat-source-side radiating operation state and the heat-source-side evaporating operation state of the heat-source-side switching mechanism. The liquid refrigerant communication tube is capable of directing the heat-source-side refrigerant to the outside of the heat source unit from an outlet of the heat-source-side heat exchanger functioning as a radiator of the heat-source-side refrigerant in the heat-source-side radiating operation state of the heat-source-side switching mechanism, and of introducing the heat-source-side refrigerant into an inlet of the heat-source-side heat exchanger functioning as an evaporator of the heat-source-side refrigerant from outside the heat source unit in the heat-source-side evaporating operation state of the heat-source-side switching mechanism. The gas refrigerant communication tube is capable of introducing the heat-source-side refrigerant into an intake of the heat-source-side compressor from outside the heat source unit.

In this heat pump system, not only can operation be performed for heating an aqueous medium by radiation of the heat-source-side refrigerant in the first usage-side heat exchanger, but operation is performed for heating the aqueous medium by radiation of the heat-source-side refrigerant in the first usage-side heat exchanger, and it is possible to utilize the heat of cooling obtained by the heat-source-side refrigerant by heating of the aqueous medium for operation in which an air medium is cooled by evaporation of the heat-source-side refrigerant in the second usage-side heat exchanger. Therefore, in such cases as when the aqueous medium heated in the first usage unit is used to supply hot water, and the air medium cooled in the second usage unit is used for indoor air cooling, for example, it is possible to effectively utilize the heat of cooling, which was not effectively utilized by merely cooling outside air in the heat-source-side heat exchanger in the conventional heat pump water heater, and it is thereby possible to obtain energy-saving effects in a heat pump system capable of heating an aqueous medium by utilizing a heat pump cycle.

Advantageous Effects of Invention

As described above, the following effects are obtained through the present invention.

In the invention according to the first or third aspect, not only can operation be performed for heating an aqueous medium by radiation of the heat-source-side refrigerant in the first usage-side heat exchanger, but it is possible to perform operation for heating the aqueous medium by radiation of the heat-source-side refrigerant in the first usage-side heat exchanger, as well as to utilize the heat of cooling obtained by the heat-source-side refrigerant by heating of the aqueous medium for operation in which an air medium is cooled by evaporation of the heat-source-side refrigerant in the second usage-side heat exchanger. Therefore, in such cases as when the aqueous medium heated in the first usage unit is used to supply hot water, and the air medium cooled in the second usage unit is used for indoor air cooling, it is possible to effectively utilize the heat of cooling, which was not effectively utilized by merely cooling outside air in the heat-source-side heat exchanger in the conventional heat pump water heater, and it is thereby possible to obtain energy-saving effects in a heat pump system capable of heating an aqueous medium by utilizing a heat pump cycle.

In such a case in which the second usage unit performs air-cooling operation, and operation is also performed which uses the aqueous medium heated in the first usage unit to supply hot water, the radiation amount of the radiation amount adjusting means or the operating capacity of the heat-source-side blower is controlled in the present invention in accordance with the state of the first usage-side flow rate adjustment valve and the second usage-side flow rate adjustment valve.

Consequently, in a case in which the heat-source-side refrigerant stagnates in the heat-source-side heat exchanger, for example, and the amount of refrigerant that flows into the second usage unit is inadequate, the opening degree of the second usage-side flow rate adjustment valve is likely to be greater than at least a predetermined opening degree, but by taking advantage of this state and controlling the operating capacity of the heat-source-side blower in accordance with the state of the second usage-side flow rate adjustment valve, the heat-source-side refrigerant that is stagnated in the heat-source-side heat exchanger can be directed to the second usage unit to overcome the problem of an inadequate amount of refrigerant in the second usage unit. In a case in which there is a large load (e.g., hot-water supply load) pertaining to heating the aqueous medium in the first usage unit, a state readily occurs in which the heat-source-side refrigerant stagnates in the first usage-side heat exchanger, and the opening degree of the first usage-side flow rate adjustment valve is greater than at least a predetermined opening degree, but by taking advantage of this state and controlling the radiation amount of the radiation amount adjusting means in accordance with the state of the first usage-side flow rate adjustment valve, the heat-source-side refrigerant can be made less prone to stagnate in the first usage-side heat exchanger.

Consequently, the heat-source-side refrigerant can be prevented from stagnating in a specific heat exchanger among the heat exchangers which function as radiators. It is therefore possible to prevent the heat exchange efficiency from decreasing due to stagnation of the heat-source-side refrigerant in a specific heat exchanger.

In the invention according to the second aspect, the heat-source-side refrigerant can be prevented from stagnating in the heat-source-side heat exchanger which functions as a radiator. It is therefore possible to prevent the heat exchange efficiency of the heat-source-side heat exchanger from decreasing.

In the invention according to the fourth aspect, the load pertaining to heating the aqueous medium in the first usage unit can be kept low, and the load pertaining to heating the aqueous medium in the first usage unit can be made smaller than the air-cooling load in the second usage unit. Consequently, it is possible to prevent the operating efficiency of waste heat recovery in the first usage unit from decreasing while air-cooling operation is performed by the second usage unit.

In the invention according to the fifth aspect, in the first usage-side heat exchanger, the usage-side refrigerant circulated through the usage-side refrigerant circuit is heated by radiation of the heat-source-side refrigerant, the usage-side refrigerant circuit utilizes the heat obtained from the heat-source-side refrigerant, and a refrigeration cycle can be obtained which has a higher temperature than the refrigeration cycle in the refrigerant circuit through which the heat-source-side refrigerant circulates. A high-temperature aqueous medium can therefore be obtained by radiation of the usage-side refrigerant in the refrigerant/water heat exchanger.

In the invention according to the sixth aspect, the load pertaining to heating the aqueous medium in the first usage unit can be kept low, and the load pertaining to heating the aqueous medium in the first usage unit can be made smaller than the air-cooling load in the second usage unit. Consequently, it is possible to prevent the operating efficiency of waste heat recovery in the first usage unit from decreasing while air-cooling operation is performed by the second usage unit.

In the invention according to the seventh aspect, in such cases as when the aqueous medium heated in the first usage unit is used to supply hot water, and the air medium cooled in the second usage unit is used for indoor air cooling, for example, it is possible to effectively utilize the heat of cooling, which was not effectively utilized by merely cooling outside air in the heat-source-side heat exchanger in the conventional heat pump water heater, and it is thereby possible to obtain energy-saving effects in a heat pump system capable of heating an aqueous medium by utilizing a heat pump cycle.

DESCRIPTION OF EMBODIMENTS

Embodiments of the heat pump system according to the present invention will be described based on the drawings.

First Embodiment

Configuration

—Overall Configuration—

Figure 1:
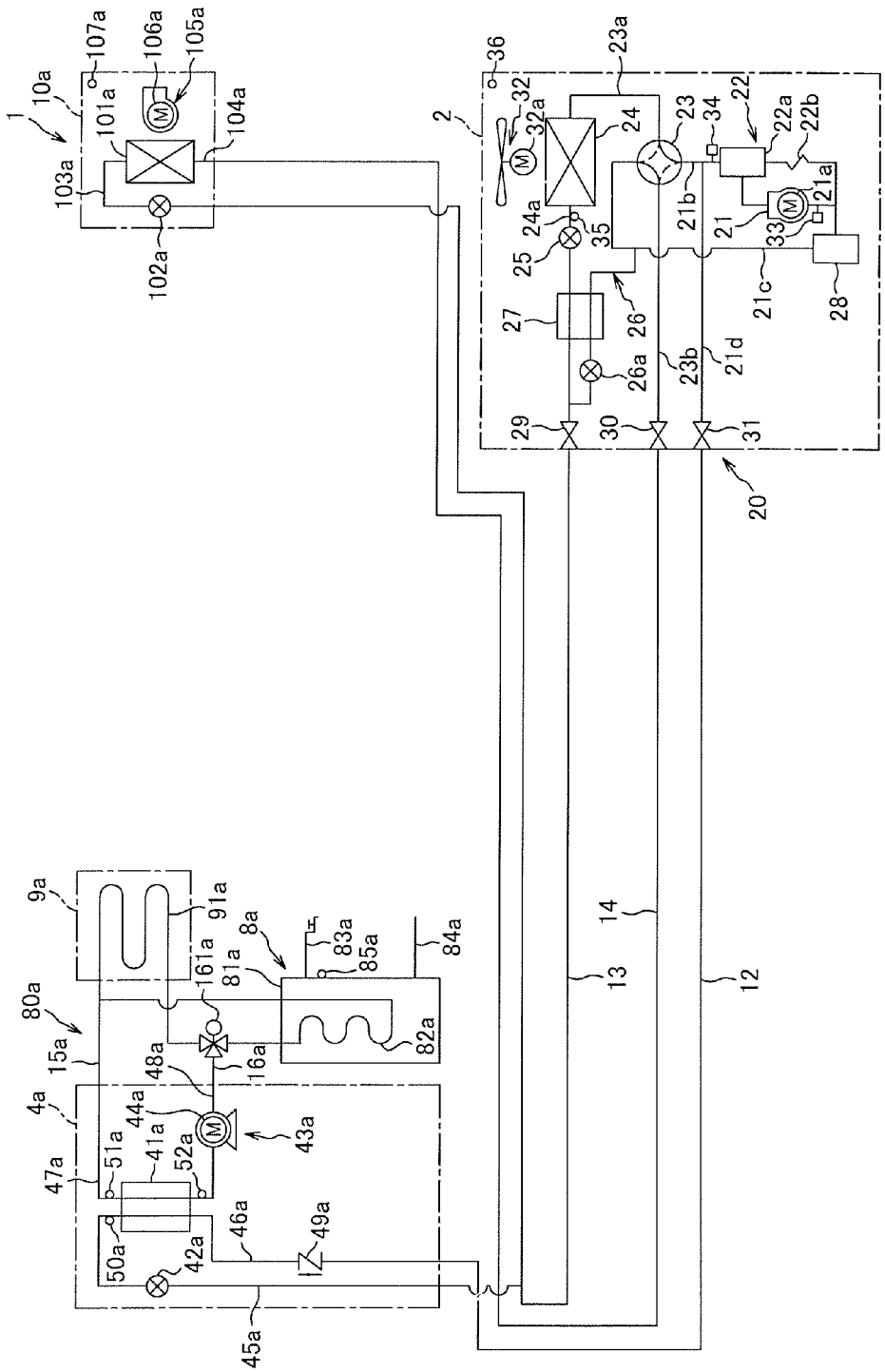
FIG. 1 is a view showing the general configuration of the heat pump system according to a first embodiment of the present invention.

FIG. 1 is a view showing the general configuration of a heat pump system 1 according to a first embodiment of the present invention. The heat pump system 1 is an apparatus capable of operation for heating an aqueous medium, and other operation by utilizing a vapor compression heat pump cycle.

The heat pump system 1 has primarily a heat source unit 2, a first usage unit 4a, a second usage unit 10a, a discharge refrigerant communication tube 12, a liquid refrigerant communication tube 13, a gas refrigerant communication tube 14, a hot-water storage unit 8a, a hot-water air-warming unit 9a, an aqueous medium communication tube 15a, and an aqueous medium communication tube 16a. The heat source unit 2, the first usage unit 4a, and the second usage unit 10a are connected via the refrigerant communication tubes 12, 13, 14, thereby constituting a heat-source-side refrigerant circuit 20. The first usage unit 4a, the hot-water storage unit 8a, and the hot-water air-warming unit 9a are connected via the aqueous medium communication tubes 15a, 16a, thereby constituting an aqueous medium circuit 80a. HFC-410A, which is a type of HFC-based refrigerant is enclosed as heat-source-side refrigerant in the heat-source-side refrigerant circuit 20, and an ester-type or ether-type refrigeration machine oil that is compatible with a HFC-based refrigerant is enclosed for lubricating a heat-source-side compressor 21 (described hereinafter). Water as the aqueous medium is circulated in the aqueous medium circuit 80a.

—Heat Source Unit—

The heat source unit 2 is installed outdoors, is connected to the usage unit 4a and 10a via the refrigerant communication tubes 12, 13, 14, and constitutes a portion of the heat-source-side refrigerant circuit 20.

The heat source unit 2 has primarily a heat-source-side compressor 21, an oil separation mechanism 22, a heat-source-side switching mechanism 23, a heat-source-side heat exchanger 24, a heat-source-side expansion valve 25, an intake return tube 26, a subcooler 27, a heat-source-side accumulator 28, a liquid-side shutoff valve 29, a gas-side shutoff valve 30, and a discharge-side shutoff valve 31.

The heat-source-side compressor 21 is a mechanism for compressing the heat-source-side refrigerant. The heat-source-side compressor 21 used herein is an airtight compressor in which a rotary-type, scroll-type, or other positive-displacement compression element (not shown) housed in a casing (not shown) is driven by a heat-source-side compressor motor 21a which is also housed in the casing. A high-pressure space (not shown) filled by the heat-source-side refrigerant after compression in the compression element is formed inside the casing of the heat-source-side compressor 21, and refrigeration machine oil is stored in the high-pressure space. The rotation speed (i.e., the operating frequency) of the heat-source-side compressor motor 21a can be varied by an inverter apparatus (not shown), and the capacity of the heat-source-side compressor 21 can thereby be controlled.

The oil separation mechanism 22 is a mechanism for separating refrigeration machine oil included in the heat-source-side refrigerant that is discharged from the heat-source-side compressor 21 and returning the refrigeration machine oil to the intake of the heat-source-side compressor. The oil separation mechanism 22 has primarily an oil separator 22a provided to a heat-source-side discharge tube 21b of the heat-source-side compressor 21; and an oil return tube 22b for connecting the oil separator 22a and a heat-source-side intake tube 21c of the heat-source-side compressor 21. The oil separator 22a is a device for separating refrigeration machine oil included in the heat-source-side refrigerant that is discharged from the heat-source-side compressor 21. The oil return tube 22b has a capillary tube, and is a refrigerant tube for returning the refrigeration machine oil separated from the heat-source-side refrigerant in the oil separator 22a to the heat-source-side intake tube 21c of the heat-source-side compressor 21.

The heat-source-side switching mechanism 23 is a four-way switching valve capable of switching between a heat-source-side radiating operation state in which the heat-source-side heat exchanger 24 functions as a radiator of the heat-source-side refrigerant, and a heat-source-side evaporating operation state in which the heat-source-side heat exchanger 24 functions as a evaporator of the heat-source-side refrigerant. The heat-source-side switching mechanism 23 is connected to the heat-source-side discharge tube 21b, the heat-source-side intake tube 21c, a first heat-source-side gas refrigerant tube 23a connected to the gas side of the heat-source-side heat exchanger 24, and a second heat-source-side gas refrigerant tube 23b connected to the gas-side shutoff valve 30. The heat-source-side switching mechanism 23 is capable of switching for communicating the heat-source-side discharge tube 21b with the first heat-source-side gas refrigerant tube 23a, and communicating the second heat-source-side gas refrigerant tube 23b with the heat-source-side intake tube 21c (this switching corresponding to the heat-source-side radiating operation state, indicated by solid lines in the heat-source-side switching mechanism 23 in FIG. 1). The heat-source-side switching mechanism 23 is also capable of switching for communicating the heat-source-side discharge tube 21b with the second heat-source-side gas refrigerant tube 23b, and communicating the first heat-source-side gas refrigerant tube 23a with the heat-source-side intake tube 21c (this switching corresponding to the heat-source-side evaporating operation state, indicated by dashed lines in the heat-source-side switching mechanism 23 in FIG. 1). The heat-source-side switching mechanism 23 is not limited to a four-way switching valve, and may configured so as to have a function for switching the same directions of heat-source-side refrigerant flow as those described above, through the use of a combination of a plurality of solenoid valves or the like, for example.

The heat-source-side heat exchanger 24 is a heat exchanger for functioning as a radiator or evaporator of the heat-source-side refrigerant by exchanging heat between the heat-source-side refrigerant and outdoor air. A heat-source-side liquid refrigerant tube 24a is connected to the liquid side of the heat-source-side heat exchanger 24, and the first heat-source-side gas refrigerant tube 23a is connected to the gas side thereof. The outdoor air for heat exchange with the heat-source-side refrigerant in the heat-source-side heat exchanger 24 is fed by a heat-source-side fan 32 which is driven by a heat-source-side fan motor 32a.

The heat-source-side expansion valve 25 is an electrical expansion valve for performing such functions as depressurizing the heat-source-side refrigerant flowing through the heat-source-side heat exchanger 24, and is provided to the heat-source-side liquid refrigerant tube 24a.

The intake return tube 26 is a refrigerant tube for diverting a portion of the heat-source-side refrigerant flowing through the heat-source-side liquid refrigerant tube 24a and returning the diverted refrigerant to the intake of the heat-source-side compressor 21, and in the present embodiment, one end of the intake return tube 26 is connected to the heat-source-side liquid refrigerant tube 24a, and the other end is connected to the heat-source-side intake tube 21c. An intake return expansion valve 26a, the opening degree of which can be controlled, is provided to the intake return tube 26. The intake return expansion valve 26a is composed of an electrical expansion valve.

The subcooler 27 is a heat exchanger for exchanging heat between the heat-source-side refrigerant flowing through the heat-source-side liquid refrigerant tube 24a and the heat-source-side refrigerant flowing through the intake return tube 26 (more specifically, the heat-source-side refrigerant that has been depressurized by the intake return expansion valve 26a).

The heat-source-side accumulator 28 is provided to the heat-source-side intake tube 21c, and is a container for temporarily storing the heat-source-side refrigerant circulated through the heat-source-side refrigerant circuit 20 before the heat-source-side refrigerant is drawn into the heat-source-side compressor 21 from the heat-source-side intake tube 21c.

The liquid-side shutoff valve 29 is a valve provided at the connection between the heat-source-side liquid refrigerant tube 24a and the liquid refrigerant communication tube 13. The gas-side shutoff valve 30 is a valve provided at the connection between the second heat-source-side gas refrigerant tube 23b and the gas refrigerant communication tube 14. The discharge-side shutoff valve 31 is a valve provided at the connection between the gas refrigerant communication tube 14 and a heat-source-side discharge branch tube 21d which is diverted from the heat-source-side discharge tube 21b.

Various sensors are provided to the heat source unit 2. Specifically, the heat source unit 2 is provided with a heat-source-side intake pressure sensor 33 for detecting a heat-source-side intake pressure Ps1, which is the pressure of the heat-source-side refrigerant in the intake of the heat-source-side compressor 21; a heat-source-side discharge pressure sensor 34 for detecting a heat-source-side discharge pressure Pd1, which is the pressure of the heat-source-side refrigerant in the discharge of the heat-source-side compressor 21; a heat-source-side heat exchange temperature sensor 35 for detecting a heat-source-side heat exchanger temperature Thx, which is the temperature of the heat-source-side refrigerant in the liquid side of the heat-source-side heat exchanger 24; and an outdoor air temperature sensor 36 for detecting an outdoor air temperature To.

—Discharge Refrigerant Communication Tube—

The discharge refrigerant communication tube 12 is connected to the heat-source-side discharge branch tube 21d via the discharge-side shutoff valve 31, and is a refrigerant tube capable of directing the heat-source-side refrigerant to the outside of the heat source unit 2 from the discharge of the heat-source-side compressor 21 in any of the heat-source-side radiating operation state and the heat-source-side evaporating operation state of the heat-source-side switching mechanism 23.

—Liquid Refrigerant Communication Tube—

The liquid refrigerant communication tube 13 is connected to the heat-source-side liquid refrigerant tube 24a via the liquid-side shutoff valve 29, and the liquid refrigerant communication tube 13 is a refrigerant tube capable of directing the heat-source-side refrigerant to the outside of the heat source unit 2 from the outlet of the heat-source-side heat exchanger 24 which functions as a radiator of the heat-source-side refrigerant when the heat-source-side switching mechanism 23 is in the heat-source-side radiating operation state. The liquid refrigerant communication tube 13 is also a refrigerant tube capable of introducing the heat-source-side refrigerant from outside the heat source unit 2 into the inlet of the heat-source-side heat exchanger 24 which functions as an evaporator of the heat-source-side refrigerant when the heat-source-side switching mechanism 23 is in the heat-source-side evaporating operation state.

—Gas Refrigerant Communication Tube—

The gas refrigerant communication tube 14 is connected to the second heat-source-side gas refrigerant tube 23b via the gas-side shutoff valve 30. The gas refrigerant communication tube 14 is a refrigerant tube capable of introducing the heat-source-side refrigerant into the intake of the heat-source-side compressor 21 from outside the heat source unit 2 when the heat-source-side switching mechanism 23 is in the heat-source-side radiating operation state. The gas refrigerant communication tube 14 is also a refrigerant tube capable of directing the heat-source-side refrigerant to the outside of the heat source unit 2 from the discharge of the heat-source-side compressor 21 when the heat-source-side switching mechanism 23 is in the heat-source-side evaporating operation state.

—First Usage Unit—

The first usage unit 4a is installed indoors, is connected to the heat source unit 2 via the refrigerant communication tubes 12, 13, and constitutes a portion of the heat-source-side refrigerant circuit 20. The first usage unit 4a is also connected to the hot-water storage unit 8a and the hot-water air-warming unit 9a via the aqueous medium communication tubes 15a, 16a, and constitutes a portion of the aqueous medium circuit 80a.

The first usage unit 4a has primarily a first usage-side heat exchanger 41a, a first usage-side flow rate adjustment valve 42a, and a circulation pump 43a (a radiation amount adjusting element or means).

The first usage-side heat exchanger 41a is a heat exchanger for functioning as a radiator of the heat-source-side refrigerant by exchanging heat between the heat-source-side refrigerant and the aqueous medium, a first usage-side liquid refrigerant tube 45a is connected to the liquid side of the flow passage through which the heat-source-side refrigerant flows, a first usage-side discharge refrigerant tube 46a is connected to the gas side of the flow passage through which the heat-source-side refrigerant flows, a first usage-side water inlet tube 47a is connected to the inlet side of the flow passage through which the aqueous medium flows, and a first usage-side water outlet tube 48a is connected to the outlet side of the flow passage through which the aqueous medium flows. The liquid refrigerant communication tube 13 is connected to the first usage-side liquid refrigerant tube 45a, the discharge refrigerant communication tube 12 is connected to the first usage-side discharge refrigerant tube 46a, the aqueous medium communication tube 15a is connected to the first usage-side water inlet tube 47a, and the aqueous medium communication tube 16a is connected to the first usage-side water outlet tube 48a.

The first usage-side flow rate adjustment valve 42a is an electrical expansion valve whereby the flow rate of heatsource-side refrigerant flowing through the first usage-side heat exchanger 41a can be varied by controlling the opening degree of the first usage-side flow rate adjustment valve 42a, and the first usage-side flow rate adjustment valve 42a is provided to the first usage-side liquid refrigerant tube 45a.

The first usage-side discharge refrigerant tube 46a is provided with a first usage-side discharge non-return valve 49a for allowing the heat-source-side refrigerant to flow toward the first usage-side heat exchanger 41a from the discharge refrigerant communication tube 12 and preventing the heat-source-side refrigerant from flowing toward the discharge refrigerant communication tube 12 from the first usage-side heat exchanger 41a.

The circulation pump 43a is a mechanism for pressurizing the aqueous medium, and the circulation pump 43a used herein is a pump in which a centrifugal and/or positive-displacement pump element (not shown) is driven by a circulation pump motor 44a. The circulation pump 43a is provided to the first usage-side water outlet tube 48a. The rotation speed (i.e., the operating frequency) of the circulation pump motor 44a can be varied by an inverter apparatus (not shown), and the capacity of the circulation pump 43a can thereby be controlled.

The first usage unit 4a is thereby configured so that a hot-water supply operation can be performed in which the first usage-side heat exchanger 41a is caused to function as a radiator of the heat-source-side refrigerant introduced from the discharge refrigerant communication tube 12, whereby the heat-source-side refrigerant radiated in the first usage-side heat exchanger 41a is directed to the liquid refrigerant communication tube 13, and the aqueous medium is heated by radiation of the heat-source-side refrigerant in the first usage-side heat exchanger 41a.

Various sensors are provided to the first usage unit 4a. Specifically, the first usage unit 4a is provided with a first usage-side heat exchange temperature sensor 50a for detecting a first usage-side refrigerant temperature Tsc1, which is the temperature of the heat-source-side refrigerant in the liquid side of the first usage-side heat exchanger 41a; an aqueous medium inlet temperature sensor 51a for detecting an aqueous medium inlet temperature Twr, which is the temperature of the aqueous medium in the inlet of the first usage-side heat exchanger 41a; and an aqueous medium outlet temperature sensor 52a for detecting an aqueous medium outlet temperature Tw1, which is the temperature of the aqueous medium in the outlet of the first usage-side heat exchanger 41a.

—Hot-Water Storage Unit—

The hot-water storage unit 8a is installed indoors, is connected to the first usage unit 4a via the aqueous medium communication tubes 15a, 16a, and constitutes a portion of the aqueous medium circuit 80a.

The hot-water storage unit 8a has primarily a hot-water storage tank 81a and a heat exchange coil 82a.

The hot-water storage tank 81a is a container for storing water as the aqueous medium for the hot water supply, a hot-water supply tube 83a for sending the aqueous medium as hot water to a faucet, shower, or the like is connected to the top of the hot-water storage tank 81a, and a water supply tube 84a for replenishing the aqueous medium expended by the hot-water supply tube 83a is connected to the bottom of the hot-water storage tank 81a.

The heat exchange coil 82a is provided inside the hot-water storage tank 81a, and is a heat exchanger for functioning as a heater of the aqueous medium in the hot-water storage tank 81a by exchanging heat between the aqueous medium circulating through the aqueous medium circuit 80a and the aqueous medium inside the hot-water storage tank 81a. The aqueous medium communication tube 16a is connected to the inlet of the heat exchange coil 82a, and the aqueous medium communication tube 15a is connected to the outlet thereof.

The hot-water storage unit 8a is thereby capable of heating the aqueous medium inside the hot-water storage tank 81a through the use of the aqueous medium circulating through the aqueous medium circuit 80a, which has been heated in the first usage unit 4a, and storing the heated aqueous medium as hot water. The type of hot-water storage unit 8a used herein is a hot-water storage unit for storing, in a hot-water storage tank, the aqueous medium heated by heat exchange with the aqueous medium heated in the first usage unit 4a, but a type of hot-water storage unit for storing an aqueous medium heated in the first usage unit 4a in a hot-water storage tank may also be used.

Various sensors are also provided to the hot-water storage unit 8a. Specifically, the hot-water storage unit 8a is provided with a hot-water storage temperature sensor 85a for detecting a hot-water storage temperature Twh, which is the temperature of the aqueous medium stored in the hot-water storage tank 81a.

—Hot-Water Air-Warming Unit—

The hot-water air-warming unit 9a is installed indoors, is connected to the first usage unit 4a via the aqueous medium communication tubes 15a, 16a, and constitutes a portion of the aqueous medium circuit 80a.

The hot-water air-warming unit 9a has primarily a heat exchange panel 91a, and is composed of a radiator and/or a floor heating panel and other components.

The heat exchange panel 91a is provided alongside a wall or elsewhere indoors when configured as a radiator, and is provided under the floor or elsewhere indoors when configured as a floor heating panel. The heat exchange panel 91a is a heat exchanger for functioning as a radiator or heater of the aqueous medium circulated through the aqueous medium circuit 80a, and the aqueous medium communication tube 16a is connected to the inlet of the heat exchange panel 91a, and the aqueous medium communication tube 15a is connected to the outlet of the heat exchange panel 91a.

—Aqueous Medium Communication Tubes—

The aqueous medium communication tube 15a is connected to the outlet of the heat exchange coil 82a of the hot-water storage unit 8a, and the outlet of the heat exchange panel 91a of the hot-water air-warming unit 9a. The aqueous medium communication tube 16a is connected to the inlet of the heat exchange coil 82a of the hot-water storage unit 8a, and the inlet of the heat exchange panel 91a of the hot-water air-warming unit 9a. The aqueous medium communication tube 16a is provided with an aqueous-medium-side switching mechanism 161a capable of switching between feeding the aqueous medium circulated through the aqueous medium circuit 80a to both the hot-water storage unit 8a and the hot-water air-warming unit 9a, or to any one of the hot-water storage unit 8a and the hot-water air-warming unit 9a. The aqueous-medium-side switching mechanism 161a is composed of a three-way valve.

—Second Usage Unit—

The second usage unit 10a is installed indoors, is connected to the heat source unit 2 via the refrigerant communication tubes 13, 14, and constitutes a portion of the heat-source-side refrigerant circuit 20.

The second usage unit 10a has primarily a second usage-side heat exchanger 101a and a second usage-side flow rate adjustment valve 102a.

The second usage-side heat exchanger 101a is a heat exchanger for functioning as a radiator or evaporator of the heat-source-side refrigerant by exchanging heat between the heat-source-side refrigerant and indoor air as the air medium, a second usage-side liquid refrigerant tube 103a is connected to the liquid side of the second usage-side heat exchanger 101a, and a second usage-side gas refrigerant tube 104a is connected to the gas side of the second usage-side heat exchanger 101a. The liquid refrigerant communication tube 13 is connected to the second usage-side liquid refrigerant tube 103a, and the gas refrigerant communication tube 14 is connected to the second usage-side gas refrigerant tube 104a. The air medium for exchanging heat with the heat-source-side refrigerant in the second usage-side heat exchanger 101a is fed by a usage-side fan 105a driven by a usage-side fan motor 106a.

The second usage-side flow rate adjustment valve 102a is an electrical expansion valve whereby the flow rate of heat-source-side refrigerant flowing through the second usage-side heat exchanger 101a can be varied by controlling the opening degree of the second usage-side flow rate adjustment valve 102a, and the second usage-side flow rate adjustment valve 102a is provided to the second usage-side liquid refrigerant tube 103a.

The second usage unit 10a is thereby configured so that an air-cooling operation can be performed in which the second usage-side heat exchanger 101a is caused to function as an evaporator of the heat-source-side refrigerant introduced from the liquid refrigerant communication tube 13 in the heat-source-side radiating operation state of the heat-source-side switching mechanism 23, whereby the heat-source-side refrigerant evaporated in the second usage-side heat exchanger 101a is directed to the gas refrigerant communication tube 14, and the air medium is cooled by evaporation of the heat-source-side refrigerant in the second usage-side heat exchanger 101a. The second usage unit 10a is also configured so that an air-warming operation can be performed in which the second usage-side heat exchanger 101a is caused to function as a radiator of the heat-source-side refrigerant introduced from the gas refrigerant communication tube 14 in the heat-source-side evaporating operation state of the heat-source-side switching mechanism 23, whereby the heat-source-side refrigerant radiated in the second usage-side heat exchanger 101a is directed to the liquid refrigerant communication tube 13, and the air medium is heated by radiation of the heat-source-side refrigerant in the second usage-side heat exchanger 101a.

Various sensors are provided to the second usage unit 10a. Specifically, the second usage unit 10a is provided with an outdoor temperature sensor 107a for detecting an outdoor temperature Tr.

<Operation>

The operation of the heat pump system 1 will next be described.

The operation modes of the heat pump system 1 include a hot-water supply operation mode for performing only the hot-water supply operation (i.e., operation of the hot-water storage unit 8a and/or the hot-water air-warming unit 9a) of the first usage unit 4a; an air-cooling operation mode for performing only the air-cooling operation of the second usage unit 10a; an air-warming operation mode for performing only the air-warming operation of the second usage unit 10a; a hot-water supply/air-warming operation mode for performing the hot-water supply operation of the first usage unit 4a as well as the air-warming operation of the second usage unit 10a; and a hot-water supply/air-cooling operation mode for performing the hot-water supply operation of the first usage unit 4a as well as the air-cooling operation of the second usage unit 10a.

The operation in the five operating modes of the heat pump system 1 will next be described.

—Hot-Water Supply Operation Mode—

In the case of performing only the hot-water supply operation of the first usage unit 4a, the heat-source-side switching mechanism 23 is switched to the heat-source-side evaporating operation state (indicated by dashed lines in the heat-source-side switching mechanism 23 in FIG. 1), and the intake return expansion valve 26a and the second usage-side flow rate adjustment valve 102a are closed in the heat-source-side refrigerant circuit 20. In the aqueous medium circuit 80a, the aqueous-medium-side switching mechanism 161a is switched to the state of feeding the aqueous medium to the hot-water storage unit 8a and/or the hot-water air-warming unit 9a.

In the heat-source-side refrigerant circuit 20 in such a state, the heat-source-side refrigerant at a low pressure in the refrigeration cycle is drawn into the heat-source-side compressor 21 through the heat-source-side intake tube 21c and compressed to a high pressure in the refrigeration cycle, and subsequently discharged to the heat-source-side discharge tube 21b. In the oil separator 22a, the refrigeration machine oil is separated from the high-pressure heat-source-side refrigerant discharged to the heat-source-side discharge tube 21b. The refrigeration machine oil separated from the heat-source-side refrigerant in the oil separator 22a is returned to the heat-source-side intake tube 21c through the oil return tube 22b. The high-pressure heat-source-side refrigerant from which the refrigeration machine oil has been separated is sent from the heat source unit 2 to the discharge refrigerant communication tube 12 through the heat-source-side discharge branch tube 21d and the discharge-side shutoff valve 31.

The high-pressure heat-source-side refrigerant sent to the discharge refrigerant communication tube 12 is sent to the first usage unit 4a. The high-pressure heat-source-side refrigerant sent to the first usage unit 4a is sent to the first usage-side heat exchanger 41a through the first usage-side discharge refrigerant tube 46a and the first usage-side discharge non-return valve 49a. The high-pressure heat-source-side refrigerant sent to the first usage-side heat exchanger 41a is heat-exchanged with the aqueous medium circulated through the aqueous medium circuit 80a by the circulation pump 43a and radiated in the first usage-side heat exchanger 41a. The high-pressure heat-source-side refrigerant radiated in the first usage-side heat exchanger 41a is sent from the first usage unit 4a to the liquid refrigerant communication tube 13 through the first usage-side flow rate adjustment valve 42a and the first usage-side liquid refrigerant tube 45a.

In the first usage unit 4a at this time, the opening degree of the first usage-side flow rate adjustment valve 42a is controlled so that the heat-source-side subcooling degree SC1 of the heat-source-side refrigerant in the outlet of the first usage-side heat exchanger 41a (i.e., the liquid side of the first usage-side heat exchanger 41a) is equal to a target heat-source-side refrigerant subcooling degree SC1s. In the present embodiment, the heat-source-side subcooling degree SC1 of the heat-source-side refrigerant in the outlet of the first usage-side heat exchanger 41a is the value obtained by subtracting the first usage-side refrigerant temperature Tsc1 from the heat-source-side discharge saturation temperature Tc1. The heat-source-side subcooling degree SC1 of the heat-source-side refrigerant in the outlet of the first usage-side heat exchanger 41a may be detected by converting the heat-source-side discharge pressure Pd1, which is the pressure of the heat-source-side refrigerant in the discharge of the heat-source-side compressor 21, to the saturation temperature that corresponds to the pressure value, and subtracting the refrigerant temperature value detected by the first usage-side heat exchange temperature sensor 50a from the saturation temperature of the refrigerant.

The heat-source-side refrigerant sent to the liquid refrigerant communication tube 13 is sent to the heat source unit 2. The heat-source-side refrigerant sent to the heat source unit 2 is sent to the subcooler 27 through the liquid-side shutoff valve 29. Since the heat-source-side refrigerant does not flow in the intake return tube 26, the heat-source-side refrigerant sent to the subcooler 27 is sent to the heat-source-side expansion valve 25 without exchanging heat. The heat-source-side refrigerant sent to the heat-source-side expansion valve 25 is depressurized in the heat-source-side expansion valve 25 to a low-pressure gas-liquid two-phase state, and sent to the heat-source-side heat exchanger 24 through the heat-source-side liquid refrigerant tube 24a. The low-pressure refrigerant sent to the heat-source-side heat exchanger 24 is heat-exchanged with the outdoor air fed by the heat-source-side fan 32 and evaporated in the heat-source-side heat exchanger 24. The low-pressure heat-source-side refrigerant evaporated in the heat-source-side heat exchanger 24 is sent to the heat-source-side accumulator 28 through the first heat-source-side gas refrigerant tube 23a and the heat-source-side switching mechanism 23. The low-pressure heat-source-side refrigerant sent to the heat-source-side accumulator 28 is again drawn into the heat-source-side compressor 21 through the heat-source-side intake tube 21c.

On the other hand, in the aqueous medium circuit 80a, the aqueous medium circulated through the aqueous medium circuit 80a is heated by radiation of the heat-source-side refrigerant in the first usage-side heat exchanger 41a. The aqueous medium heated in the first usage-side heat exchanger 41a is drawn into the circulation pump 43a through the first usage-side water outlet tube 48a and pressurized, and subsequently sent from the first usage unit 4a to the aqueous medium communication tube 16a. The aqueous medium sent to the aqueous medium communication tube 16a is sent to the hot-water storage unit 8a and/or the hot-water air-warming unit 9a through the aqueous-medium-side switching mechanism 161a. The aqueous medium sent to the hot-water storage unit 8a is heat-exchanged with the aqueous medium in the hot-water storage tank 81a and radiated in the heat exchange coil 82a, and the aqueous medium in the hot-water storage tank 81a is thereby heated. The aqueous medium sent to the hot-water air-warming unit 9a is radiated in the heat exchange panel 91a, the walls, the indoor floor and other indoor areas are thereby heated.

The operations in the hot-water supply operation mode for performing only the hot-water supply operation of the first usage unit 4a are thus performed.

—Air-Cooling Operation Mode—

In the case of performing only the air-cooling operation of the second usage unit 10a, the heat-source-side switching mechanism 23 is switched to the heat-source-side radiating operation state (indicated by solid lines in the heat-source-side switching mechanism 23 in FIG. 1), and the first usage-side flow rate adjustment valve 42a is closed in the heat-source-side refrigerant circuit 20.

In the heat-source-side refrigerant circuit 20 in such a state, the heat-source-side refrigerant at the low pressure in the refrigeration cycle is drawn into the heat-source-side compressor 21 through the heat-source-side intake tube 21c and compressed to the high pressure in the refrigeration cycle, and subsequently discharged to the heat-source-side discharge tube 21b. In the oil separator 22a, the refrigeration machine oil is separated from the high-pressure heat-source-side refrigerant discharged to the heat-source-side discharge tube 21b. The refrigeration machine oil separated from the heat-source-side refrigerant in the oil separator 22a is returned to the heat-source-side intake tube 21c through the oil return tube 22b. The high-pressure heat-source-side refrigerant from which the refrigeration machine oil has been separated is sent to the heat-source-side heat exchanger 24 through the heat-source-side switching mechanism 23 and the first heat-source-side gas refrigerant tube 23a. The high-pressure heat-source-side refrigerant sent to the heat-source-side heat exchanger 24 is heat-exchanged with the outdoor air fed by the heat-source-side fan 32 and radiated in the heat-source-side heat exchanger 24. The high-pressure heat-source-side refrigerant radiated in the heat-source-side heat exchanger is sent to the subcooler 27 through the heat-source-side expansion valve 25. The heat-source-side refrigerant sent to the subcooler 27 is heat-exchanged with the heat-source-side refrigerant diverted to the intake return tube 26 from the heat-source-side liquid refrigerant tube 24a, and is cooled to a subcooled state. The heat-source-side refrigerant flowing through the intake return tube 26 is returned to the heat-source-side intake tube 21c. The heat-source-side refrigerant cooled in the subcooler 27 is sent from the heat source unit 2 to the liquid refrigerant communication tube 13 through the heat-source-side liquid refrigerant tube 24a and the liquid-side shutoff valve 29.

The high-pressure heat-source-side refrigerant sent to the liquid refrigerant communication tube 13 is sent to the second usage unit 10a. The high-pressure heat-source-side refrigerant sent to the second usage unit 10a is sent to the second usage-side flow rate adjustment valve 102a. The high-pressure heat-source-side refrigerant sent to the second usage-side flow rate adjustment valve 102a is depressurized in the second usage-side flow rate adjustment valve 102a to a low-pressure gas-liquid two-phase state, and sent to the second usage-side heat exchanger 101a through the second usage-side liquid refrigerant tube 103a.

In the second usage unit 10a at this time, the opening degree of the second usage-side flow rate adjustment valve 102a is controlled so that the heat-source-side superheat degree SH1 of the heat-source-side refrigerant in the outlet of the second usage-side heat exchanger 101a (i.e., the gas side of the second usage-side heat exchanger 101a) is constant at a target superheat degree SH1s. In the present embodiment, the heat-source-side superheat degree SH1 is detected by subtracting the refrigerant temperature value (corresponding to the heat-source-side evaporation temperature Te) detected by a second usage-side liquid-side temperature sensor 108a from the refrigerant temperature value detected by a second usage-side gas-side temperature sensor 109a, or is detected by converting the heat-source-side intake pressure Ps1 of the compressor 21 detected by the heat-source-side intake pressure sensor 33 to the saturation temperature value that corresponds to the heat-source-side evaporation temperature Te1, and subtracting the saturation temperature value of the refrigerant from the refrigerant temperature value detected by the second usage-side gas-side temperature sensor 109a. A configuration may be adopted in which a temperature sensor is provided for detecting the temperature of the refrigerant flowing inside the second usage-side heat exchanger 101a, and the heat-source-side superheat degree SH1 of the heat-source-side refrigerant in the outlet of the second usage-side heat exchanger 101a is detected by subtracting the refrigerant temperature value that corresponds to the heat-source-side evaporation temperature Te1 detected by the temperature sensor from the refrigerant temperature value detected by the second usage-side gas-side temperature sensor 109a.

The low-pressure heat-source-side refrigerant sent to the second usage-side heat exchanger 101a is heat-exchanged and evaporated in the second usage-side heat exchanger 101a with the air medium fed by the usage-side fan 105a, and indoor air-cooling is thereby performed. The low-pressure heat-source-side refrigerant evaporated in the second usage-side heat exchanger 101a is sent from the second usage unit 10a to the gas refrigerant communication tube 14 through the second usage-side gas refrigerant tube 104a.

The low-pressure heat-source-side refrigerant sent to the gas refrigerant communication tube 14 is sent to the heat source unit 2. The low-pressure heat-source-side refrigerant sent to the heat source unit 2 is sent to the heat-source-side accumulator 28 through the gas-side shutoff valve 30, the second heat-source-side gas refrigerant tube 23b, and the heat-source-side switching mechanism 23. The low-pressure heat-source-side refrigerant sent to the heat-source-side accumulator 28 is again drawn into the heat-source-side compressor 21 through the heat-source-side intake tube 21c.

The operations in the air-cooling operation mode for performing only the air-cooling operation of the second usage unit 10a are thus performed.

—Air-Warming Operation Mode—

In the case of performing only the air-warming operation of the second usage unit 10a, the heat-source-side switching mechanism 23 is switched to the heat-source-side radiating operation state (indicated by dashed lines in the heat-source-side switching mechanism 23 in FIG. 1), and the intake return expansion valve 26a and the first usage-side flow rate adjustment valve 42a are closed in the heat-source-side refrigerant circuit 20.

In the heat-source-side refrigerant circuit 20 in such a state, the heat-source-side refrigerant at a low pressure in the refrigeration cycle is drawn into the heat-source-side compressor 21 through the heat-source-side intake tube 21c and compressed to a high pressure in the refrigeration cycle, and subsequently discharged to the heat-source-side discharge tube 21b. In the oil separator 22a, the refrigeration machine oil is separated from the high-pressure heat-source-side refrigerant discharged to the heat-source-side discharge tube 21b. The refrigeration machine oil separated from the heat-source-side refrigerant in the oil separator 22a is returned to the heat-source-side intake tube 21c through the oil return tube 22b. The high-pressure heat-source-side refrigerant from which the refrigeration machine oil has been separated is sent from the heat source unit 2 to the gas refrigerant communication tube 14 through the heat-source-side switching mechanism 23, the second heat-source-side gas refrigerant tube 23b, and the gas-side shutoff valve 30.

The high-pressure heat-source-side refrigerant sent to the gas refrigerant communication tube 14 is sent to the second usage unit 10a. The high-pressure heat-source-side refrigerant sent to the second usage unit 10a is sent to the second usage-side heat exchanger 101a through the second usage-side gas refrigerant tube 104a. The high-pressure heat-source-side refrigerant sent to the second usage-side heat exchanger 101a is heat-exchanged with the air medium fed by the usage-side fan 105a and radiated in the second usage-side heat exchanger 101a, and indoor air warming is thereby performed. The high-pressure heat-source-side refrigerant radiated in the second usage-side heat exchanger 101a is sent from the second usage unit 10a to the liquid refrigerant communication tube 13 through the second usage-side flow rate adjustment valve 102a and the second usage-side liquid refrigerant tube 103a.

In the second usage unit 10a, the opening degree of the second usage-side flow rate adjustment valve 102a is controlled so that the heat-source-side subcooling degree SC11 of the heat-source-side refrigerant in the outlet of the second usage-side heat exchanger 101a (i.e., the liquid side of the second usage-side heat exchanger 101a) is constant at a target heat-source-side subcooling degree SC11s. In the present embodiment, the heat-source-side subcooling degree SC11 of the heat-source-side refrigerant in the outlet of the second usage-side heat exchanger 101a is detected by converting the heat-source-side discharge pressure Pd of the heat-source-side compressor 21 detected by the heat-source-side discharge pressure sensor 34 to the saturation temperature value that corresponds to the condensing temperature Tc, and subtracting the refrigerant temperature value detected by the second usage-side liquid-side temperature sensor 108a from the saturation temperature value of the heat-source-side refrigerant. A configuration may be adopted in which a temperature sensor is provided for detecting the temperature of the refrigerant flowing inside the second usage-side heat exchanger 101a, and the subcooling degree SC11 of the refrigerant in the outlet of the second usage-side heat exchanger 101a is detected by subtracting the refrigerant temperature value that corresponds to the condensing temperature Tc detected by the temperature sensor from the refrigerant temperature value detected by the second usage-side liquid-side temperature sensor 108a.

The heat-source-side refrigerant sent to the liquid refrigerant communication tube 13 is sent to the heat source unit 2. The heat-source-side refrigerant sent to the heat source unit 2 is sent to the subcooler 27 through the liquid-side shutoff valve 29. Since the heat-source-side refrigerant does not flow in the intake return tube 26, the heat-source-side refrigerant sent to the subcooler 27 is sent to the heat-source-side expansion valve 25 without exchanging heat. The heat-source-side refrigerant sent to the heat-source-side expansion valve 25 is depressurized in the heat-source-side expansion valve 25 to a low-pressure gas-liquid two-phase state, and sent to the heat-source-side heat exchanger 24 through the heat-source-side liquid refrigerant tube 24a. The low-pressure refrigerant sent to the heat-source-side heat exchanger 24 is heat-exchanged with the outdoor air fed by the heat-source-side fan 32 and evaporated in the heat-source-side heat exchanger 24. The low-pressure heat-source-side refrigerant evaporated in the heat-source-side heat exchanger 24 is sent to the heat-source-side accumulator 28 through the first heat-source-side gas refrigerant tube 23a and the heat-source-side switching mechanism 23. The low-pressure heat-source-side refrigerant sent to the heat-source-side accumulator 28 is again drawn into the heat-source-side compressor 21 through the heat-source-side intake tube 21c.

The operations in the air-warming operation mode for performing only the air-warming operation of the second usage unit 10a are thus performed.

—Hot-Water Supply/Air-Warming Operation Mode—

In the case of performing the hot-water supply operation of the first usage unit 4a as well as the air-warming operation of the second usage unit 10a, the heat-source-side switching mechanism 23 is switched to the heat-source-side evaporating operation state (indicated by dashed lines in the heat-source-side switching mechanism 23 in FIG. 1), and the intake return expansion valve 26a is closed in the heat-source-side refrigerant circuit 20. In the aqueous medium circuit 80a, the aqueous-medium-side switching mechanism 161a is switched to a state in which the aqueous medium is fed to the hot-water storage unit 8a and/or the hot-water air-warming unit 9a.

In the heat-source-side refrigerant circuit 20 in such a state, the heat-source-side refrigerant at a low pressure in the refrigeration cycle is drawn into the heat-source-side compressor 21 through the heat-source-side intake tube 21c and compressed to a high pressure in the refrigeration cycle, and subsequently discharged to the heat-source-side discharge tube 21b. In the oil separator 22a, the refrigeration machine oil is separated from the high-pressure heat-source-side refrigerant discharged to the heat-source-side discharge tube 21b. The refrigeration machine oil separated from the heat-source-side refrigerant in the oil separator 22a is returned to the heat-source-side intake tube 21c through the oil return tube 22b. A portion of the high-pressure heat-source-side refrigerant from which the refrigeration machine oil has been separated is sent from the heat source unit 2 to the discharge refrigerant communication tube 12 through the heat-source-side discharge branch tube 21d and the discharge-side shutoff valve 31, and the remainder is sent from the heat source unit 2 to the gas refrigerant communication tube 14 through the second heat-source-side gas refrigerant tube 23b and the gas-side shutoff valve 30.

The high-pressure heat-source-side refrigerant sent to the gas refrigerant communication tube 14 is sent to the second usage unit 10a. The high-pressure heat-source-side refrigerant sent to the second usage unit 10a is sent to the second usage-side heat exchanger 101a through the second usage-side gas refrigerant tube 104a. The high-pressure heat-source-side refrigerant sent to the second usage-side heat exchanger 101a is heat-exchanged with the air medium fed by the usage-side fan 105a and radiated in the second usage-side heat exchanger 101a, and indoor air warming is thereby performed. The high-pressure heat-source-side refrigerant radiated in the second usage-side heat exchanger 101a is sent from the second usage unit 10a to the liquid refrigerant communication tube 13 through the second usage-side flow rate adjustment valve 102a and the second usage-side liquid refrigerant tube 103a.

In the second usage unit 10a at this time, the opening degree of the second usage-side flow rate adjustment valve 102a is controlled so that the heat-source-side subcooling degree SC11 of the heat-source-side refrigerant in the outlet of the second usage-side heat exchanger 101a (i.e., the liquid side of the second usage-side heat exchanger 101a) is constant at the target heat-source-side subcooling degree SC11s.

The high-pressure heat-source-side refrigerant sent to the discharge refrigerant communication tube 12 is sent to the first usage unit 4a. The high-pressure heat-source-side refrigerant sent to the first usage unit 4a is sent to the first usage-side heat exchanger 41a through the first usage-side discharge refrigerant tube 46a and the first usage-side discharge non-return valve 49a. The high-pressure heat-source-side refrigerant sent to the first usage-side heat exchanger 41a is heat-exchanged with the aqueous medium circulated through the aqueous medium circuit 80a by the circulation pump 43a and radiated in the first usage-side heat exchanger 41a. The high-pressure heat-source-side refrigerant radiated in the first usage-side heat exchanger 41a is sent from the first usage unit 4a to the liquid refrigerant communication tube 13 through the first usage-side flow rate adjustment valve 42a and the first usage-side liquid refrigerant tube 45a.

In the first usage unit 4a at this time, the opening degree of the first usage-side flow rate adjustment valve 42a is controlled so that the heat-source-side subcooling degree SC1 of the heat-source-side refrigerant in the outlet of the first usage-side heat exchanger 41a (i.e., the liquid side of the first usage-side heat exchanger 41a) is constant at the subcooling degree target value SC1s.

The heat-source-side refrigerant sent from the second usage unit 10a and the first usage unit 4a to the liquid refrigerant communication tube 13 merges in the liquid refrigerant communication tube 13, and is sent to the heat source unit 2. The heat-source-side refrigerant sent to the heat source unit 2 is sent to the subcooler 27 through the liquid-side shutoff valve 29. Since the heat-source-side refrigerant does not flow in the intake return tube 26, the heat-source-side refrigerant sent to the subcooler 27 is sent to the heat-source-side expansion valve 25 without exchanging heat. The heat-source-side refrigerant sent to the heat-source-side expansion valve 25 is depressurized in the heat-source-side expansion valve 25 to a low-pressure gas-liquid two-phase state and sent to the heat-source-side heat exchanger 24 through the heat-source-side liquid refrigerant tube 24a. The low-pressure refrigerant sent to the heat-source-side heat exchanger 24 is heat-exchanged with the outdoor air fed by the heat-source-side fan 32 and evaporated in the heat-source-side heat exchanger 24. The low-pressure heat-source-side refrigerant evaporated in the heat-source-side heat exchanger 24 is sent to the heat-source-side accumulator 28 through the first heat-source-side gas refrigerant tube 23a and the heat-source-side switching mechanism 23. The low-pressure heat-source-side refrigerant sent to the heat-source-side accumulator 28 is again drawn into the heat-source-side compressor 21 through the heat-source-side intake tube 21c.

In the aqueous medium circuit 80a, the aqueous medium circulated through the aqueous medium circuit 80a is heated by the radiating of the heat-source-side refrigerant in the first usage-side heat exchanger 41a. The aqueous medium heated in the first usage-side heat exchanger 41a is drawn into the circulation pump 43a through the first usage-side water outlet tube 48a and pressurized, and subsequently sent from the first usage unit 4a to the aqueous medium communication tube 16a. The aqueous medium sent to the aqueous medium communication tube 16a is sent to the hot-water storage unit 8a and/or the hot-water air-warming unit 9a through the aqueous-medium-side switching mechanism 161a. The aqueous medium sent to the hot-water storage unit 8a is heat-exchanged with the aqueous medium in the hot-water storage tank 81a and radiated in the heat exchange coil 82a, and the aqueous medium in the hot-water storage tank 81a is thereby heated. The aqueous medium sent to the hot-water air-warming unit 9a is radiated in the heat exchange panel 91a, the walls and other indoor areas are thereby heated, and the indoor floor is heated.

The operations in the hot-water supply/air-warming operation mode for performing the hot-water supply operation of the first usage unit 4a as well as the air-warming operation of the second usage unit 10a are thus performed.

—Hot-Water Supply/Air-Cooling Operation Mode—

In the case of performing the hot-water supply operation of the first usage unit 4a as well as the air-cooling operation of the second usage unit 10a, the heat-source-side switching mechanism 23 is switched to the heat-source-side radiating operation state (indicated by solid lines in the heat-source-side switching mechanism 23 in FIG. 1) in the heat-source-side refrigerant circuit 20. In the aqueous medium circuit 80a, the aqueous-medium-side switching mechanism 161a is switched to a state in which the aqueous medium is fed to the hot-water storage unit 8a.

In the heat-source-side refrigerant circuit 20 in such a state, the heat-source-side refrigerant at a low pressure in the refrigeration cycle is drawn into the heat-source-side compressor 21 through the heat-source-side intake tube 21c and compressed to a high pressure in the refrigeration cycle, and subsequently discharged to the heat-source-side discharge tube 21b. In the oil separator 22a, the refrigeration machine oil is separated from the high-pressure heat-source-side refrigerant discharged to the heat-source-side discharge tube 21b. The refrigeration machine oil separated from the heat-source-side refrigerant in the oil separator 22a is returned to the heat-source-side intake tube 21c through the oil return tube 22b. A portion of the high-pressure heat-source-side refrigerant from which the refrigeration machine oil has been separated is sent from the heat source unit 2 to the discharge refrigerant communication tube 12 through the heat-source-side discharge branch tube 21d and the discharge-side shutoff valve 31, and the remainder is sent to the heat-source-side heat exchanger 24 through the heat-source-side switching mechanism 23 and the first heat-source-side gas refrigerant tube 23a. The high-pressure heat-source-side refrigerant sent to the heat-source-side heat exchanger 24 is heat-exchanged with the outdoor air fed by the heat-source-side fan 32 and radiated in the heat-source-side heat exchanger 24. The high-pressure heat-source-side refrigerant radiated in the heat-source-side heat exchanger is sent to the subcooler 27 through the heat-source-side expansion valve 25. The heat-source-side refrigerant sent to the subcooler 27 is heat-exchanged with the heat-source-side refrigerant diverted to the intake return tube 26 from the heat-source-side liquid refrigerant tube 24a, and is cooled to a subcooled state. The heat-source-side refrigerant flowing through the intake return tube 26 is returned to the heat-source-side intake tube 21c. The heat-source-side refrigerant cooled in the subcooler 27 is sent from the heat source unit 2 to the liquid refrigerant communication tube 13 through the heat-source-side liquid refrigerant tube 24a and the liquid-side shutoff valve 29.

The high-pressure heat-source-side refrigerant sent to the discharge refrigerant communication tube 12 is sent to the first usage unit 4a. The high-pressure heat-source-side refrigerant sent to the first usage unit 4a is sent to the first usage-side heat exchanger 41a through the first usage-side discharge refrigerant tube 46a and the first usage-side discharge non-return valve 49a. The high-pressure heat-source-side refrigerant sent to the first usage-side heat exchanger 41a is heat-exchanged with the aqueous medium circulated through the aqueous medium circuit 80a by the circulation pump 43a and radiated in the first usage-side heat exchanger 41a. The high-pressure heat-source-side refrigerant radiated in the first usage-side heat exchanger 41a is sent from the first usage unit 4a to the liquid refrigerant communication tube 13 through the first usage-side flow rate adjustment valve 42a and the first usage-side liquid refrigerant tube 45a.

In the first usage unit 4a at this time, the opening degree of the first usage-side flow rate adjustment valve 42a is controlled so that the heat-source-side subcooling degree SC1 of the heat-source-side refrigerant in the outlet of the first usage-side heat exchanger 41a (i.e., the liquid side of the first usage-side heat exchanger 41a) is constant at the subcooling degree target value SC1s.

The heat-source-side refrigerant sent from the heat source unit 2 and the first usage unit 4a to the liquid refrigerant communication tube 13 merges in the liquid refrigerant communication tube 13, and is sent to the second usage unit 10a. The heat-source-side refrigerant sent to the second usage unit 10a is sent to the second usage-side flow rate adjustment valve 102a. The heat-source-side refrigerant sent to the second usage-side flow rate adjustment valve 102a is depressurized in the second usage-side flow rate adjustment valve 102a to a low-pressure gas-liquid two-phase state and sent to the second usage-side heat exchanger 101a through the second usage-side liquid refrigerant tube 103a. The low-pressure heat-source-side refrigerant sent to the second usage-side heat exchanger 101a is heat-exchanged with the air medium fed by the usage-side fan 105a and evaporated in the second usage-side heat exchanger 101a, and indoor air-cooling is thereby performed. The low-pressure heat-source-side refrigerant evaporated in the second usage-side heat exchanger 101a is sent from the second usage unit 10a to the gas refrigerant communication tube 14 through the second usage-side gas refrigerant tube 104a.

In the second usage unit 10a at this time, the opening degree of the second usage-side flow rate adjustment valve 102a is controlled based on the heat-source-side superheat degree SH1 of the second usage-side heat exchanger 101a (i.e., the temperature difference between the heat-source-side refrigerant temperature detected by the second usage-side liquid-side temperature sensor 108a and the heat-source-side refrigerant temperature detected by the second usage-side gas-side temperature sensor 109a), or is otherwise controlled in accordance with the air-cooling load of the second usage unit 10a.

The low-pressure heat-source-side refrigerant sent to the gas refrigerant communication tube 14 is sent to the heat source unit 2. The low-pressure heat-source-side refrigerant sent to the heat source unit 2 is sent to the heat-source-side accumulator 28 through the gas-side shutoff valve 30, the second heat-source-side gas refrigerant tube 23b, and the heat-source-side switching mechanism 23. The low-pressure heat-source-side refrigerant sent to the heat-source-side accumulator 28 is again drawn into the heat-source-side compressor 21 through the heat-source-side intake tube 21c.

On the other hand, in the aqueous medium circuit 80a, the aqueous medium circulated through the aqueous medium circuit 80a is heated by radiation of the heat-source-side refrigerant in the first usage-side heat exchanger 41a. The aqueous medium heated in the first usage-side heat exchanger 41a is drawn into the circulation pump 43a through the first usage-side water outlet tube 48a and pressurized, and subsequently sent from the first usage unit 4a to the aqueous medium communication tube 16a. The aqueous medium sent to the aqueous medium communication tube 16a is sent to the hot-water storage unit 8a through the aqueous-medium-side switching mechanism 161a. The aqueous medium sent to the hot-water storage unit 8a is heat-exchanged with the aqueous medium in the hot-water storage tank 81a and radiated in the heat exchange coil 82a, and the aqueous medium in the hot-water storage tank 81a is thereby heated.

The operations in the hot-water supply/air-cooling operation mode for performing the hot-water supply operation of the first usage unit 4a as well as the air-cooling operation of the second usage unit 10a are thus performed.

—Control of the Circulation Rate of Refrigerant in the Hot-Water Supply/Air-Cooling Operation Mode—

Refrigerant circulation control of the heat-source-side refrigerant flowing through the heat-source-side refrigerant circuit 20 in the hot-water supply/air-cooling operation mode described above will next be described, using a case in which the load (hot-water supply load) pertaining to heating the aqueous medium in the first usage unit is greater than the air-cooling load in the second usage unit, and a case in which there is insufficient refrigerant in the second usage unit.

(1) A Case in which the Hot-Water Supply Load Greater than the Air-Cooling Load

In the case of the hot-water supply/air-cooling operation mode described above, by heating the aqueous medium even without utilizing heat via the aqueous medium (e.g., utilizing hot-water supply), it is possible to utilize waste heat that occurs on the radiator side during air-cooling operation by the second usage unit. However, in a case in which air-cooling operation by the second usage unit 10a is the main object, and hot-water supply operation by the first usage unit 4a is performed as waste heat recovery which accompanies air-cooling operation by the second usage unit 10a to enhance the energy efficiency, in operating conditions in which the temperature of the aqueous medium is low, such as immediately after the start of air-cooling operation by the second usage unit 10a and hot-water supply operation by the first usage unit 4a, the hot-water supply load is often greater than the air-cooling load, due to the low temperature of the aqueous medium.

When air-cooling operation by the second usage unit 10a is continued at this time in accordance with the hot-water supply load, an excessive amount of energy is required in relation to the air-cooling load, and efficiency is poor. Consequently, to prevent this situation, the hot-water supply load must be adapted to the air-cooling load.

When the hot-water supply/air-cooling operation mode is performed in this heat pump system 1, the heat-source-side heat exchanger 24 and the first usage-side heat exchanger 41a function as radiators, and the second usage-side heat exchanger 101a functions as an evaporator. There are thereby two heat exchangers that function as radiators, and the heat exchangers 24, 41a functioning as radiators are in a parallel relationship to the second usage-side heat exchanger 101a functioning an evaporator.

Consequently, in operating conditions (e.g., conditions in which the temperature of the aqueous medium is lower than the outside air temperature) in which the temperature of the aqueous medium is low, such as immediately after the start of operation by the first usage unit 4a, the heat-source-side refrigerant flowing into the heat exchangers that function as radiators is prone to stagnate in the first usage-side heat exchanger 41a, since the pressure of the heat-source-side refrigerant in the first usage-side heat exchanger 41a is lower than the pressure of the heat-source-side refrigerant in the heat-source-side heat exchanger 24. In this case, in the first usage-side heat exchanger 41a, since the opening degree of the first usage-side flow rate adjustment valve 42a is controlled so that the heat-source-side subcooling degree SC1 of the heat-source-side refrigerant in the outlet of the first usage-side heat exchanger 41a (i.e., the liquid side of the first usage-side heat exchanger 41a) is constant at the target heat-source-side refrigerant subcooling degree SC1s, the first usage-side flow rate adjustment valve 42a opens when the heat-source-side refrigerant stagnates in the first usage-side heat exchanger 41a. Taking advantage of this effect, when the first usage-side flow rate adjustment valve 42a is open more than a predetermined opening degree in the heat pump system 1, the hot-water supply load is determined to be large, and the capacity of the circulation pump 43a is controlled so that the flow rate of the aqueous medium circulated through the aqueous medium circuit 80a decreases.

(2) A Case in which there is Insufficient Refrigerant in the Second Usage Unit

The operation described in (1) is performed only in conditions in which the temperature of the aqueous medium is low, and is therefore often performed at least at the start of hot-water supply operation. The aqueous medium is heated considerably when air-cooling operation is performed by the second usage unit 10a, even in a state in which the capacity of the circulation pump 43a is controlled as described above. The temperature of the aqueous medium therefore gradually increases, and operating conditions occur in which the temperature of the aqueous medium is high (e.g., conditions in which the temperature of the aqueous medium is higher than the outside air temperature). At this time, the heat-source-side refrigerant flowing into the heat exchangers that function as radiators is prone to stagnate in the heat-source-side heat exchanger 24, since the pressure of the heat-source-side refrigerant in the first usage-side heat exchanger 41a is higher than the pressure of the heat-source-side refrigerant in the heat-source-side heat exchanger 24. In this state, the heat exchange capability of the heat-source-side heat exchanger 24 is excessive, and the amount of heat-source-side refrigerant flowing through the second usage-side heat exchanger 101a decreases. In this case, in the second usage unit 10a, since the opening degree of the second usage-side flow rate adjustment valve 102a is controlled based on the heat-source-side superheat degree SH1 (i.e., the temperature difference between the heat-source-side refrigerant temperature detected by the second usage-side liquid-side temperature sensor 108a and the heat-source-side refrigerant temperature detected by the second usage-side gas-side temperature sensor 109a) of the second usage-side heat exchanger 101a, the second usage-side flow rate adjustment valve 102a opens when the heat-source-side refrigerant stagnates in the heat-source-side heat exchanger 24. Taking advantage of this effect, when the second usage-side flow rate adjustment valve 102a is open more than a predetermined opening degree in the heat pump system 1, the heat exchange capability pertaining to the heat-source-side heat exchanger 24 is determined to be excessive, and the rotation speed of the heat-source-side fan motor 32a is controlled so that the airflow rate of the heat-source-side fan 32 decreases.

<Characteristics>

The heat pump system 1 has the following characteristics.

—A—

In a case in which the heat-source-side refrigerant stagnates in the heat-source-side heat exchanger 24, and the amount of refrigerant that flows into the second usage unit 10a is inadequate, the opening degree of the second usage-side flow rate adjustment valve 102a is likely to be greater than at least a predetermined opening degree, but by controlling the operating capacity of the heat-source-side fan 32 in accordance with the state of the second usage-side flow rate adjustment valve 102a, the heat-source-side refrigerant that is stagnated in the heat-source-side heat exchanger 24 can be directed to the second usage unit 10a to overcome the problem of an inadequate amount of refrigerant in the second usage unit 10a. In a case in which there is a large hot-water supply load in the first usage unit 4a, a state readily occurs in which the heat-source-side refrigerant stagnates in the first usage-side heat exchanger 41a, and the opening degree of the first usage-side flow rate adjustment valve 42a is likely to be greater than at least a predetermined opening degree, but by controlling the capacity of the circulation pump 43a in accordance with the state of the first usage-side flow rate adjustment valve 42a, the heat-source-side refrigerant can be made less prone to stagnate in the first usage-side heat exchanger 41a.

Consequently, the heat-source-side refrigerant can be prevented from stagnating in a specific heat exchanger among the heat exchangers which function as radiators. It is therefore possible to prevent the heat exchange efficiency from decreasing due to stagnation of the heat-source-side refrigerant in a specific heat exchanger.

—B—

In the case of performing the air-cooling operation of the second usage unit 10a, by heating the aqueous medium without utilizing heat via the aqueous medium (e.g., utilizing hot-water supply), it is possible to utilize waste heat that occurs on the radiator side during air-cooling operation by the second usage unit 10a. However, in a case in which air-cooling operation by the second usage unit 10a is the main object, and waste heat recovery is performed which accompanies air-cooling operation by the second usage unit 10a to enhance the energy efficiency of aqueous-medium heating operation in the first usage unit 4a, in operating conditions in which the temperature of the aqueous medium is low, such as immediately after the start of air-cooling operation by the second usage unit 10a and operation by the first usage unit 4a, the hot-water supply load is often greater than the air-cooling load, due to the low temperature of the aqueous medium. When air-cooling operation by the second usage unit 10a is continued in accordance with the hot-water supply load at this time, an excessive amount of energy is required in relation to the air-cooling load, and efficiency is poor. Consequently, to prevent this situation, the hot-water supply load must be adapted to the air-cooling load pertaining to the second usage unit 10a.

In this heat pump system 1, subcooling-degree fixing control is performed for fixing the degree of subcooling of the heat-source-side refrigerant in the first usage-side heat exchanger 41a at a predetermined degree of subcooling by adjusting the opening degree of the first usage-side flow rate adjustment valve 42a. Consequently, the opening degree of the first usage-side flow rate adjustment valve 42a increases in the case that the hot-water supply load in the first usage unit 4a is larger than the air-cooling load in the second usage unit 10a.

Therefore, in this heat pump system 1, a variable-capacity circulation pump 43a is provided, and in a case in which the first usage-side flow rate adjustment valve 42a reaches an opening degree equal to or greater than a predetermined opening degree, the hot-water supply load in the first usage unit 4a is determined to be larger than the air-cooling load in the second usage unit 10a, and the capacity of the circulation pump 43a is controlled so that the flow rate of the aqueous medium circulated through the aqueous medium circuit 80a decreases.

The hot-water supply load in the first usage unit 4a can thereby be kept low, and the hot-water supply load in the first usage unit 4a can be made smaller than the air-cooling load in the second usage unit 10a. Consequently, it is possible to prevent the operating efficiency of waste heat recovery in the first usage unit 4a from decreasing while air-cooling operation is performed by the second usage unit 10a.

(1) Modification 1

Figure 2:
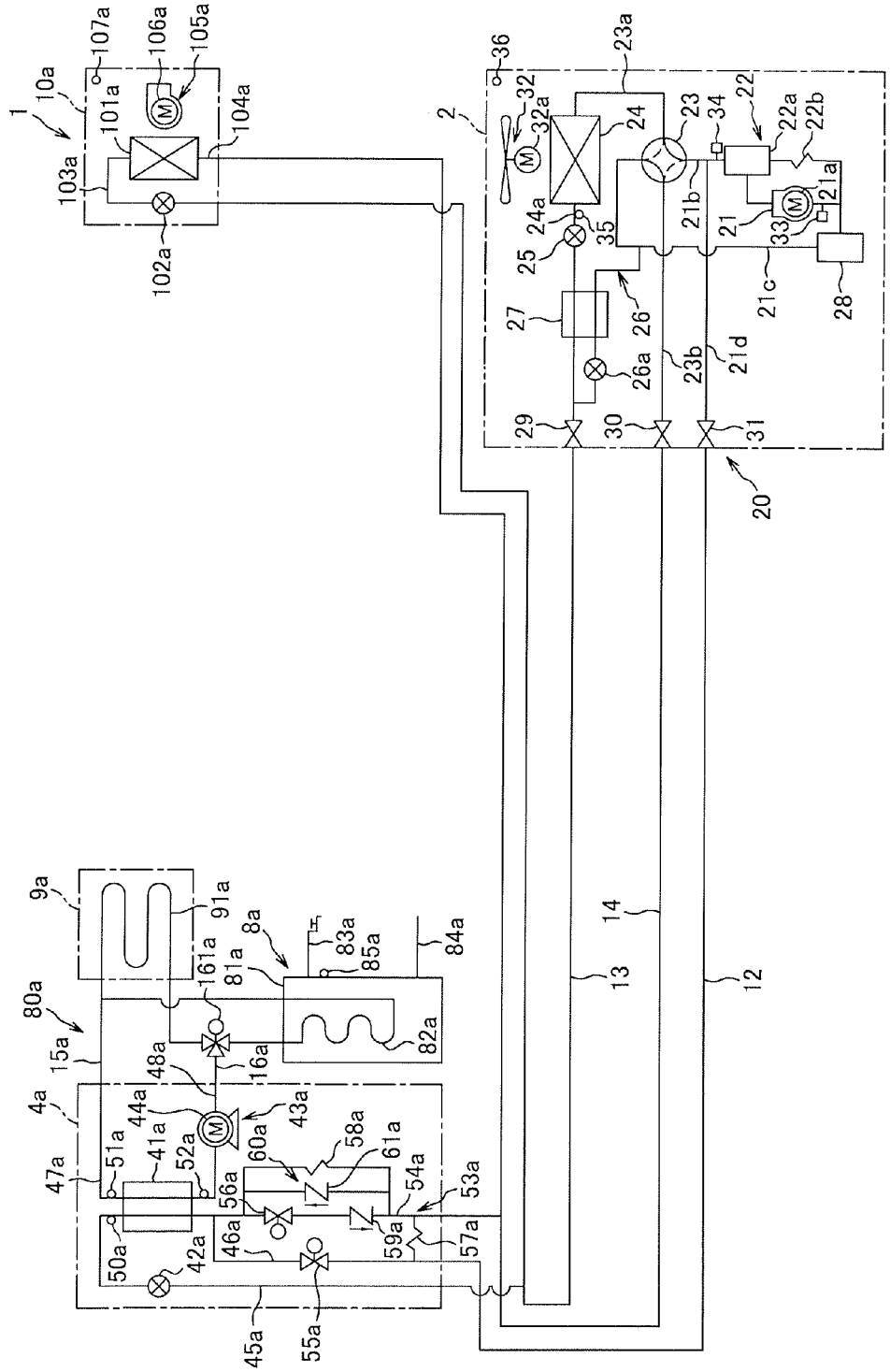
FIG. 2 is a view showing the general configuration of the heat pump system according to Modification 1 of the first embodiment.

In the heat pump system 1 (see FIG. 1) described above, hot-water supply operation is possible in which the first usage-side heat exchanger 41a is made to function as a radiator of the heat-source-side refrigerant, and the aqueous medium is thereby heated, but, as shown in FIG. 2, it is possible to further connect the first usage unit 4a to the gas refrigerant communication tube 14 and to further provide a first usage-side switching mechanism 53a capable of switching between an aqueous medium heating operation state in which the first usage-side heat exchanger 41a is made to function as a radiator of the heat-source-side refrigerant introduced from the discharge refrigerant communication tube 12, and an aqueous medium cooling operation state in which the first usage-side heat exchanger 41a is made to function as an evaporator of the heat-source-side refrigerant introduced from the liquid refrigerant communication tube 13; to enable operation (hot-water supply operation) to be performed in which the heat-source-side refrigerant radiated in the first usage-side heat exchanger 41a is directed to the liquid refrigerant communication tube 13, and the aqueous medium is heated by radiation of the heat-source-side refrigerant in the first usage-side heat exchanger 41a in the aqueous medium heating operation state of the first usage-side switching mechanism 53a; and to enable operation to be performed in which the heat-source-side refrigerant evaporated in the first usage-side heat exchanger 41a is directed to the gas refrigerant communication tube 14, and the aqueous medium is cooled by evaporation of the heat-source-side refrigerant in the first usage-side heat exchanger 41a in the aqueous medium cooling operation state of the first usage-side switching mechanism 53a.

The first usage-side discharge refrigerant tube 46a as well as a first usage-side gas refrigerant tube 54a are connected to the gas side of the flow passage through which the heat-source-side refrigerant flows in the first usage-side heat exchanger 41a. The gas refrigerant communication tube 14 is connected to the first usage-side gas refrigerant tube 54a. The first usage-side switching mechanism 53a has a first usage-side discharge on-off valve 55a (in this case, the first usage-side discharge non-return valve 49a is omitted) provided to the first usage-side discharge refrigerant tube 46a, and a first usage-side gas on-off valve 56a provided to the first usage-side gas refrigerant tube 54a; and by opening the first usage-side discharge on-off valve 55a and closing the first usage-side gas on-off valve 56a, the first usage-side switching mechanism 53a is placed in the aqueous medium heating operation state, and by closing the first usage-side discharge on-off valve 55a and opening the first usage-side gas on-off valve 56a, the first usage-side switching mechanism 53a is placed in the aqueous medium cooling operation state. The first usage-side discharge on-off valve 55a and the first usage-side gas on-off valve 56a are composed of solenoid valves, both being capable of on-off control. The first usage-side switching mechanism 53a may be configured using a three-way valve or the like.

The first usage-side switching mechanism 53a is also provided with a first refrigerant recovery mechanism 57a for placing the discharge refrigerant communication tube 12 and the gas refrigerant communication tube 14 in communication with each other in any of the aqueous medium heating operation state and the aqueous medium cooling operation state; and a second refrigerant recovery mechanism 58a for placing the first usage-side heat exchanger 41a and the gas refrigerant communication tube 14 in communication with each other. The first usage-side gas refrigerant tube 54a is also provided with a first usage-side gas non-return valve 59a and a first usage-side bypass refrigerant tube 60a, and the first usage-side discharge on-off valve 55a and the first usage-side gas on-off valve 56a together constitute the first usage-side switching mechanism 53a.

The first refrigerant recovery mechanism 57a is a refrigerant tube having a capillary tube, and is configured so that one end thereof is connected to a portion of the first usage-side discharge refrigerant tube 46a which connects the first usage-side discharge on-off valve 55a and the discharge refrigerant communication tube 12, and the other end is connected to a portion of the first usage-side gas refrigerant tube 54a which connects the first usage-side gas on-off valve 56a and the gas refrigerant communication tube 14, and the first refrigerant recovery mechanism 57a places the discharge refrigerant communication tube 12 and the gas refrigerant communication tube 14 in communication with each other regardless of the on/off state of the first usage-side discharge on-off valve 55a or the first usage-side gas on-off valve 56a. In this heat pump system 1, the heat-source-side refrigerant is thereby made less likely to stagnate in the discharge refrigerant communication tube 12, and it is therefore possible to minimize the occurrence of an insufficient refrigerant circulation rate in the heat-source-side refrigerant circuit 20.

The second refrigerant recovery mechanism 58a is a refrigerant tube having a capillary tube, and is configured so that one end thereof is connected to a portion of the first usage-side gas refrigerant tube 54a which connects the gas side of the first usage-side heat exchanger 41a and the first usage-side gas on-off valve 56a, and the other end is connected to a portion of the first usage-side gas refrigerant tube 54a which connects the first usage-side gas on-off valve 56a and the gas refrigerant communication tube 14, and even when operation of the first usage unit 4a is stopped, the gas side of the first usage-side heat exchanger 41a and the gas refrigerant communication tube 14 are communicated with each other, bypassing the first usage-side gas on-off valve 56a. In this heat pump system 1, the heat-source-side refrigerant is thereby made less likely to stagnate in the first usage-side heat exchanger 41a, and it is therefore possible to minimize the occurrence of an insufficient refrigerant circulation rate in the heat-source-side refrigerant circuit 20.

The first usage-side gas non-return valve 59a is provided to the portion of the first usage-side gas refrigerant tube 54a which connects the first usage-side gas on-off valve 56a and the gas refrigerant communication tube 14. The first usage-side gas non-return valve 59a is a non-return valve for allowing the heat-source-side refrigerant to flow from the first usage-side heat exchanger 41a to the gas refrigerant communication tube 14 and preventing the heat-source-side refrigerant from flowing from the gas refrigerant communication tube 14 to the first usage-side heat exchanger 41a, and the heat-source-side refrigerant is thereby prevented from flowing from the gas refrigerant communication tube 14 to the first usage-side heat exchanger 41a through the first usage-side gas on-off valve 56a.

The first usage-side bypass refrigerant tube 60a is connected to the first usage-side gas refrigerant tube 54a so as to bypass the first usage-side gas on-off valve 56a and the first usage-side gas non-return valve 59a, and constitutes a portion of the first usage-side gas refrigerant tube 54a. The first usage-side bypass refrigerant tube 60a is provided with the first usage-side bypass non-return valve 61a for allowing the heat-source-side refrigerant to flow from the gas refrigerant communication tube 14 to the first usage-side heat exchanger 41a and preventing the heat-source-side refrigerant from flowing from the first usage-side heat exchanger 41a to the gas refrigerant communication tube 14, and the heat-source-side refrigerant is thereby allowed to flow from the gas refrigerant communication tube 14 to the first usage-side heat exchanger 41a through the first usage-side bypass refrigerant tube 60a. High-pressure heat-source-side refrigerant can thereby be sent to the first usage unit 4a not only from the discharge refrigerant communication tube 12 but also from the gas refrigerant communication tube 14 in the hot-water supply operation mode and the hot-water supply/air-warming operation mode in the heat pump system 1. Therefore, loss of pressure of the heat-source-side refrigerant fed from the heat source unit 2 to the first usage unit 4a is reduced, which can contribute to enhancing the hot-water supply capacity and/or operation efficiency.

In this heat pump system 1, by placing the first usage-side switching mechanism 53a in the aqueous medium heating operation state (i.e., a state in which the first usage-side discharge on-off valve 55a is open and the first usage-side gas on-off valve 56a is closed), the same operations in the hot-water supply operation mode and/or the hot-water supply air-warming mode are possible as in the heat pump system 1 (see FIG. 1) described above. In this heat pump system 1, operation is also possible in a cold-water supply/air-cooling operation mode for performing cold-water supply operation of the first usage unit 4a as well as air-cooling operation of the second usage unit 10a.

Operation in the cold-water supply/air-cooling operation mode will next be described.

Figure 3:
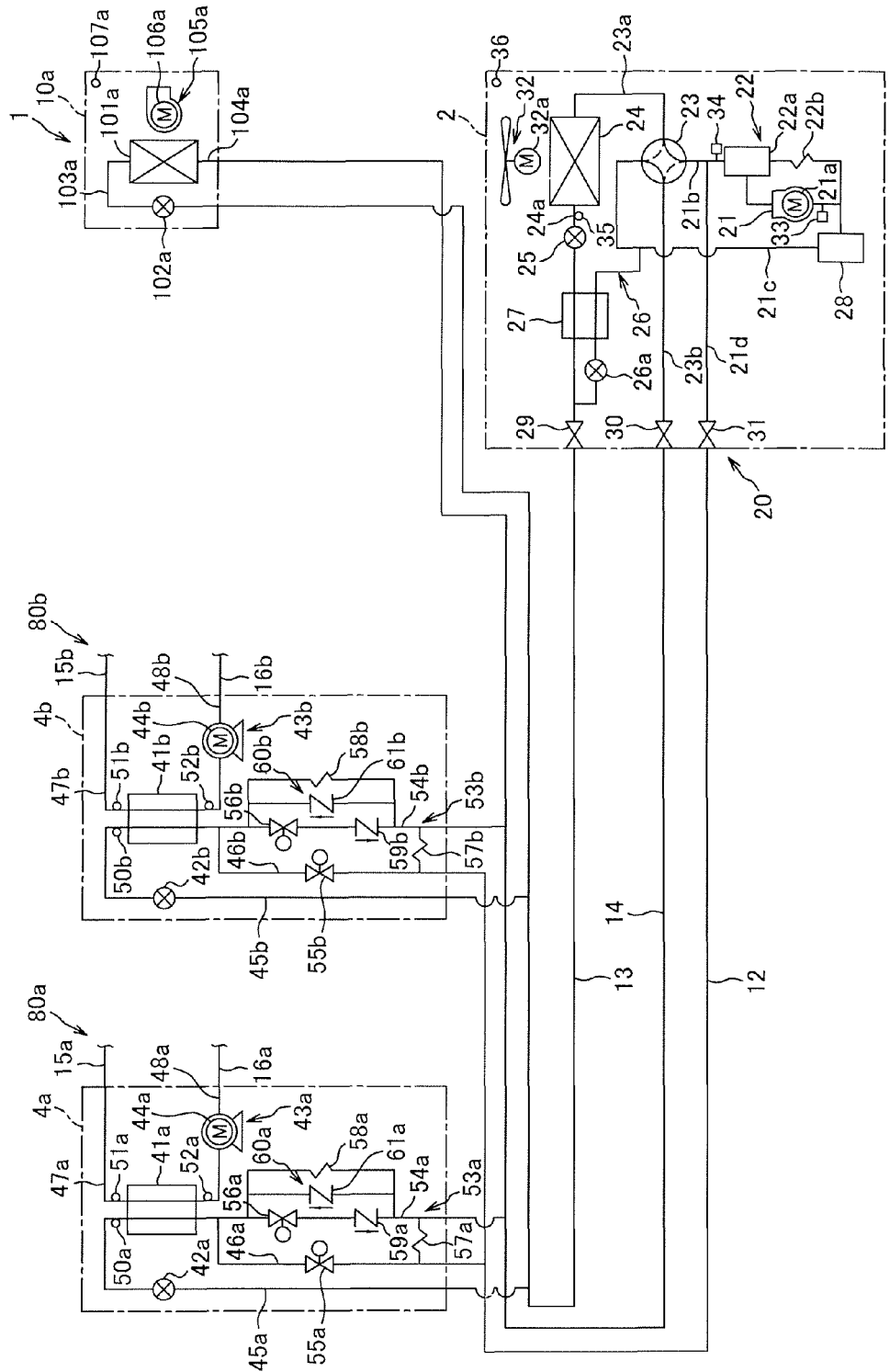
FIG. 3 is a view showing the general configuration of the heat pump system according to Modification 2 of the first embodiment.

In the case of performing the cold-water supply operation of the first usage unit 4a as well as the air-cooling operation of the second usage unit 10a, the heat-source-side switching mechanism 23 is switched to the heat-source-side radiating operation state (indicated by solid lines in the heat-source-side switching mechanism 23 in FIG. 3), and the first usage-side switching mechanism 53a is switched to the aqueous medium cooling operation state (i.e., the first usage-side discharge on-off valve 55a is closed and the first usage-side gas on-off valve 56a is open) in the heat-source-side refrigerant circuit 20. In the aqueous medium circuit 80a, the aqueous-medium-side switching mechanism 161a is switched to the state of feeding the aqueous medium to the hot-water air-warming unit 9a.

In the heat-source-side refrigerant circuit 20 in such a state, the heat-source-side refrigerant at a low pressure in the refrigeration cycle is drawn into the heat-source-side compressor 21 through the heat-source-side intake tube 21c and compressed to a high pressure in the refrigeration cycle, and subsequently discharged to the heat-source-side discharge tube 21b. In the oil separator 22a, the refrigeration machine oil is separated from the high-pressure heat-source-side refrigerant discharged to the heat-source-side discharge tube 21b. The refrigeration machine oil separated from the heat-source-side refrigerant in the oil separator 22a is returned to the heat-source-side intake tube 21c through the oil return tube 22b. The high-pressure heat-source-side refrigerant from which the refrigeration machine oil has been separated is sent to the heat-source-side heat exchanger 24 through the heat-source-side switching mechanism 23 and the first heat-source-side gas refrigerant tube 23a. The high-pressure heat-source-side refrigerant sent to the heat-source-side heat exchanger 24 is heat-exchanged with the outdoor air fed by the heat-source-side fan 32 and radiated in the heat-source-side heat exchanger 24. The high-pressure heat-source-side refrigerant radiated in the heat-source-side heat exchanger is sent to the subcooler 27 through the heat-source-side expansion valve 25. The heat-source-side refrigerant sent to the subcooler 27 is heat-exchanged with the heat-source-side refrigerant diverted to the intake return tube 26 from the heat-source-side liquid refrigerant tube 24a, and is cooled to a subcooled state. The heat-source-side refrigerant flowing through the intake return tube 26 is returned to the heat-source-side intake tube 21c. The heat-source-side refrigerant cooled in the subcooler 27 is sent from the heat source unit 2 to the liquid refrigerant communication tube 13 through the heat-source-side liquid refrigerant tube 24a and the liquid-side shutoff valve 29.

The heat-source-side refrigerant sent to the liquid refrigerant communication tube 13 is diverted in the liquid refrigerant communication tube 13 and sent to the first usage unit 4a and the second usage unit 10a.

The heat-source-side refrigerant sent to the second usage unit 10a is sent to the second usage-side flow rate adjustment valve 102a. The heat-source-side refrigerant sent to the second usage-side flow rate adjustment valve 102a is depressurized in the second usage-side flow rate adjustment valve 102a to a low-pressure gas-liquid two-phase state, and sent to the second usage-side heat exchanger 101a through the second usage-side liquid refrigerant tube 103a. The low-pressure heat-source-side refrigerant sent to the second usage-side heat exchanger 101a is heat-exchanged with the air medium fed by the usage-side fan 105a and evaporated in the second usage-side heat exchanger 101a, and indoor air cooling is thereby performed. The low-pressure heat-source-side refrigerant evaporated in the second usage-side heat exchanger 101a is sent from the second usage unit 10a to the gas refrigerant communication tube 14 through the second usage-side gas refrigerant tube 104a.

The heat-source-side refrigerant sent to the first usage unit 4a is sent to the first usage-side flow rate adjustment valve 42a. The heat-source-side refrigerant sent to the first usage-side flow rate adjustment valve 42a is depressurized in the first usage-side flow rate adjustment valve 42a to a low-pressure gas-liquid two-phase state, and sent to the first usage-side heat exchanger 41a through the first usage-side liquid refrigerant tube 45a. The low-pressure heat-source-side refrigerant sent to the first usage-side heat exchanger 41a is heat-exchanged with the aqueous medium circulated through the aqueous medium circuit 80a by the circulation pump 43a and evaporated in the first usage-side heat exchanger 41a. The low-pressure heat-source-side refrigerant evaporated in the first usage-side heat exchanger 41a is sent from the first usage unit 4a to the gas refrigerant communication tube 14 through the first usage-side gas on-off valve 56a and the first usage-side gas refrigerant tube 54a which constitute the first usage-side switching mechanism 53a.

The heat-source-side refrigerant sent to the gas refrigerant communication tube 14 from the second usage unit 10a and the first usage unit 4a merges in the gas refrigerant communication tube 14, and is sent to the heat source unit 2. The low-pressure heat-source-side refrigerant sent to the heat source unit 2 is sent to the heat-source-side accumulator 28 through the gas-side shutoff valve 30, the second heat-source-side gas refrigerant tube 23b, and the heat-source-side switching mechanism 23. The low-pressure heat-source-side refrigerant sent to the heat-source-side accumulator 28 is again drawn into the heat-source-side compressor 21 through the heat-source-side intake tube 21c.

On the other hand, in the aqueous medium circuit 80a, the aqueous medium circulated through the aqueous medium circuit 80a is cooled by the evaporation of the heat-source-side refrigerant in the first usage-side heat exchanger 41a. The aqueous medium cooled in the first usage-side heat exchanger 41a is drawn into the circulation pump 43a through the first usage-side water outlet tube 48a and pressurized, and is subsequently sent from the first usage unit 4a to the aqueous medium communication tube 16a. The aqueous medium sent to the aqueous medium communication tube 16a is sent to the hot-water air-warming unit 9a through the aqueous-medium-side switching mechanism 161a. The aqueous medium sent to the hot-water air-warming unit 9a is heat-absorbed in the heat exchange panel 91a, the walls and other indoor areas are thereby cooled, and the indoor floor is cooled.

The operations in the hot-water supply/air-cooling operation mode for performing the cold-water supply operation of the first usage unit 4a as well as the air-cooling operation of the second usage unit 10a are thus performed.

The heat pump system 1 is thereby configured so that it is possible to switch between operation (hot-water supply operation) for heating the aqueous medium by radiation of the heat-source-side refrigerant in the first usage-side heat exchanger 41a, and operation (cold-water supply operation) for cooling the aqueous medium by evaporation of the heat-source-side refrigerant in the first usage-side heat exchanger 41a; and it is possible to perform operation (air-cooling operation) for cooling the air medium by evaporation of the heat-source-side refrigerant in the second usage-side heat exchanger 101a, as well as operation (cold-water supply operation) for cooling the aqueous medium by evaporation of the heat-source-side refrigerant in the first usage-side heat exchanger 41a. It is therefore possible to provide comfortable air conditioning by a combination of the first usage unit 4a and the second usage unit 10a, whereby the air medium cooled in the second usage unit 10a is used for indoor air cooling while the aqueous medium cooled in the first usage unit 4a is used in a radiator, a floor air-warming panel, or the like, for example.

(2) Modification 2

Figure 4:
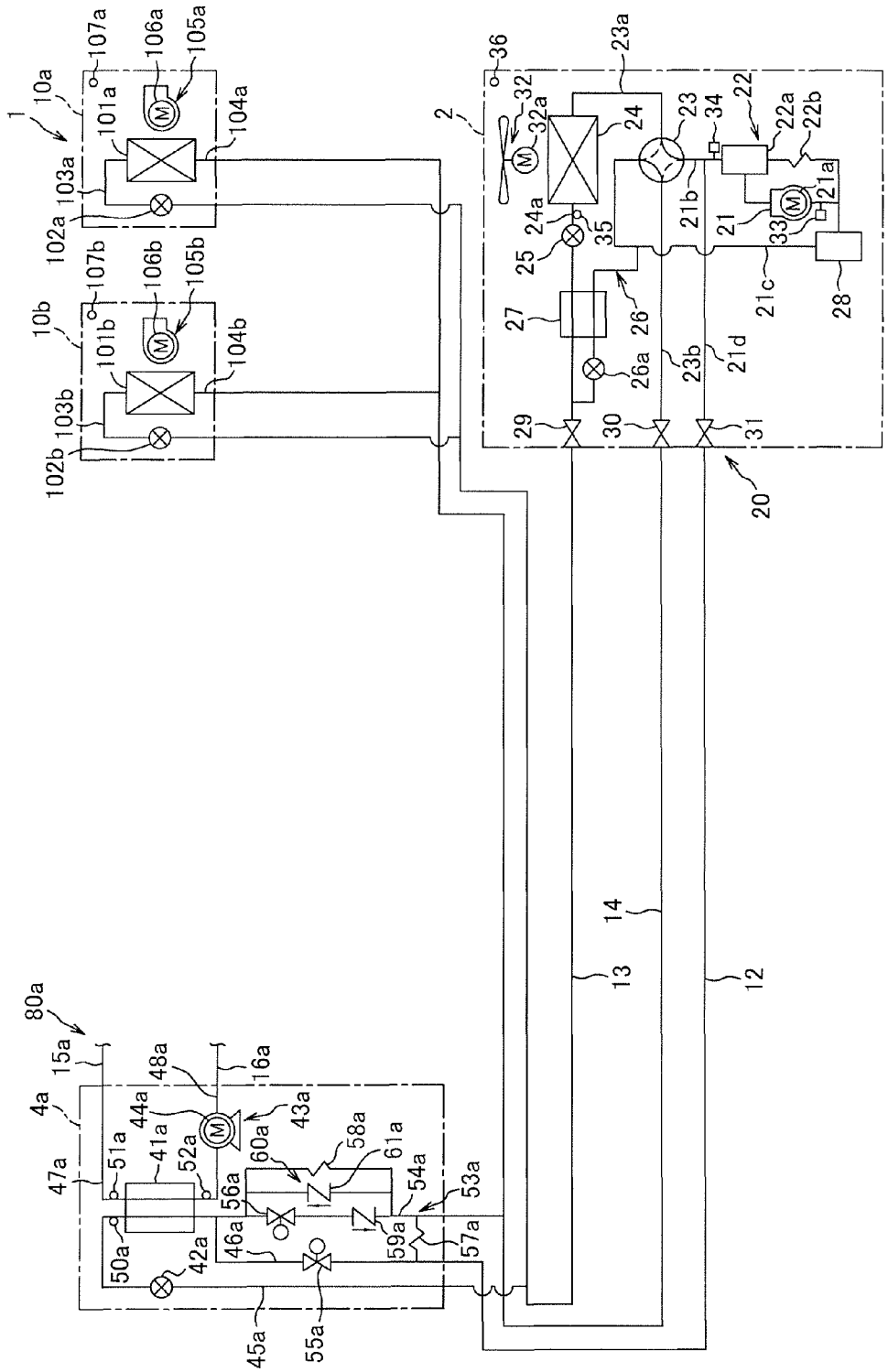
FIG. 4 is a view showing the general configuration of the heat pump system according to Modification 2 of the first embodiment.
Figure 5:
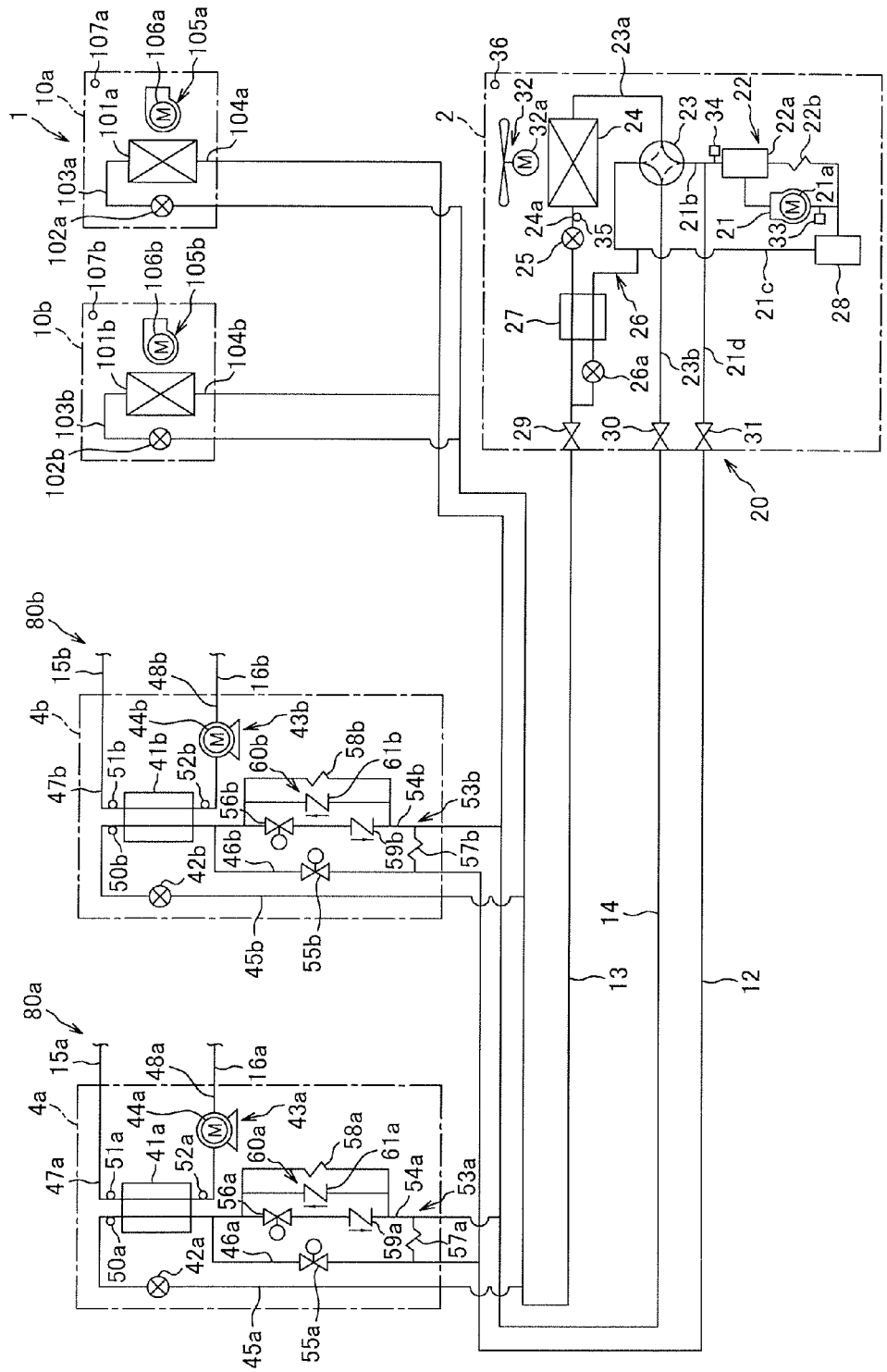
FIG. 5 is a view showing the general configuration of the heat pump system according to Modification 2 of the first embodiment.

In the heat pump systems 1 described above (see FIG. 2), a single first usage unit 4a and a single second usage unit 10a are connected to the heat source unit 2 via the refrigerant communication tubes 12, 13, 14, but a plurality of first usage units 4a, 4b (two, in this case) may be connected in parallel to each other via the refrigerant communication tubes 12, 13, 14, and/or a plurality of second usage units 10a, 10b (two, in this case) may be connected in parallel to each other via the refrigerant communication tubes 13, 14, as shown in FIGS. 3 to 5 (in this case, the hot-water/air-warming unit, the hot-water storage unit, the aqueous medium circuits 80a, 80b, and the like are not shown). The configuration of the first usage unit 4b is the same as the configuration of the first usage unit 4a with the subscript "b" used in place of the subscript "a" of the reference numerals indicating each part of the first usage unit 4a, and a description of each part of the first usage unit 4b is therefore omitted. Also, the configuration of the second usage unit 10b is the same as the configuration of the second usage unit 10a with the subscript "b" used in place of the subscript "a" of the reference numerals indicating each part of the second usage unit 10a, and a description of each part of the second usage unit 10b is therefore omitted.

In these heat pump systems 1, it is possible to accommodate a plurality of locations and/or applications that require heating of the aqueous medium, and it is possible to accommodate a plurality of locations and/or applications that require cooling of the air medium.

(3) Modification 3

Figure 6:
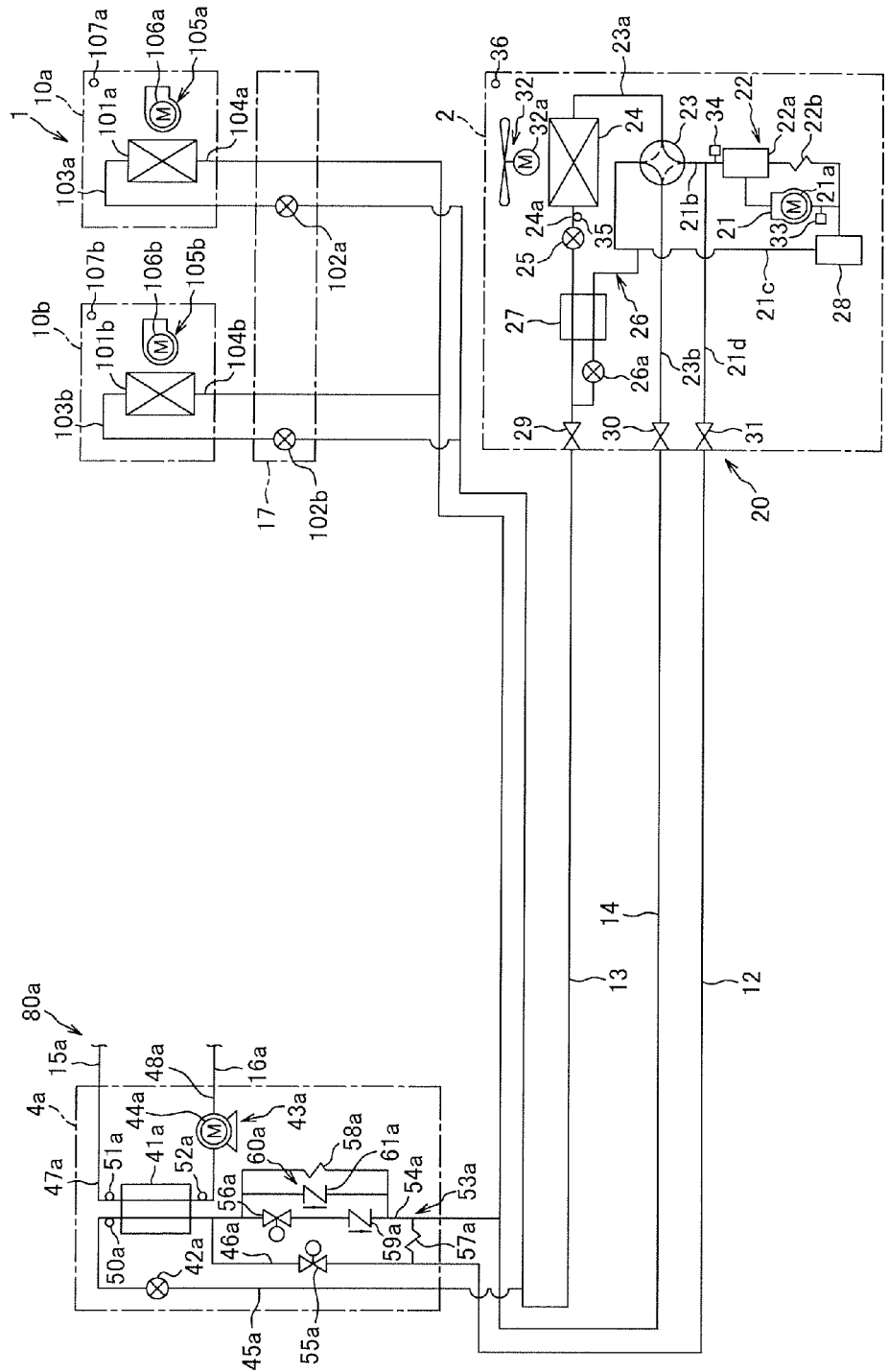
FIG. 6 is a view showing the general configuration of the heat pump system according to Modification 3 of the first embodiment.

In the heat pump systems 1 described above (see FIGS. 2 through 5), the second usage-side flow rate adjustment valves 102a, 102b are provided inside the second usage units 10a, 10b, but it is possible to omit the second usage-side flow rate adjustment valves 102a, 102b from the second usage units 10a, 10b and to provide an expansion valve unit 17 having the second usage-side flow rate adjustment valves 102a, 102b, as shown in FIG. 6 (in this case, the hot-water/air-warming unit, the hot-water storage unit, the aqueous medium circuits 80a, and the like are not shown).

Second Embodiment

In the heat pump system 1 in the first embodiment and modifications thereof described above, operation must be carried out under conditions in which the pressure of the heat-source-side refrigerant in the discharge of the heat-source-side compressor 21 is increased, or under other poor conditions in order to obtain a high-temperature aqueous medium such as hot water at, e.g., 65° C. or higher, and such an operation is not regarded as a preferred operation.

Figure 7:
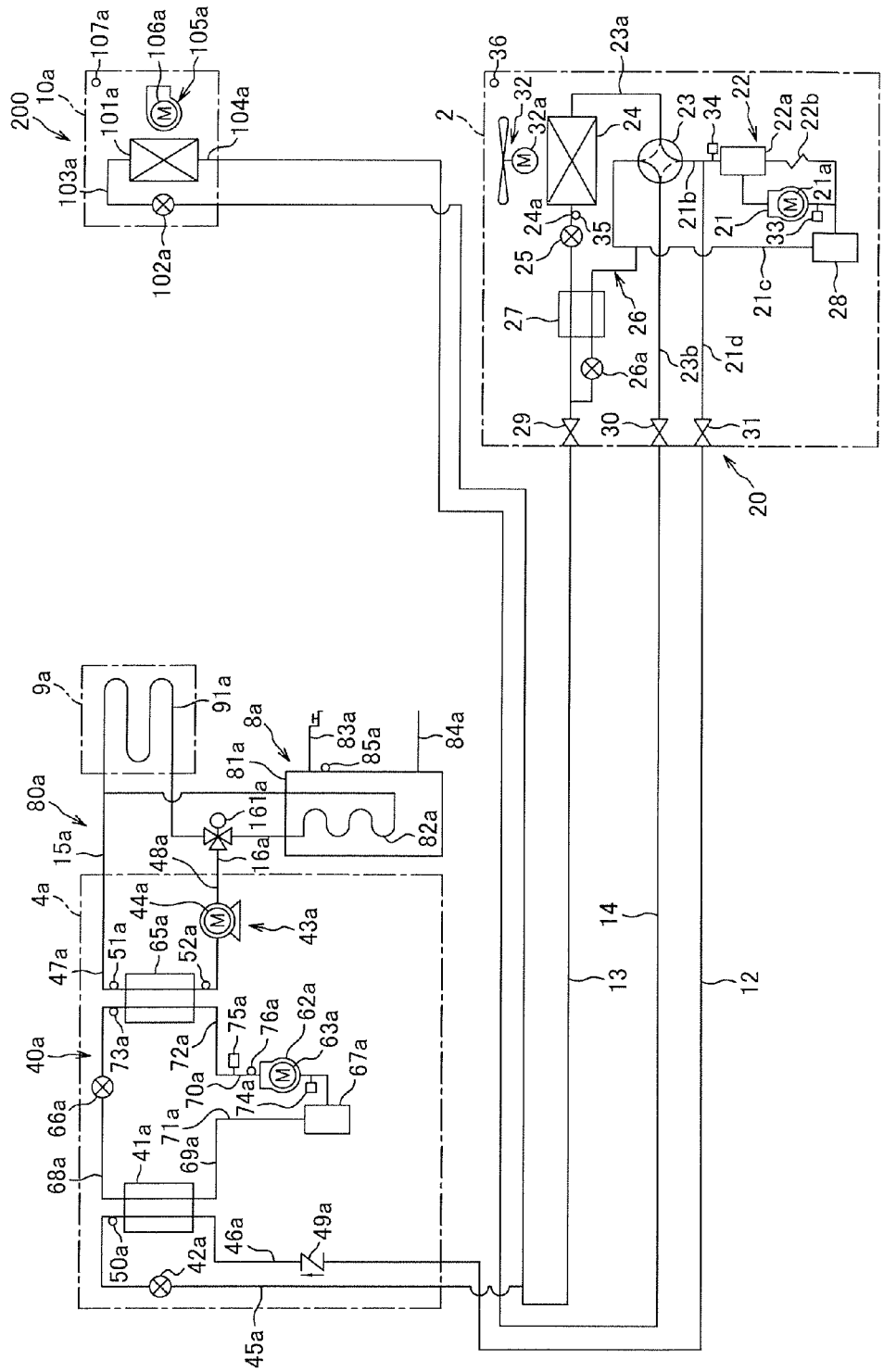
FIG. 7 is a view showing the general configuration of the heat pump system according to a second embodiment of the present invention.

In view of the above, with the heat pump system 200, the first usage-side heat exchanger 41a in the configuration of the heat pump system 1 in the first embodiment described above (FIG. 1) is a heat exchanger for exchanging heat between the heat-source-side refrigerant introduced from the discharge refrigerant communication tube 12 and the usage-side refrigerant, which is separate from the heat-source-side refrigerant; and the first usage unit 4a is further provided with a usage-side compressor 62a (described later) for compressing the usage-side refrigerant, and/or a refrigerant/water heat exchanger 65a (described later) that can function as a radiator of the usage-side refrigerant and heat the aqueous medium, and, together with the first usage-side heat exchanger 41a, thereby constituting the usage-side refrigerant circuit 40a through which the usage-side refrigerant circulates, as shown in FIG. 7. The configuration of the heat pump system 200 is described below.

<Configuration>

—Overall Configuration—

FIG. 7 is a schematic structural diagram of the heat pump system 200 according to the second embodiment of the present invention. The heat pump system 200 is an apparatus capable of performing an operation for heating an aqueous medium, and other operation using a vapor compression heat pump cycle.

The heat pump system 200 mainly has a heat source unit 2, a first usage unit 4a, a second usage unit 10a, a discharge refrigerant communication tube 12, a liquid-refrigerant communication tube 13, a gas-refrigerant communication tube 14, a hot-water storage unit 8a, a hot-water air-warming unit 9a, an aqueous medium communication tube 15a, and an aqueous medium communication tube 16a. The heat source unit 2, the first usage unit 4a, and the second usage unit 10a are connected via the refrigerant communication tubes 12, 13, 14 to thereby constitute a heat-source-side refrigerant circuit 20. The first usage unit 4a constitutes a usage-side refrigerant circuit 40a. The first usage unit 4a, the hot-water storage unit 8a, and the hot-water air-warming unit 9a are connected via the aqueous medium communication tubes 15a, 16a to thereby constitute an aqueous medium circuit 80a. HFC-410A, which is a type of HFC-based refrigerant, is enclosed inside the heat-source-side refrigerant circuit 20 as a heat-source-side refrigerant, and an ester-based or ether-based refrigeration machine oil having compatibility in relation to the HFC-based refrigerant is enclosed for lubrication of the heat-source-side compressor 21. HFC-134a, which is a type of HFC-based refrigerant, is enclosed inside the usage-side refrigerant circuit 40a as a usage-side refrigerant, and an ester-based or ether-based refrigeration machine oil having compatibility in relation to the HFC-based refrigerant is enclosed for lubrication of the usage-side compressor 62a. The usage-side refrigerant is preferably one in which the pressure that corresponds to a saturated gas temperature of 65° C. is a maximum gauge pressure of 2.8 MPa or less, and more preferably 2.0 MPa or less from the viewpoint of using a refrigerant that is advantageous for a high-temperature refrigeration cycle. HFC-134a is a type of refrigerant having such saturation pressure characteristics. Water as the aqueous medium circulates in the aqueous medium circuit 80a.

In the description related to the configurations below, the same reference numerals will be used and a description omitted for the configuration of the heat source unit 2, the second usage unit 10a, the hot-water storage unit 8a, the hot-water air-warming unit 9a, the discharge refrigerant communication tube 12, the liquid refrigerant communication tube 13, the gas-refrigerant communication tube 14, and the aqueous medium communication tubes 15a, 16a, all of which have the same configuration as those of heat pump system 1 in the first embodiment (see FIG. 1). Only the configuration of the first usage unit 4a will be described.

—First Usage Unit—

The first usage unit 4a is arranged indoors, is connected to the heat source unit 2 and the second usage unit 10a via the refrigerant communication tubes 12, 13, and constitutes a portion of the heat-source-side refrigerant circuit 20. The first usage unit 4a constitutes the usage-side refrigerant circuit 40a. The first usage unit 4a is connected to the hot-water storage unit 8a and the hot-water air-warming unit 9a via the aqueous medium communication tubes 15a, 16a and constitutes a portion of aqueous medium circuit 80a.

The first usage unit 4a mainly has the first usage-side heat exchanger 41a, the first usage-side flow rate adjustment valve 42a, the usage-side compressor 62a, the refrigerant/water heat exchanger 65a, a refrigerant/water heat exchange-side flow rate adjustment valve 66a, a usage-side accumulator 67a, and a circulation pump 43a.

The first usage-side heat exchanger 41a is a heat exchanger that functions as a radiator of the heat-source-side refrigerant by performing heat exchange between the heat-source-side refrigerant and the usage-side refrigerant. A first usage-side liquid refrigerant tube 45a is connected to the liquid side of the channel through which the heat-source-side refrigerant flows. A first usage-side discharge refrigerant tube 46a is connected to the gas side of the channel through which the heat-source-side refrigerant flows. A cascade-side liquid-refrigerant tube 68a is connected to the liquid side of the channel through which the usage-side refrigerant flows, and a second cascade-side gas-refrigerant tube 69a is connected to the gas side of the channel through which the usage-side refrigerant flows. The liquid refrigerant communication tube 13 is connected to the first usage-side liquid refrigerant tube 45a. The discharge refrigerant communication tube 12 is connected to the first usage-side discharge refrigerant tube 46a. The refrigerant/water heat exchanger 65a is connected to the cascade-side liquid-refrigerant tube 68a, and the usage-side compressor 62a is connected to the second cascade-side gas-refrigerant tube 69a.

The first usage-side flow rate adjustment valve 42a is an electrical expansion valve that can vary the flow rate of the heat-source-side refrigerant that flows through the first usage-side heat exchanger 41a by controlling the opening degree, and is provided to the first usage-side liquid refrigerant tube 45a.

The first usage-side discharge refrigerant tube 46a is provided with a first usage-side discharge non-return valve 49a for allowing the flow of heat-source-side refrigerant from the discharge refrigerant communication tube 12 to the first usage-side heat exchanger 41a and for prohibiting the flow of heat-source-side refrigerant from the first usage-side heat exchanger 41a to the discharge refrigerant communication tube 12.

The usage-side compressor 62a is a mechanism for compressing the usage-side refrigerant, and in this case, is a sealed compressor having rotary elements, scroll elements, or other type of positive displacement compression elements (not shown) accommodated in a casing (not shown), and is driven by a usage-side compression motor 63a accommodated in the same casing. A high-pressure space (not shown) which is filled with the usage-side refrigerant that has been compressed in the compression element is formed inside the casing of the usage-side compressor 62a, and refrigeration machine oil is accumulated in this high-pressure space. The rotational speed (i.e., operational frequency) of the usage-side compression motor 63a can be varied by using an inverter device (not shown), whereby the capacity of the usage-side compressor 62a can be controlled. A cascade-side discharge tube 70a is connected to the discharge of the usage-side compressor 62a, and a cascade-side intake tube 71a is connected to the intake of the usage-side compressor 62a. The cascade-side gas-refrigerant tube 71a is connected to the second cascade-side gas-refrigerant tube 69a.

The refrigerant/water heat exchanger 65a is a heat exchanger that functions as a radiator of the usage-side refrigerant by heat exchange between the usage-side refrigerant and the aqueous medium. A cascade-side liquid-refrigerant tube 68a is connected to the liquid side of the channel through which the usage-side refrigerant flows. A first cascade-side gas-refrigerant tube 72a is connected to the gas side of the channel through which the usage-side refrigerant flows. A first usage-side water inlet tube 47a is connected to the inlet side of the channel through which the aqueous medium flows. A first usage-side water outlet tube 48a is connected to the outlet side of the channel through which the aqueous medium flows. The first cascade-side gas-refrigerant tube 72a is connected to the cascade-side discharge tube 70a. An aqueous medium communication tube 15a is connected to the first usage-side water inlet tube 47a and an aqueous medium communication tube 16a is connected to the first usage-side water outlet tube 48a.

The refrigerant/water heat exchange-side flow rate adjustment valve 66a is an electrical expansion valve that can vary the flow rate of the usage-side refrigerant that flows through the refrigerant/water heat exchanger 65a by controlling the opening degree, and is provided to the cascade-side liquid-refrigerant tube 68a.

The usage-side accumulator 67a is a container provided to the cascade-side intake tube 71a and is used for temporarily accumulating the usage-side refrigerant circulating through the usage-side refrigerant circuit 40a before the usage-side refrigerant is taken from the cascade-side intake tube 71a into the usage-side compressor 62a.

In this manner, the usage-side compressor 62a, the refrigerant/water heat exchanger 65a, the refrigerant/water heat exchange-side flow rate adjustment valve 66a, and the first usage-side heat exchanger 41a are connected via the refrigerant tubes 71a, 70a, 72a, 68a, 69a to thereby constitute the usage-side refrigerant circuit 40a.

The circulation pump 43a is a mechanism for increasing the pressure of the aqueous medium, and in this configuration, is a pump in which a centrifugal and/or positive-displacement pump element (not shown) is driven by a circulation pump motor 44a. The circulation pump 43a is provided to the first usage-side water outlet tube 48a. The rotational speed (i.e., operational frequency) of the circulation pump motor 44a can be varied by using an inverter device (not shown), whereby the capacity of the circulation pump 43a can be controlled.

The first usage unit 4a can thereby perform hot-water supply operation by causing the first usage-side heat exchanger 41a to function as a radiator of the heat-source-side refrigerant introduced from the discharge refrigerant communication tube 12, whereby the heat-source-side refrigerant, which has released heat in the first usage-side heat exchanger 41a, is directed out to the liquid refrigerant communication tube 13, the usage-side refrigerant that circulates through the usage-side refrigerant circuit 40a is heated by the radiation of the heat-source-side refrigerant in the first usage-side heat exchanger 41a, the usage-side refrigerant thus heated is compressed in the usage-side compressor 62a, and the aqueous medium is thereafter heated by the radiation of the refrigerant/water heat exchanger 65a.

Various types of sensors are provided to the first usage unit 4a. Specifically provided to the first usage unit 4a are a first usage-side heat exchange temperature sensor 50a for detecting a first usage-side refrigerant temperature Tsc1, which is the temperature of the heat-source-side refrigerant in the liquid side of the first usage-side heat exchanger 41a; a first refrigerant/water heat exchange temperature sensor 73a for detecting a cascade-side refrigerant temperature Tsc2, which is the temperature of the usage-side refrigerant in the liquid side of the refrigerant/water heat exchanger 65a; an aqueous medium inlet temperature sensor 51a for detecting an aqueous medium inlet temperature Twr, which is the temperature of the aqueous medium in the inlet of the refrigerant/water heat exchanger 65a; an aqueous medium outlet temperature sensor 52a for detecting an aqueous medium outlet temperature Tw1, which is the temperature of the aqueous medium in the outlet of the refrigerant/water heat exchanger 65a; a usage-side intake pressure sensor 74a for detecting a usage-side intake pressure Ps2, which is the pressure of the usage-side refrigerant in the intake of the usage-side compressor 62a; a usage-side discharge pressure sensor 75a for detecting the usage-side discharge pressure Pd2, which is the pressure of the usage-side refrigerant in the discharge of the usage-side compressor 62a; and a usage-side discharge temperature sensor 76a for detecting the usage-side discharge temperature Td2, which is the temperature of the usage-side refrigerant in the discharge of the usage-side compressor 62a.

<Operation>

Next, the operation of the heat pump system 200 will be described.

The operation modes of the heat pump system 200 include a hot-water supply operation mode in which only the hot-water supply operation of the first usage unit 4a is performed (i.e., operation of the hot-water storage unit 8a and/or the hot-water air-warming unit 9a), an air-cooling operation mode in which only air-cooling operation of the second usage unit 10a is performed, an air-warming operation mode in which only air-warming operation of the second usage unit 10a is performed, a hot-water supply/air-warming operation mode in which hot-water supply operation of the first usage unit 4a is performed together with the air-warming operation of the second usage unit 10a, and a hot-water supply/air-cooling operation mode in which hot-water supply operation of the first usage unit 4a is performed together with the air-cooling operation of the second usage unit 10a.

Operation in the five operation modes of the heat pump system 200 is described below.

—Hot-Water Supply Operation Mode—

In the case that only hot-water supply operation of the first usage unit 4a is to be performed, the heat-source-side switching mechanism 23 is switched to the heat-source-side evaporating operation state (the state of the heat-source-side switching mechanism 23 indicated by the broken line in FIG. 7) in the heat-source-side refrigerant circuit 20, and an intake-return expansion valve 26a and the second usage-side flow rate adjustment valve 102a are set in a closed state. Also, in the aqueous medium circuit 80a, the aqueous-medium-side switching mechanism 161a is switched to a state in which the aqueous medium is fed to the hot-water storage unit 8a and/or hot-water air-warming unit 9a.

In the heat-source-side refrigerant circuit 20 in such a state, the low-pressure, heat-source-side refrigerant in the refrigeration cycle is taken into the heat-source-side compressor 21 by way of the heat-source-side intake tube 21c, and is discharged to a heat-source-side discharge tube 21b after having been compressed to a high pressure in the refrigeration cycle.

The high-pressure, heat-source-side refrigerant discharged to the heat-source-side discharge tube 21b has the refrigeration machine oil separated out in the oil separator 22a. The refrigeration machine oil separated out from the heat-source-side refrigerant in the oil separator 22a is returned to the heat-source-side intake tube 21c by way of the oil return tube 22b. The high-pressure, heat-source-side refrigerant from which the refrigeration machine oil has been separated out is sent from the heat source unit 2 to the discharge refrigerant communication tube 12 by way of the heat-source-side discharge branching tube 21d and a discharge-side shutoff valve 31.

The high-pressure, heat-source-side refrigerant sent to the discharge refrigerant communication tube 12 is sent to the first usage unit 4a. The high-pressure, heat-source-side refrigerant sent to the first usage unit 4a is sent to the first usage-side heat exchanger 41a via the first usage-side discharge refrigerant tube 46a and the first usage-side discharge non-return valve 49a. The high-pressure, heat-source-side refrigerant sent to the first usage-side heat exchanger 41a undergoes heat exchange with the low-pressure, usage-side refrigerant in the refrigeration cycle that is circulating through the usage-side refrigerant circuit 40a and releases heat in the first usage-side heat exchanger 41a. The high-pressure, heat-source-side refrigerant having released heat in the first usage-side heat exchanger 41a is sent from the first usage unit 4a to the liquid refrigerant communication tube 13 via the first usage-side flow rate adjustment valve 42a and the first usage-side liquid refrigerant tube 45a.

In the first usage unit 4a at this time, the opening degree of the first usage-side flow rate adjustment valve 42a is controlled so that the heat-source-side subcooling degree SC1 of the heat-source-side refrigerant in the outlet of the first usage-side heat exchanger 41a (i.e., the liquid side of the first usage-side heat exchanger 41a) is equal to a target heat-source-side refrigerant subcooling degree SC1s. In the present embodiment, the heat-source-side subcooling degree SC1 of the heat-source-side refrigerant in the outlet of the first usage-side heat exchanger 41a is the value obtained by subtracting the first usage-side refrigerant temperature Tsc1 from the heat-source-side discharge saturation temperature Tc1. The heat-source-side subcooling degree SC1 of the heat-source-side refrigerant in the outlet of the first usage-side heat exchanger 41a may be detected by converting the heat-source-side discharge pressure Pd1, which is the pressure of the heat-source-side refrigerant in the discharge of the heat-source-side compressor 21, to the saturation temperature that corresponds to the pressure value, and subtracting the refrigerant temperature value detected by the first usage-side heat exchange temperature sensor 50a from the saturation temperature of the refrigerant.

The heat-source-side refrigerant sent to the liquid refrigerant communication tube 13 is sent to the heat source unit 2. The heat-source-side refrigerant sent to the heat source unit 2 is sent to the subcooler 27 via a liquid-side shutoff valve 29. The heat-source-side refrigerant sent to the subcooler 27 does not undergo heat exchange and is sent to the heat-source-side expansion valve 25 because the heat-source-side refrigerant does not flow in the intake return tube 26. The heat-source-side refrigerant sent to the heat-source-side expansion valve 25 is depressurized in the heat-source-side expansion valve 25 to become a low-pressure gas-liquid two-phase state, and is then sent to the heat-source-side heat exchanger 24 by way of a heat-source-side liquid-refrigerant tube 24a. The low-pressure refrigerant sent to the heat-source-side heat exchanger 24 undergoes heat exchange with outdoor air fed by the heat-source-side fan 32 and is evaporated in the heat-source-side heat exchanger 24. The low-pressure, heat-source-side refrigerant evaporated in the heat-source-side heat exchanger 24 is sent to the heat-source-side accumulator 28 via the first heat-source-side gas-refrigerant tube 23a and the heat-source-side switching mechanism 23. The low-pressure, heat-source-side refrigerant sent to the heat-source-side accumulator 28 is again taken into the heat-source-side compressor 21 via the heat-source-side intake tube 21c.

In the usage-side refrigerant circuit 40a, the low-pressure, usage-side refrigerant in the refrigeration cycle that is circulating through the usage-side refrigerant circuit 40a is heated and evaporated by the radiation of the heat-source-side refrigerant in the first usage-side heat exchanger 41a. The low-pressure, usage-side refrigerant evaporated in the first usage-side heat exchanger 41a is sent to the usage-side accumulator 67a via the second cascade-side gas-refrigerant tube 69a. The low-pressure, usage-side refrigerant sent to the usage-side accumulator 67a is taken into the usage-side compressor 62a via the cascade-side intake tube 71a, is compressed to high pressure in the refrigeration cycle, and is thereafter discharged to the cascade-side discharge tube 70a. The high-pressure, usage-side refrigerant discharged to the cascade-side discharge tube 70a is sent to the refrigerant/water heat exchanger 65a via the first cascade-side gas-refrigerant tube 72a. The high-pressure, usage-side refrigerant sent to the refrigerant/water heat exchanger 65a undergoes heat exchange with the aqueous medium being circulated through the aqueous medium circuit 80a by the circulation pump 43a and releases heat in the refrigerant/water heat exchanger 65a. The high-pressure, usage-side refrigerant having released heat in the refrigerant/water heat exchanger 65a is depressurized in the refrigerant/water heat exchange-side flow rate adjustment valve 66a to become a low-pressure gas-liquid two-phase state, and is then sent again to the first usage-side heat exchanger 41a by way of the cascade-side liquid-refrigerant tube 68a.

In the aqueous medium circuit 80a, the aqueous medium circulating through the aqueous medium circuit 80a is heated by the radiation of the usage-side refrigerant in the refrigerant/water heat exchanger 65a. The aqueous medium heated in the refrigerant/water heat exchanger 65a is taken into the circulation pump 43a by way of the first usage-side water outlet tube 48a and pressurized, and is then sent from the first usage unit 4a to the aqueous medium communication tube 16a. The aqueous medium sent to the aqueous medium communication tube 16a is sent to the hot-water storage unit 8a and/or the hot-water air-warming unit 9a by way of the aqueous-medium-side switching mechanism 161a. The aqueous medium sent to the hot-water storage unit 8a undergoes heat exchange with the aqueous medium inside the hot-water storage tank 81a and releases heat in the heat exchange coil 82a, whereby the aqueous medium inside the hot-water storage tank 81a is heated. The aqueous medium sent to the hot-water air-warming unit 9a releases heat in the heat exchange panel 91a, whereby indoor walls or the like are heated and indoor floors are heated.

Operation in the hot-water supply operation mode for performing only hot-water supply operation of the first usage unit 4a is performed in this manner.

—Air-Cooling Operation Mode—

In the case that only air-cooling operation of the second usage unit 10a is to be performed, the heat-source-side switching mechanism 23 is switched to the heat-source-side radiating operation state (the state of the heat-source-side switching mechanism 23 indicated by the solid line in FIG. 7) in the heat-source-side refrigerant circuit 20, and the first usage-side flow rate adjustment valve 42a is set in a shutoff state.

In the heat-source-side refrigerant circuit 20 in such a state, the low-pressure, heat-source-side refrigerant in the refrigeration cycle is taken into the heat-source-side compressor 21 via the heat-source-side intake tube 21c, and is discharged to the heat-source-side discharge tube 21b after having been compressed to high pressure in the refrigeration cycle. The high-pressure, heat-source-side refrigerant discharged to the heat-source-side discharge tube 21b has the refrigeration machine oil separated out in the oil separator 22a. The refrigeration machine oil separated out from the heat-source-side refrigerant in the oil separator 22a is returned to the heat-source-side intake tube 21c by way of the oil return tube 22b. The high-pressure, heat-source-side refrigerant from which the refrigeration machine oil has been separated out is sent to the heat-source-side heat exchanger 24 by way of the heat-source-side switching mechanism 23 and a first heat-source-side gas-refrigerant tube 23a. The high-pressure, heat-source-side refrigerant sent to the heat-source-side heat exchanger 24 undergoes heat exchange with outdoor air fed by a heat-source-side fan 32 and releases heat in the heat-source-side heat exchanger 24. The high-pressure, heat-source-side refrigerant having released heat in the heat-source-side heat exchanger is sent to the subcooler 27 via the heat-source-side expansion valve 25. The heat-source-side refrigerant sent to the subcooler 27 undergoes heat exchange with the heat-source-side refrigerant branched from the heat-source-side liquid-refrigerant tube 24a to the intake return tube 26 and is cooled to a subcooled state. The heat-source-side refrigerant that flows through the intake return tube 26 is returned to the heat-source-side intake tube 21c. The heat-source-side refrigerant cooled in the subcooler, 27 is sent from the heat source unit 2 to the liquid refrigerant communication tube 13 by way of the heat-source-side liquid-refrigerant tube 24a and the liquid-side shutoff valve 29.

The high-pressure heat-source-side refrigerant sent to the liquid refrigerant communication tube 13 is sent to the second usage unit 10a. The high-pressure heat-source-side refrigerant sent to the second usage unit 10a is sent to the second usage-side flow rate adjustment valve 102a. The high-pressure heat-source-side refrigerant sent to the second usage-side flow rate adjustment valve 102a is depressurized in the second usage-side flow rate adjustment valve 102a to a low-pressure gas-liquid two-phase state, and sent to the second usage-side heat exchanger 101a through the second usage-side liquid refrigerant tube 103a.

In the second usage unit 10a at this time, the opening degree of the second usage-side flow rate adjustment valve 102a is controlled so that the heat-source-side superheat degree SH1 of the heat-source-side refrigerant in the outlet of the second usage-side heat exchanger 101a (i.e., the gas side of the second usage-side heat exchanger 101a) is constant at a target superheat degree SH1s. In the present embodiment, the heat-source-side superheat degree SH1 is detected by subtracting the refrigerant temperature value (corresponding to the heat-source-side evaporation temperature Te) detected by the second usage-side liquid-side temperature sensor 108a from the refrigerant temperature value detected by the second usage-side gas-side temperature sensor 109a, or is detected by converting the heat-source-side intake pressure Ps1 of the compressor 21 detected by the heat-source-side intake pressure sensor 33 to the saturation temperature value that corresponds to the heat-source-side evaporation temperature Te1, and subtracting the saturation temperature value of the refrigerant from the refrigerant temperature value detected by the second usage-side gas-side temperature sensor 109a. A configuration may be adopted in which a temperature sensor is provided for detecting the temperature of the refrigerant flowing inside the second usage-side heat exchanger 101a, and the heat-source-side superheat degree SH1 of the heat-source-side refrigerant in the outlet of the second usage-side heat exchanger 101a is detected by subtracting the refrigerant temperature value that corresponds to the heat-source-side evaporation temperature Te1 detected by the temperature sensor from the refrigerant temperature value detected by the second usage-side gas-side temperature sensor 109a.

The low-pressure heat-source-side refrigerant sent to the second usage-side heat exchanger 101a is heat-exchanged and evaporated in the second usage-side heat exchanger 101a with the air medium fed by the usage-side fan 105a, and indoor air-cooling is thereby performed. The low-pressure heat-source-side refrigerant evaporated in the second usage-side heat exchanger 101a is sent from the second usage unit 10a to the gas refrigerant communication tube 14 through the second usage-side gas refrigerant tube 104a.

The low-pressure, heat-source-side refrigerant sent to the gas-refrigerant communication tube 14 is sent to the heat source unit 2. The low-pressure, heat-source-side refrigerant sent to the heat source unit 2 is sent to the heat-source-side accumulator 28 by way of the gas-side shutoff valve 30, the second heat-source-side gas refrigerant tube 23b, and the heat-source-side switching mechanism 23. The low-pressure, heat-source-side refrigerant sent to the heat-source-side accumulator 28 is again taken into the heat-source-side compressor 21 by way of the heat-source-side intake tube 21c.

Operation in the air-cooling operation mode for performing only air-cooling operation of the second usage unit 10a is performed in this manner.

—Air-Warming Operation Mode—

In the case that only air-warming operation of the second usage unit 10a is to be performed, the heat-source-side switching mechanism 23 is switched to the heat-source-side radiating operation state (the state of the heat-source-side switching mechanism 23 indicated by the broken line in FIG. 7) in the heat-source-side refrigerant circuit 20, and the intake-return expansion valve 26a and the first usage-side flow rate adjustment valve 42a are in a shutoff state.

In the heat-source-side refrigerant circuit 20 in such a state, low-pressure, heat-source-side refrigerant in the refrigeration cycle is taken into the heat-source-side compressor 21 via the heat-source-side intake tube 21c, is compressed to a high pressure in the refrigeration cycle, and is thereafter discharged to the heat-source-side discharge tube 21b. The refrigeration machine oil of the high-pressure, heat-source-side refrigerant discharged to the heat-source-side discharge tube 21b is separated out in the oil separator 22a. The refrigeration machine oil separated out from the heat-source-side refrigerant in the oil separator 22a is returned to the heat-source-side intake tube 21c by way of the oil return tube 22b. The high-pressure, heat-source-side refrigerant from which the refrigeration machine oil has been separated out is sent from the heat source unit 2 to the gas-refrigerant communication tube 14 by way of the heat-source-side switching mechanism 23, the second heat-source-side gas refrigerant tube 23b, and the gas-side shutoff valve 30.

The high-pressure, heat-source-side refrigerant sent to the gas-refrigerant communication tube 14 is sent to the second usage unit 10a. The high-pressure, heat-source-side refrigerant sent to the second usage unit 10a is sent to the second usage-side heat exchanger 101a by way of the second usage-side gas refrigerant tube 104a. The high-pressure, heat-source-side refrigerant sent to the second usage-side heat exchanger 101a undergoes heat exchange with an air medium fed by the usage-side fan 105a and releases heat in the second usage-side heat exchanger 101a to thereby perform indoor air warming. The high-pressure, heat-source-side refrigerant thus having released heat in the second usage-side heat exchanger 101a is sent from the second usage unit 10a to the liquid refrigerant communication tube 13 by way of the second usage-side flow rate adjustment valve 102a and the second usage-side liquid refrigerant tube 103a.

In the second usage unit 10a, the opening degree of the second usage-side flow rate adjustment valve 102a is controlled so that the heat-source-side subcooling degree SC11 of the heat-source-side refrigerant in the outlet of the second usage-side heat exchanger 101a (i.e., the liquid side of the second usage-side heat exchanger 101a) is constant at a target heat-source-side subcooling degree SC11s. In the present embodiment, the heat-source-side subcooling degree SC11 of the heat-source-side refrigerant in the outlet of the second usage-side heat exchanger 101a is detected by converting the heat-source-side discharge pressure Pd of the heat-source-side compressor 21 detected by the heat-source-side discharge pressure sensor 34 to the saturation temperature value that corresponds to the condensing temperature Tc, and subtracting the refrigerant temperature value detected by the second usage-side liquid-side temperature sensor 108a from the saturation temperature value of the heat-source-side refrigerant. A configuration may be adopted in which a temperature sensor is provided for detecting the temperature of the refrigerant flowing inside the second usage-side heat exchanger 101a, and the subcooling degree SCr of the refrigerant in the outlet of the second usage-side heat exchanger 101a is detected by subtracting the refrigerant temperature value that corresponds to the condensing temperature Tc detected by the temperature sensor from the refrigerant temperature value detected by the second usage-side liquid-side temperature sensor 108a.

The heat-source-side refrigerant sent to the liquid-refrigerant communication tube 13 is sent to the heat source unit 2. The heat-source-side refrigerant sent to the heat source unit 2 is sent to the subcooler 27 by way of the liquid-side shutoff valve 29. The heat-source-side refrigerant sent to the subcooler 27 is sent to the heat-source-side expansion valve 25 without undergoing heat exchange because the heat-source-side refrigerant does not flow in the intake return tube 26. The heat-source-side refrigerant sent to the heat-source-side expansion valve 25 is depressurized in the heat-source-side expansion valve 25 to form a low-pressure, gas-liquid two-phase state, and is then sent to the heat-source-side heat exchanger 24 by way of the heat-source-side liquid-refrigerant tube 24a. The low-pressure, heat-source-side refrigerant sent to the heat-source-side heat exchanger 24 undergoes heat exchange with outdoor air fed by the heat-source-side fan 32 and is evaporated in the heat-source-side heat exchanger 24. The low-pressure, heat-source-side refrigerant evaporated in the heat-source-side heat exchanger 24 is sent to the heat-source-side accumulator 28 by way of the first heat-source-side gas-refrigerant tube 23a and the heat-source-side switching mechanism 23. The low-pressure, heat-source-side refrigerant sent to the heat-source-side accumulator 28 is again taken into the heat-source-side compressor 21 by way of the heat-source-side intake tube 21c.

Operation in the air-warming operation mode for performing only air-warming operation of the second usage unit 10a is performed in this manner.

—Hot-Water Supply/Air-Warming Operation Mode—

In the case that hot-water supply operation of the first usage unit 4a and the air-warming operation of the second usage unit 10a are to be performed together, the heat-source-side switching mechanism 23 is switched to the heat-source-side evaporating operation state (the state of the heat-source-side switching mechanism 23 indicated by the broken line in FIG. 7) in the heat-source-side refrigerant circuit 20, and the intake-return expansion valve 26a is in a shutoff state. Also, the aqueous-medium-side switching mechanism 161a is switched in the aqueous medium circuit 80a to a state in which the aqueous medium is fed to the hot-water storage unit 8a and/or the hot-water air-warming unit 9a.

In the heat-source-side refrigerant circuit 20 in such a state, the low-pressure, heat-source-side refrigerant in the refrigeration cycle is taken into the heat-source-side compressor 21 by way of the heat-source-side intake tube 21c, is compressed to high pressure in the refrigeration cycle, and is thereafter discharged to the heat-source-side discharge tube 21b. The high-pressure, heat-source-side refrigerant discharged to the heat-source-side discharge tube 21b has the refrigeration machine oil separated out in the oil separator 22a. The refrigeration machine oil separated out from the heat-source-side refrigerant in the oil separator 22a is returned to the heat-source-side intake tube 21c by way of the oil return tube 22b. A portion of the high-pressure, heat-source-side refrigerant from which the refrigeration machine oil has been separated out is sent from the heat source unit 2 to the discharge refrigerant communication tube 12 by way of the heat-source-side discharge branching tube 21d and a discharge-side shutoff valve 31, and the remainder is sent from the heat source unit 2 to the gas-refrigerant communication tube 14 by way of the heat-source-side switching mechanism 23, the second heat-source-side gas refrigerant tube 23b and the gas-side shutoff valve 30.

The high-pressure, heat-source-side refrigerant sent to the gas-refrigerant communication tube 14 is sent to the second usage unit 10a. The high-pressure, heat-source-side refrigerant sent to the second usage unit 10a is sent to the second usage-side heat exchanger 101a by way of the second usage-side gas refrigerant tube 104a. The high-pressure, heat-source-side refrigerant sent to the second usage-side heat exchanger 101a undergoes heat exchange with the air medium fed by the usage-side fan 105a to release heat in the second usage-side heat exchanger 101a and thereby perform indoor air warming. The high-pressure, heat-source-side refrigerant having released heat in the second usage-side heat exchanger 101a is sent from the second usage unit 10a to the liquid refrigerant communication tube 13 by way of the second usage-side flow rate adjustment valve 102a and the second usage-side liquid refrigerant tube 103a.

In the second usage unit 10a at this time, the opening degree of the second usage-side flow rate adjustment valve 102a is controlled so that the heat-source-side subcooling degree SC11 of the heat-source-side refrigerant in the outlet of the second usage-side heat exchanger 101a (i.e., the liquid side of the second usage-side heat exchanger 101a) is constant at a target heat-source-side subcooling degree SC11s.

The high-pressure, heat-source-side refrigerant sent to the discharge refrigerant communication tube 12 is sent to the first usage unit 4a. The high-pressure, heat-source-side refrigerant sent to the first usage unit 4a is sent to the first usage-side heat exchanger 41a by way of the first usage-side discharge refrigerant tube 46a and the first usage-side discharge non-return valve 49a. The high-pressure, heat-source-side refrigerant sent to the first usage-side heat exchanger 41a undergoes heat exchange with the low-pressure, usage-side refrigerant in the refrigeration cycle that is circulating through the usage-side refrigerant circuit 40a and releases heat in the first usage-side heat exchanger 41a. The high-pressure, heat-source-side refrigerant having released heat in the first usage-side heat exchanger 41a is sent from the first usage unit 4a to the liquid refrigerant communication tube 13 by way of the first usage-side flow rate adjustment valve 42a and the first usage-side liquid refrigerant tube 45a.

In the first usage unit 4a at this time, the opening degree of the first usage-side flow rate adjustment valve 42a is controlled so that the heat-source-side subcooling degree SC1 of the heat-source-side refrigerant in the outlet of the first usage-side heat exchanger 41a (i.e., the liquid side of the first usage-side heat exchanger 41a) is constant at the target heat-source-side refrigerant subcooling degree SC1s.

The heat-source-side refrigerant sent from the second usage unit 10a and the first usage unit 4a to the liquid refrigerant communication tube 13 merges in the liquid refrigerant communication tube 13 and is sent to the heat source unit 2. The heat-source-side refrigerant sent to the heat source unit 2 is sent to the subcooler 27 by way of the liquid-side shutoff valve 29. The heat-source-side refrigerant sent to the subcooler 27 is sent to the heat-source-side expansion valve 25 without undergoing heat exchange because the heat-source-side refrigerant does not flow in the intake return tube 26. The heat-source-side refrigerant sent to the heat-source-side expansion valve 25 is depressurized in the heat-source-side expansion valve 25 to become a low-pressure gas-liquid two-phase state, and is then sent to the heat-source-side heat exchanger 24 by way of the heat-source-side liquid-refrigerant tube 24a. The low-pressure refrigerant sent to the heat-source-side heat exchanger 24 undergoes heat exchange with outdoor air fed by the heat-source-side fan 32 and evaporates in the heat-source-side heat exchanger 24. The low-pressure, heat-source-side refrigerant evaporated in the heat-source-side heat exchanger 24 is sent to the heat-source-side accumulator 28 by way of the first heat-source-side gas-refrigerant tube 23a and the heat-source-side switching mechanism 23. The low-pressure, heat-source-side refrigerant sent to the heat-source-side accumulator 28 is again taken into the heat-source-side compressor 21 by way of the heat-source-side intake tube 21c.

In the usage-side refrigerant circuit 40a, the low-pressure, usage-side refrigerant in the refrigeration cycle that is circulating through the usage-side refrigerant circuit 40a is heated and evaporated by the radiation of the heat-source-side refrigerant in the first usage-side heat exchanger 41a. The low-pressure, usage-side refrigerant evaporated in the first usage-side heat exchanger 41a is sent to the usage-side accumulator 67a via the second cascade-side gas-refrigerant tube 69a. The low-pressure, usage-side refrigerant sent to the usage-side accumulator 67a is taken into the usage-side compressor 62a by way of the cascade-side intake tube 71a, is compressed to high pressure in the refrigeration cycle, and is thereafter discharged to the cascade-side discharge tube 70a. The high-pressure, usage-side refrigerant discharged to the cascade-side discharge tube 70a is sent to the refrigerant/water heat exchanger 65a by way of the first cascade-side gas-refrigerant tube 72a. The high-pressure, usage-side refrigerant sent to the refrigerant/water heat exchanger 65a undergoes heat exchange with the aqueous medium being circulated through the aqueous medium circuit 80a by the circulation pump 43a and releases heat in the refrigerant/water heat exchanger 65a. The high-pressure, usage-side refrigerant having released heat in the refrigerant/water heat exchanger 65a is depressurized in the refrigerant/water heat exchange-side flow rate adjustment valve 66a to become a low-pressure gas-liquid two-phase state, and is then sent again to the first usage-side heat exchanger 41a by way of the cascade-side liquid-refrigerant tube 68a.

In the aqueous medium circuit 80a, the aqueous medium circulating through the aqueous medium circuit 80a is heated by the radiation of the usage-side refrigerant in the refrigerant/water heat exchanger 65a. The aqueous medium heated in the refrigerant/water heat exchanger 65a is taken into the circulation pump 43a by way of the first usage-side water outlet tube 48a and pressurized, and is then sent from the first usage unit 4a to the aqueous medium communication tube 16a. The aqueous medium sent to the aqueous medium communication tube 16a is sent to the hot-water storage unit 8a and/or the hot-water air-warming unit 9a by way of the aqueous-medium-side switching mechanism 161a. The aqueous medium sent to the hot-water storage unit 8a undergoes heat exchange with the aqueous medium inside the hot-water storage tank 81a and releases heat in the heat exchange coil 82a, whereby the aqueous medium inside the hot-water storage tank 81a is heated. The aqueous medium sent to the hot-water air-warming unit 9a releases heat in the heat exchange panel 91a, whereby indoor walls or the like are heated and indoor floors are heated.

Operation in the hot-water supply/air-warming operation mode for performing hot-water supply operation of the first usage unit 4a and air-warming operation of the second usage unit 10a are performed in this manner.

—Hot-Water Supply/Air-Cooling Operation Mode—

In the case that hot-water supply operation of the first usage unit 4a and the air-cooling operation of the second usage unit 10a are to be performed together, the heat-source-side switching mechanism 23 is switched to the heat-source-side radiating operation state (the state of the heat-source-side switching mechanism 23 indicated by the solid line in FIG. 7) in the heat-source-side refrigerant circuit 20. Also, the aqueous-medium-side switching mechanism 161a is switched in the aqueous medium circuit 80a to a state in which the aqueous medium is fed to the hot-water storage unit 8a.

In the heat-source-side refrigerant circuit 20 in such a state, the low-pressure, heat-source-side refrigerant in the refrigeration cycle is taken into the heat-source-side compressor 21 by way of the heat-source-side intake tube 21c, is compressed to high pressure in the refrigeration cycle, and is thereafter discharged to the heat-source-side discharge tube 21b. The high-pressure, heat-source-side refrigerant discharged to the heat-source-side discharge tube 21b has the refrigeration machine oil separated out in the oil separator 22a. The refrigeration machine oil separated out from the heat-source-side refrigerant in the oil separator 22a is returned to the heat-source-side intake tube 21c by way of the oil return tube 22b. A portion of the high-pressure, heat-source-side refrigerant from which the refrigeration machine oil has been separated out is sent from the heat source unit 2 to the discharge refrigerant communication tube 12 by way of the heat-source-side discharge branching tube 21d and a discharge-side shutoff valve 31, and the remainder is sent to the heat-source-side heat exchanger 24 by way of the heat-source-side switching mechanism 23 and the first heat-source-side gas-refrigerant tube 23a. The high-pressure, heat-source-side refrigerant sent to the heat-source-side heat exchanger 24 undergoes heat exchange with outdoor air fed by the heat-source-side fan 32 and releases heat in the heat-source-side heat exchanger 24. The high-pressure, heat-source-side refrigerant having released heat in the heat-source-side heat exchanger is sent to the subcooler 27 by way of the heat-source-side expansion valve 25. The heat-source-side refrigerant sent to the subcooler 27 undergoes heat exchange with the heat-source-side refrigerant branched from the heat-source-side liquid-refrigerant tube 24a to the intake return tube 26 and is cooled to a subcooled state. The heat-source-side refrigerant that flows through the intake return tube 26 is returned to the heat-source-side intake tube 21c. The heat-source-side refrigerant cooled in the subcooler 27 is sent from the heat source unit 2 to the liquid refrigerant communication tube 13 by way of the heat-source-side liquid-refrigerant tube 24a and the liquid-side shutoff valve 29.

The high-pressure, heat-source-side refrigerant sent to the discharge refrigerant communication tube 12 is sent to the first usage unit 4a. The high-pressure, heat-source-side refrigerant sent to the first usage unit 4a is sent to the first usage-side heat exchanger 41a by way of the first usage-side discharge refrigerant tube 46a and the first usage-side discharge non-return valve 49a. The high-pressure, heat-source-side refrigerant sent to the first usage-side heat exchanger 41a undergoes heat exchange with the low-pressure, usage-side refrigerant in the refrigeration cycle that circulates through the usage-side refrigerant circuit 40a and releases heat in the first usage-side heat exchanger 41a. The high-pressure, heat-source-side refrigerant having released heat in the first usage-side heat exchanger 41a is sent from the first usage unit 4a to the liquid refrigerant communication tube 13 by way of the first usage-side flow rate adjustment valve 42a and the first usage-side liquid refrigerant tube 45a.

In the first usage unit 4a at this time, the opening degree of the first usage-side flow rate adjustment valve 42a is controlled so that the heat-source-side subcooling degree SC1 of the heat-source-side refrigerant in the outlet of the first usage-side heat exchanger 41a (i.e., the liquid side of the first usage-side heat exchanger 41a) is constant at the target heat-source-side refrigerant subcooling degree SC1s.

The heat-source-side refrigerant sent from the heat source unit 2 and the first usage unit 4a to the liquid refrigerant communication tube 13 merges in the liquid refrigerant communication tube 13 and is sent to the second usage unit 10a. The heat-source-side refrigerant sent to the second usage unit 10a is sent to the second usage-side flow rate adjustment valve 102a. The heat-source-side refrigerant sent to the second usage-side flow rate adjustment valve 102a is depressurized in the second usage-side flow rate adjustment valve 102a to become a low-pressure gas-liquid two-phase state, and is then sent to the second usage-side heat exchanger 101a by way of the second usage-side liquid refrigerant tube 103a. The low-pressure heat-source-side refrigerant sent to the second usage-side heat exchanger 101a undergoes heat exchange with the air medium fed by the usage-side fan 105a and evaporates in the second usage-side heat exchanger 101a to thereby perform indoor air cooling. The low-pressure, heat-source-side refrigerant evaporated in the second usage-side heat exchanger 101a is sent from the second usage unit 10a to the gas-refrigerant communication tube 14 by way of the second usage-side gas refrigerant tube 104a.

In the second usage unit 10a at this time, the opening degree of the second usage-side flow rate adjustment valve 102a is controlled based on the heat-source-side superheat degree SH1 of the second usage-side heat exchanger 101a (i.e., the temperature difference between the heat-source-side refrigerant temperature detected by the second usage-side liquid-side temperature sensor 108a and the heat-source-side refrigerant temperature detected by the second usage-side gas-side temperature sensor 109a), or is otherwise controlled in accordance with the air-cooling load of the second usage unit 10a.

The low-pressure, heat-source-side refrigerant sent to the gas-refrigerant communication tube 14 is sent to the heat source unit 2. The low-pressure, heat-source-side refrigerant sent to the heat source unit 2 is sent to the heat-source-side accumulator 28 by way of the gas-side shutoff valve 30, the second heat-source-side gas refrigerant tube 23b, and the heat-source-side switching mechanism 23. The low-pressure, heat-source-side refrigerant sent to the heat-source-side accumulator 28 is again taken into the heat-source-side compressor 21 by way of the heat-source-side intake tube 21c.

In the usage-side refrigerant circuit 40a, the low-pressure, usage-side refrigerant in the refrigeration cycle that is circulating through the usage-side refrigerant circuit 40a is heated and evaporated by the radiation of the heat-source-side refrigerant in the first usage-side heat exchanger 41a. The low-pressure, usage-side refrigerant evaporated in the first usage-side heat exchanger 41a is sent to the usage-side accumulator 67a by way of the second cascade-side gas-refrigerant tube 69a. The low-pressure, usage-side refrigerant sent to the usage-side accumulator 67a is taken into the usage-side compressor 62a by way of the cascade-side intake tube 71a, is compressed to high pressure in the refrigeration cycle, and is thereafter discharged to the cascade-side discharge tube 70a. The high-pressure, usage-side refrigerant discharged to the cascade-side discharge tube 70a is sent to the refrigerant/water heat exchanger 65a by way of the first cascade-side gas-refrigerant tube 72a. The high-pressure, usage-side refrigerant sent to the refrigerant/water heat exchanger 65a undergoes heat exchange with the aqueous medium being circulated through the aqueous medium circuit 80a by the circulation pump 43a and releases heat in the refrigerant/water heat exchanger 65a. The high-pressure, usage-side refrigerant having released heat in the refrigerant/water heat exchanger 65a is depressurized in the refrigerant/water heat exchange-side flow rate adjustment valve 66a to become a low-pressure gas-liquid two-phase state, and is then sent again to the first usage-side heat exchanger 41a by way of the cascade-side liquid-refrigerant tube 68a.

In the aqueous medium circuit 80a, the aqueous medium circulating through the aqueous medium circuit 80a is heated by the radiation of the usage-side refrigerant in the refrigerant/water heat exchanger 65a. The aqueous medium heated in the refrigerant/water heat exchanger 65a is taken into the circulation pump 43a by way of the first usage-side water outlet tube 48a and pressurized, and is then sent from the first usage unit 4a to the aqueous medium communication tube 16a. The aqueous medium sent to the aqueous medium communication tube 16a is sent to the hot-water storage unit 8a by way of the aqueous-medium-side switching mechanism 161a. The aqueous medium sent to the hot-water storage unit 8a undergoes heat exchange with the aqueous medium inside the hot-water storage tank 81a and releases heat in the heat exchange coil 82a, whereby the aqueous medium inside the hot-water storage tank 81a is heated.

Operation in the hot-water supply/air-cooling operation mode for performing hot-water supply operation of the first usage unit 4a and air-cooling operation of the second usage unit 10a are performed in this manner.

—Control of the Circulation Rate of Refrigerant in the Hot-Water Supply/Air-Cooling Operation Mode—

Refrigerant circulation control of the heat-source-side refrigerant flowing through the heat-source-side refrigerant circuit 20 in the hot-water supply/air-cooling operation mode described above will next be described, using a case in which the load (hot-water supply load) pertaining to heating the aqueous medium in the first usage unit is greater than the air-cooling load in the second usage unit, and a case in which there is insufficient refrigerant in the second usage unit.

(1) A Case in which the Hot-Water Supply Load Greater than the Air-Cooling Load

In the case of the hot-water supply/air-cooling operation mode described above, by heating the aqueous medium even without utilizing heat via the aqueous medium (e.g., utilizing hot-water supply), it is possible to utilize waste heat that occurs on the radiator side during air-cooling operation by the second usage unit. However, in a case in which air-cooling operation by the second usage unit 10a is the main object, and hot-water supply operation by the first usage unit 4a is performed as waste heat recovery which accompanies air-cooling operation by the second usage unit 10a to enhance the energy efficiency, in operating conditions in which the temperature of the aqueous medium is low, such as immediately after the start of air-cooling operation by the second usage unit 10a and hot-water supply operation by the first usage unit 4a, the hot-water supply load is often greater than the air-cooling load, due to the low temperature of the aqueous medium.

When air-cooling operation by the second usage unit 10a is continued at this time in accordance with the hot-water supply load, an excessive amount of energy is required in relation to the air-cooling load, and efficiency is poor. Consequently, to prevent this situation, the hot-water supply load must be adapted to the air-cooling load.

When the hot-water supply/air-cooling operation mode is performed in this heat pump system 1, the heat-source-side heat exchanger 24 and the first usage-side heat exchanger 41a function as radiators, and the second usage-side heat exchanger 101a functions as an evaporator. There are thereby two heat exchangers that function as radiators, and the heat exchangers 24, 41a functioning as radiators are in a parallel relationship to the second usage-side heat exchanger 101a functioning an evaporator.

Consequently, in operating conditions (e.g., conditions in which the temperature of the aqueous medium is lower than the outside air temperature) in which the temperature of the aqueous medium is low, such as immediately after the start of operation by the first usage unit 4a, the heat-source-side refrigerant flowing into the heat exchangers that function as radiators is prone to stagnate in the first usage-side heat exchanger 41a, since the pressure of the heat-source-side refrigerant in the first usage-side heat exchanger 41a is lower than the pressure of the heat-source-side refrigerant in the heat-source-side heat exchanger 24. In this case, in the first usage-side heat exchanger 41a, since the opening degree of the first usage-side flow rate adjustment valve 42a is controlled so that the heat-source-side subcooling degree SC1 of the heat-source-side refrigerant in the outlet of the first usage-side heat exchanger 41a (i.e., the liquid side of the first usage-side heat exchanger 41a) is constant at the target heat-source-side refrigerant subcooling degree SC1s, the first usage-side flow rate adjustment valve 42a opens when the heat-source-side refrigerant stagnates in the first usage-side heat exchanger 41a. Taking advantage of this effect, when the first usage-side flow rate adjustment valve 42a is open more than a predetermined opening degree in the heat pump system 1, the hot-water supply load is determined to be large, and the capacity of the circulation pump 43a is controlled so that the flow rate of the aqueous medium circulated through the aqueous medium circuit 80a decreases.

(2) A Case in which there is Insufficient Refrigerant in the Second Usage Unit

The operation described in (1) is performed only in conditions in which the temperature of the aqueous medium is low, and is therefore often performed at least at the start of hot-water supply operation. The aqueous medium is heated considerably when air-cooling operation is performed by the second usage unit 10a, even in a state in which the capacity of the circulation pump 43a is controlled as described above. The temperature of the aqueous medium therefore gradually increases, and operating conditions occur in which the temperature of the aqueous medium is high (e.g., conditions in which the temperature of the aqueous medium is higher than the outside air temperature). At this time, the heat-source-side refrigerant flowing into the heat exchangers that function as radiators is prone to stagnate in the heat-source-side heat exchanger 24, since the pressure of the heat-source-side refrigerant in the first usage-side heat exchanger 41a is higher than the pressure of the heat-source-side refrigerant in the heat-source-side heat exchanger 24. In this state, the heat exchange capability of the heat-source-side heat exchanger 24 is excessive, and the amount of heat-source-side refrigerant flowing through the second usage-side heat exchanger 101a decreases. In this case, in the second usage unit 10a, since the opening degree of the second usage-side flow rate adjustment valve 102a is controlled based on the heat-source-side superheat degree SH1 (i.e., the temperature difference between the heat-source-side refrigerant temperature detected by the second usage-side liquid-side temperature sensor 108a and the heat-source-side refrigerant temperature detected by the second usage-side gas-side temperature sensor 109a) of the second usage-side heat exchanger 101a, the second usage-side flow rate adjustment valve 102a opens when the heat-source-side refrigerant stagnates in the heat-source-side heat exchanger 24. Taking advantage of this effect, when the second usage-side flow rate adjustment valve 102a is open more than a predetermined opening degree in the heat pump system 1, the heat exchange capability pertaining to the heat-source-side heat exchanger 24 is determined to be excessive, and the rotation speed of the heat-source-side fan motor 32a is controlled so that the airflow rate of the heat-source-side fan 32 decreases.

<Characteristics>

The heat pump system 200 has the following characteristics.

—A—

The heat pump system 200 differs from the heat pump system 1 in the first embodiment in that the usage-side refrigerant circuit 40a is interposed between the heat-source-side refrigerant circuit 20 and the aqueous medium circuit 80a. However, in the same manner as in the heat pump system 1 of the first embodiment, in a case in which the heat-source-side refrigerant stagnates in the heat-source-side heat exchanger 24, and the amount of refrigerant that flows into the second usage unit 10a is inadequate, the opening degree of the second usage-side flow rate adjustment valve 102a is likely to be greater than at least a predetermined opening degree, but by controlling the operating capacity of the heat-source-side fan 32 in accordance with the state of the second usage-side flow rate adjustment valve 102a, the heat-source-side refrigerant that is stagnated in the heat-source-side heat exchanger 24 can be directed to the second usage unit 10a to overcome the problem of an inadequate amount of refrigerant in the second usage unit 10a. In a case in which there is a large hot-water supply load in the first usage unit 4a, a state readily occurs in which the heat-source-side refrigerant stagnates in the first usage-side heat exchanger 41a, and the opening degree of the first usage-side flow rate adjustment valve 42a is likely to be greater than at least a predetermined opening degree, but by controlling the capacity of the circulation pump 43a in accordance with the state of the first usage-side flow rate adjustment valve 42a, the heat-source-side refrigerant can be made less prone to stagnate in the first usage-side heat exchanger 41a.

Consequently, the heat-source-side refrigerant can be prevented from stagnating in a specific heat exchanger among the heat exchangers which function as radiators. It is therefore possible to prevent the heat exchange efficiency from decreasing due to stagnation of the heat-source-side refrigerant in a specific heat exchanger.

—B—

The heat pump system 200 differs from the heat pump system 1 in the first embodiment in that the usage-side refrigerant circuit 40a is interposed between the heat-source-side refrigerant circuit 20 and the aqueous medium circuit 80a.

However, in the same manner as in the heat pump system 1 of the first embodiment, in the case of performing the air-cooling operation of the second usage unit 10a, by heating the aqueous medium even without utilizing heat via the aqueous medium (e.g., utilizing hot-water supply), it is possible to utilize waste heat that occurs on the radiator side during air-cooling operation by the second usage unit 10. However, in a case in which air-cooling operation by the second usage unit 10a is the main object, and waste heat recovery is performed which accompanies air-cooling operation by the second usage unit 10a to enhance the energy efficiency of aqueous-medium heating operation in the first usage unit 4a, in operating conditions in which the temperature of the aqueous medium is low, such as immediately after the start of air-cooling operation by the second usage unit 10a and operation by the first usage unit 4a, the hot-water supply load is often greater than the air-cooling load, due to the low temperature of the aqueous medium. When air-cooling operation by the second usage unit 10a is continued in accordance with the hot-water supply load at this time, an excessive amount of energy is required in relation to the air-cooling load, and efficiency is poor. Consequently, to prevent this situation, the hot-water supply load must be adapted to the air-cooling load pertaining to the second usage unit 10a.

In this heat pump system 200, subcooling-degree fixing control is performed for fixing the degree of subcooling of the heat-source-side refrigerant in the first usage-side heat exchanger 41a at a predetermined degree of subcooling by adjusting the opening degree of the first usage-side flow rate adjustment valve 42a. Consequently, the opening degree of the first usage-side flow rate adjustment valve 42a increases in the case that the hot-water supply load in the first usage unit 4a is larger than the air-cooling load in the second usage unit 10a.

Therefore, in this heat pump system 200, a variable-capacity circulation pump 43a is provided, and in a case in which the first usage-side flow rate adjustment valve 42a reaches an opening degree equal to or greater than a predetermined opening degree, the hot-water supply load in the first usage unit 4a is determined to be larger than the air-cooling load in the second usage unit 10a, and the capacity of the circulation pump 43a is controlled so that the flow rate of the aqueous medium circulated through the aqueous medium circuit 80a decreases.

The hot-water supply load in the first usage unit 4a can thereby be kept low, and the hot-water supply load in the first usage unit 4a can be made smaller than the air-cooling load in the second usage unit 10a. Consequently, it is possible to prevent the operating efficiency of waste heat recovery in the first usage unit 4a from decreasing while air-cooling operation is performed by the second usage unit 10a.

(1) Modification 1

Figure 8:
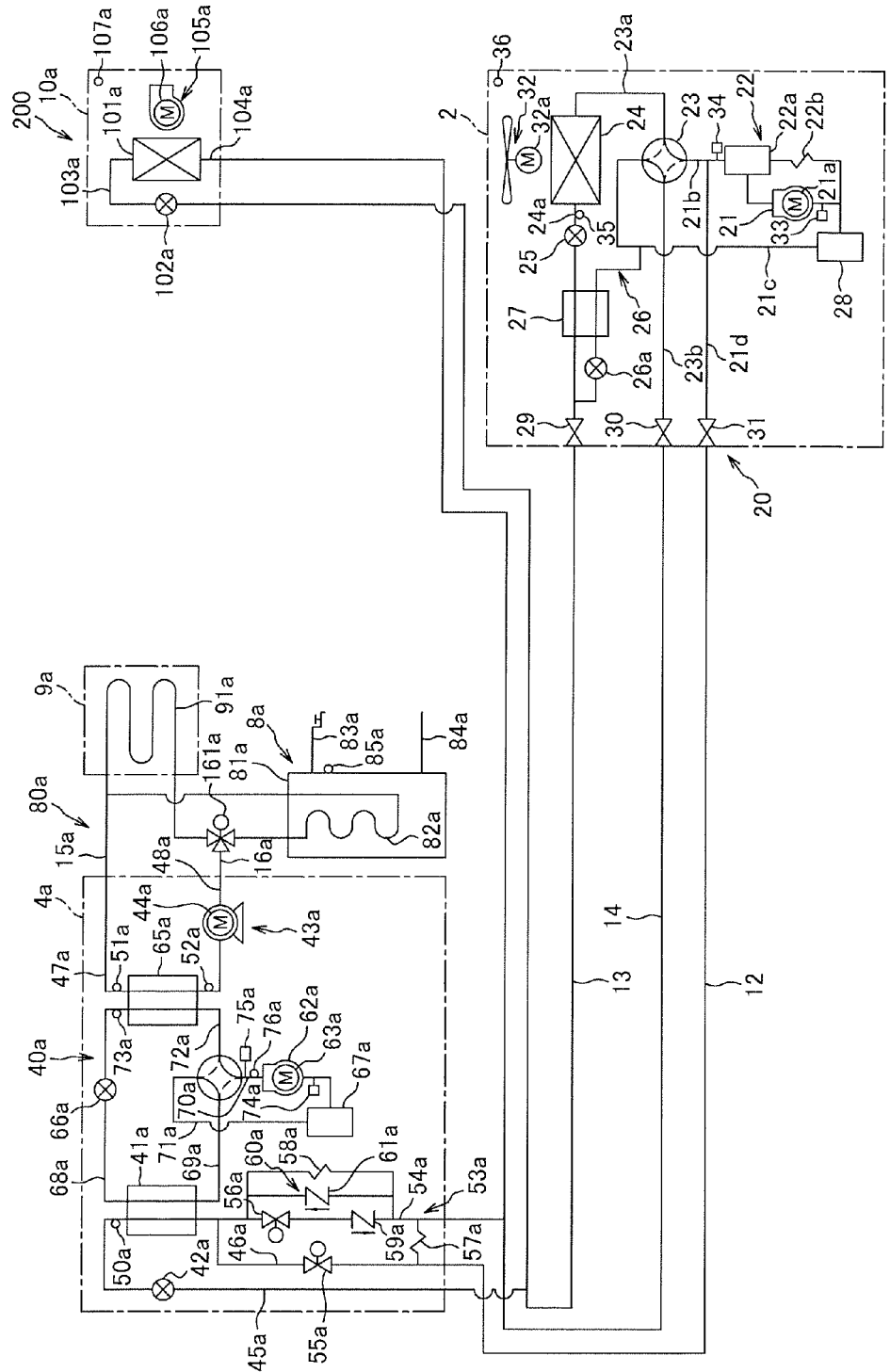
FIG. 8 is a view showing the general configuration of the heat pump system according to Modification 1 of the second embodiment.

In the heat pump system 200 (see FIG. 7) described above, as shown in FIG. 8, it is possible to furthermore provide the usage-side refrigerant circuit 40a with a second usage-side switching mechanism 64a capable of switching between a usage-side radiating operation state in which the refrigerant/water heat exchanger 65a is made to function as a radiator of the usage-side refrigerant and the first usage-side heat exchanger 41a is made to function as an evaporator of the usage-side refrigerant, and a usage-side evaporating operation state in which the refrigerant/water heat exchanger 65a is made to function as an evaporator of the usage-side refrigerant and the first usage-side heat exchanger 41a is made to function as a radiator of the usage-side refrigerant; and it is possible to further connect the first usage unit 4a to the gas-refrigerant communication tube 14 and to further provide a usage-side switching mechanism 53a capable of switching between an aqueous medium-heating operation state in which the first usage-side heat exchanger 41a is made to function as a radiator of the heat-source-side refrigerant introduced from the discharge refrigerant communication tube 12, and an aqueous medium-cooling operation state in which the first usage-side heat exchanger 41a is made to function as an evaporator of the heat-source-side refrigerant introduced from the liquid refrigerant communication tube 13.

Here, the second usage-side switching mechanism 64a is a four-way switching valve, and is connected to a cascade-side discharge tube 70a, a cascade-side intake tube 71a, a first cascade-side gas-refrigerant tube 72a, and a second cascade-side gas-refrigerant tube 69a. The second usage-side switching mechanism 64a is capable of switching between placing the cascade-side discharge tube 70a and the first cascade-side gas-refrigerant tube 72a in communication and the second cascade-side gas-refrigerant tube 69a and the cascade-side intake tube 71a in communication (corresponding to the usage-side radiating operation state; indicated by solid lines in the second usage-side switching mechanism 64a in FIG. 8), and placing the cascade-side discharge tube 70a and the second cascade-side gas-refrigerant tube 69a in communication and the first cascade-side gas-refrigerant tube 72a and the cascade-side intake tube 71a in communication (corresponding to the usage-side evaporating operation state; indicated by dashed lines in the second usage-side switching mechanism 64a in FIG. 8). The second usage-side switching mechanism 64a is not limited to being a four-way switching valve, but may also be, e.g., a configuration in which a plurality of solenoid valves is used in combination to achieve a function similar to that described above for switching the direction of flow of the usage-side refrigerant.

The first usage-side gas refrigerant tube 54a is connected together with the first usage-side discharge refrigerant tube 46a to the gas side of the channel through which the heat-source-side refrigerant of the first usage-side heat exchanger 41a flows. The gas-refrigerant communication tube 14 is connected to the first usage-side gas refrigerant tube 54a. The first usage-side switching mechanism 53a has a first usage-side discharge on-off valve 55a (in this case, the first usage-side discharge non-return valve 49a is omitted) provided to the first usage-side discharge refrigerant tube 46a, and a first usage-side gas on-off valve 56a provided to the first usage-side gas refrigerant tube 54a; and is used for setting an aqueous medium-heating operation state by opening the first usage-side discharge on-off valve 55a and closing the first usage-side gas on-off valve 56a, and setting an aqueous medium-cooling operation state by closing the first usage-side discharge on-off valve 55a and opening the first usage-side gas on-off valve 56a. The first usage-side discharge on-off valve 55a and the first usage-side gas on-off valve 56a are composed of solenoid valves, both being capable of on-off control. The first usage-side switching mechanism 53a may be configured using a three-way valve or the like.

The first usage-side switching mechanism 53a is also provided with a first refrigerant recovery mechanism 57a for placing the discharge refrigerant communication tube 12 and the gas refrigerant communication tube 14 in communication with each other in any of the aqueous medium heating operation state and the aqueous medium cooling operation state; and a second refrigerant recovery mechanism 58a for placing the first usage-side heat exchanger 41a and the gas refrigerant communication tube 14 in communication with each other. The first usage-side gas refrigerant tube 54a is also provided with a first usage-side gas non-return valve 59a and a first usage-side bypass refrigerant tube 60a, and the first usage-side discharge on-off valve 55a and the first usage-side gas on-off valve 56a together constitute the first usage-side switching mechanism 53a.

The first refrigerant recovery mechanism 57a is a refrigerant tube having a capillary tube, and is configured so that one end thereof is connected to a portion of the first usage-side discharge refrigerant tube 46a which connects the first usage-side discharge on-off valve 55a and the discharge refrigerant communication tube 12, and the other end is connected to a portion of the first usage-side gas refrigerant tube 54a which connects the first usage-side gas on-off valve 56a and the gas refrigerant communication tube 14, and the first refrigerant recovery mechanism 57a places the discharge refrigerant communication tube 12 and the gas refrigerant communication tube 14 in communication with each other regardless of the on/off state of the first usage-side discharge on-off valve 55a or the first usage-side gas on-off valve 56a. In this heat pump system 1, the heat-source-side refrigerant is thereby made less likely to stagnate in the discharge refrigerant communication tube 12, and it is therefore possible to minimize the occurrence of an insufficient refrigerant circulation rate in the heat-source-side refrigerant circuit 20.

The second refrigerant recovery mechanism 58a is a refrigerant tube having a capillary tube, and is configured so that one end thereof is connected to a portion of the first usage-side gas refrigerant tube 54a which connects the gas side of the first usage-side heat exchanger 41a and the first usage-side gas on-off valve 56a, and the other end is connected to a portion of the first usage-side gas refrigerant tube 54a which connects the first usage-side gas on-off valve 56a and the gas refrigerant communication tube 14, and even when operation of the first usage unit 4a is stopped, the gas side of the first usage-side heat exchanger 41a and the gas refrigerant communication tube 14 are communicated with each other, bypassing the first usage-side gas on-off valve 56a. In this heat pump system 1, the heat-source-side refrigerant is thereby made less likely to stagnate in the first usage-side heat exchanger 41a, and it is therefore possible to minimize the occurrence of an insufficient refrigerant circulation rate in the heat-source-side refrigerant circuit 20.

The first usage-side gas non-return valve 59a is provided to the portion of the first usage-side gas refrigerant tube 54a which connects the first usage-side gas on-off valve 56a and the gas refrigerant communication tube 14. The first usage-side gas non-return valve 59a is a non-return valve for allowing the heat-source-side refrigerant to flow from the first usage-side heat exchanger 41a to the gas refrigerant communication tube 14 and preventing the heat-source-side refrigerant from flowing from the gas refrigerant communication tube 14 to the first usage-side heat exchanger 41a, and the heat-source-side refrigerant is thereby prevented from flowing from the gas refrigerant communication tube 14 to the first usage-side heat exchanger 41a through the first usage-side gas on-off valve 56a.

The first usage-side bypass refrigerant tube 60a is connected to the first usage-side gas refrigerant tube 54a so as to bypass the first usage-side gas on-off valve 56a and the first usage-side gas non-return valve 59a, and constitutes a portion of the first usage-side gas refrigerant tube 54a. The first usage-side bypass refrigerant tube 60a is provided with the first usage-side bypass non-return valve 61a for allowing the heat-source-side refrigerant to flow from the gas refrigerant communication tube 14 to the first usage-side heat exchanger 41a and preventing the heat-source-side refrigerant from flowing from the first usage-side heat exchanger 41a to the gas refrigerant communication tube 14, and the heat-source-side refrigerant is thereby allowed to flow from the gas refrigerant communication tube 14 to the first usage-side heat exchanger 41a through the first usage-side bypass refrigerant tube 60a. High-pressure heat-source-side refrigerant can thereby be sent to the first usage unit 4a not only from the discharge refrigerant communication tube 12 but also from the gas refrigerant communication tube 14 in the hot-water supply operation mode and the hot-water supply/air-warming operation mode in the heat pump system 1. Therefore, loss of pressure of the heat-source-side refrigerant fed from the heat source unit 2 to the first usage unit 4a is reduced, which can contribute to enhancing the hot-water supply capacity and/or operation efficiency.

(2) Modification 2

Figure 9:
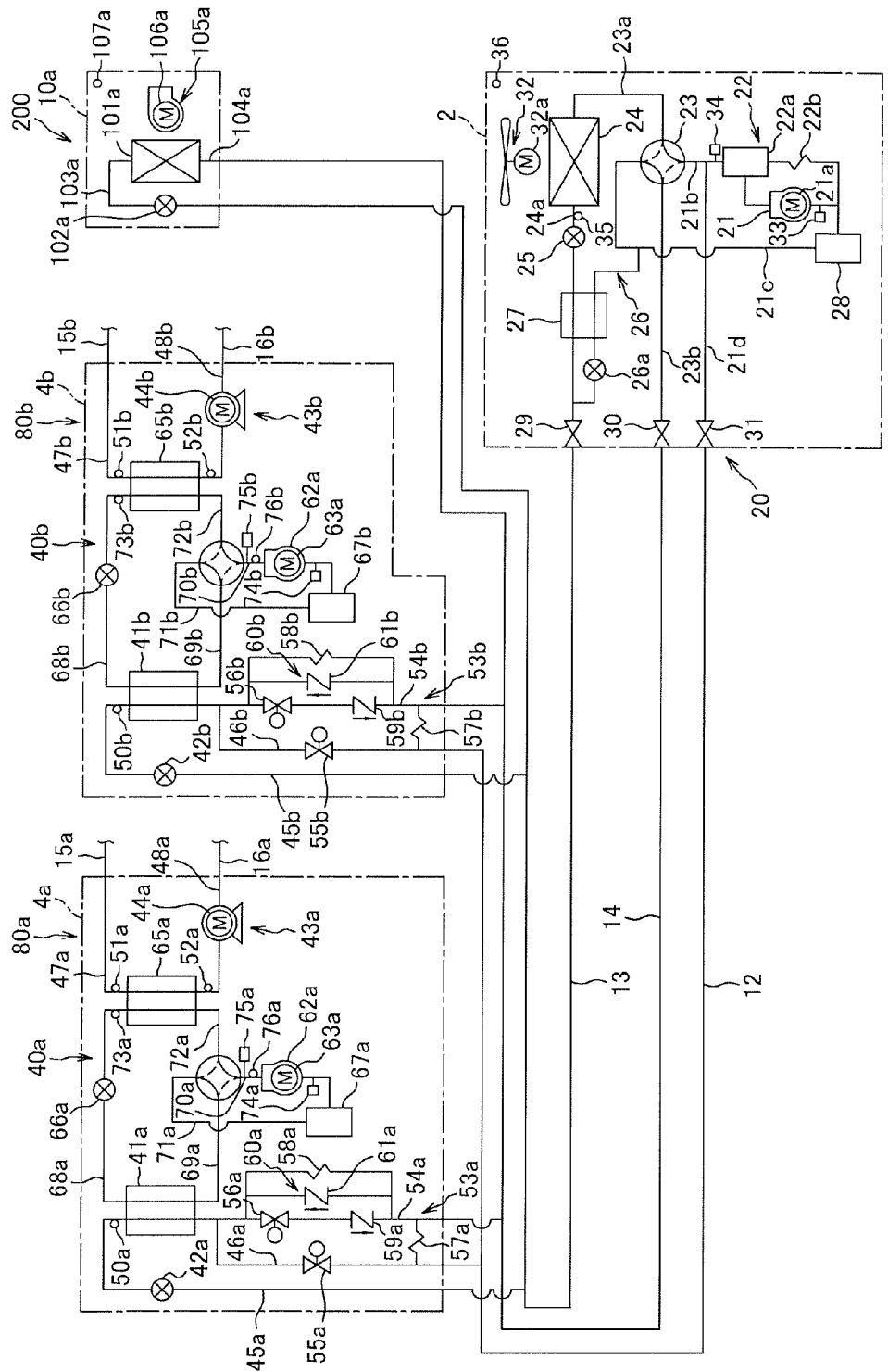
FIG. 9 is a view showing the general configuration of the heat pump system according to Modification 2 of the second embodiment.
Figure 10:
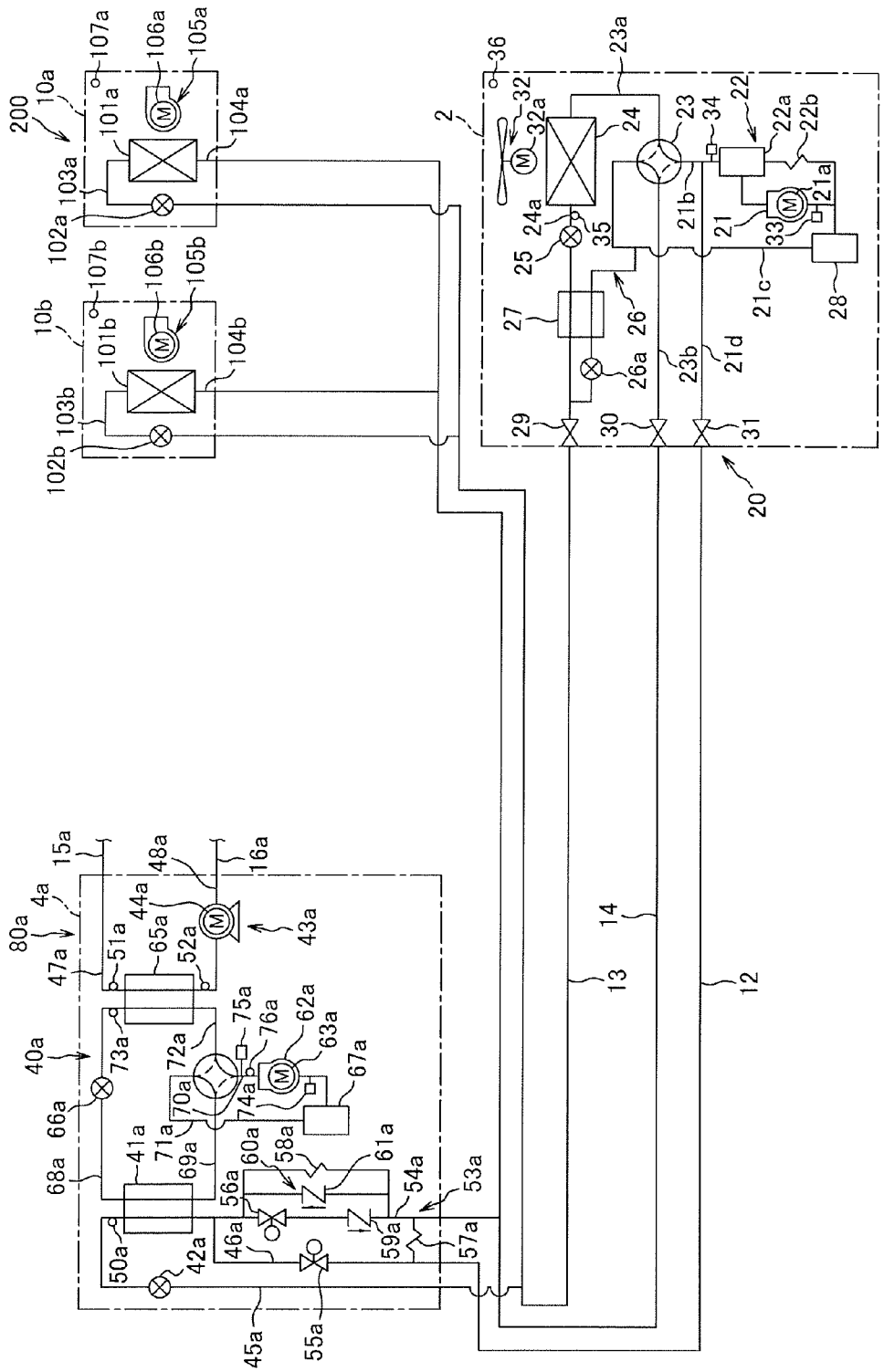
FIG. 10 is a view showing the general configuration of the heat pump system according to Modification 2 of the second embodiment.
Figure 11:
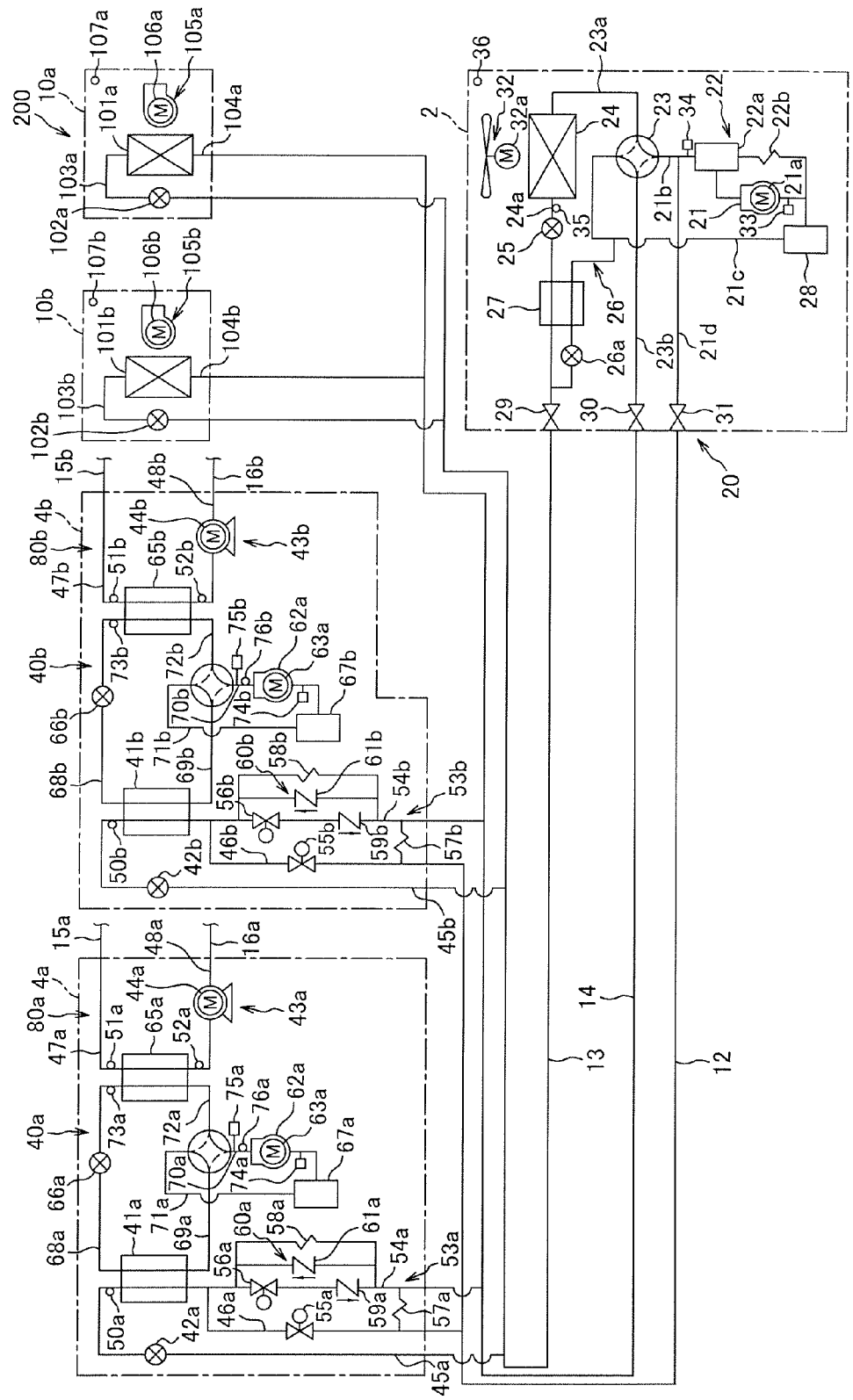
FIG. 11 is a view showing the general configuration of the heat pump system according to Modification 2 of the second embodiment.

In the heat pump systems 200 described above (see FIG. 8), a single first usage unit 4a and a single second usage unit 10a are connected to the heat source unit 2 via the refrigerant communication tubes 12, 13, 14, but a plurality of first usage units 4a, 4b (two, in this case) may be connected in parallel to each other via the refrigerant communication tubes 12, 13, 14, and/or a plurality of second usage units 10a, 10b (two, in this case) may be connected in parallel to each other via the refrigerant communication tubes 12, 14, as shown in FIGS. 9 to 11 (in this case, the hot-water/air-warming unit, the hot-water storage unit, the aqueous medium circuits 80a, 80b, and the like are not shown), in the same manner as in Modification 2 of the first embodiment (see FIGS. 3 through 5). The configuration of the first usage unit 4b is the same as the configuration of the first usage unit 4a with the subscript "b" used in place of the subscript "a" of the reference numerals indicating each part of the first usage unit 4a, and a description of each part of the first usage unit 4b is therefore omitted. Also, the configuration of the second usage unit 10b is the same as the configuration of the second usage unit 10a with the subscript "b" used in place of the subscript "a" of the reference numerals indicating each part of the second usage unit 10a, and a description of each part of the second usage unit 10b is therefore omitted.

In these heat pump systems 200, it is thereby possible to accommodate a plurality of locations and/or applications that require heating of the aqueous medium, and it is possible to accommodate a plurality of locations and/or applications that require cooling of the air medium.

(3) Modification 3

Figure 12:
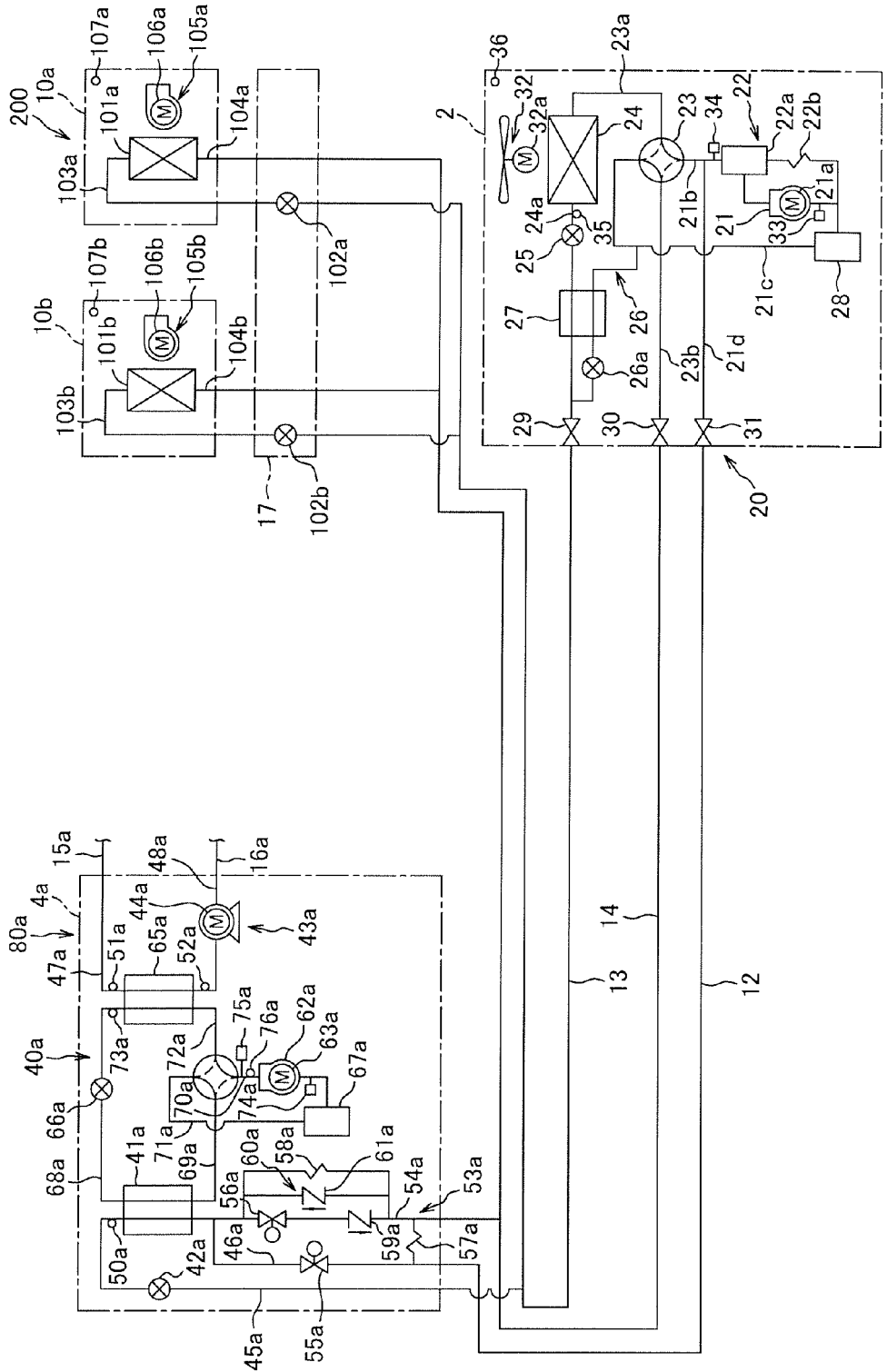
FIG. 12 is a view showing the general configuration of the heat pump system according to Modification 3 of the second embodiment.

In the heat pump systems 200 described above (see FIGS. 8 through 11), the second usage-side flow rate adjustment valves 102a, 102b are provided inside the second usage units 10a, 10b, but it is possible to omit the second usage-side flow rate adjustment valves 102a, 102b from the second usage units 10a, 10b and to provide an expansion valve unit 17 having the second usage-side flow rate adjustment valves 102a, 102b, as shown in FIG. 12 (in this case, the hot-water/air-warming unit, the hot-water storage unit, the aqueous medium circuits 80a, and the like are not shown).

Other Embodiments

Embodiments of the present invention and modifications thereof were described above with reference to the drawings, but specific configurations are not limited to these embodiments and modifications thereof, and it is possible to make modifications within a range that does not depart from the spirit of the invention.

<A>

In the heat pump system 1 of the first embodiment and modifications thereof, the gas-refrigerant communication tube 14 may be used as a refrigerant tube in which low-pressure, heat-source-side refrigerant flows in the refrigeration cycle by, e.g., placing the second heat-source-side gas refrigerant tube 23b and the heat-source-side intake tube 21c in communication, whereby the second usage-side heat exchangers 101a, 101b are made to function only as evaporators of the heat-source-side refrigerant, and the second usage units 10a, 10b are used as cooling-dedicated usage units. In this case as well, operation in the hot-water supply/air-cooling operation mode is possible and energy savings can be ensured.

<B>

In the heat pump system 200 of the second embodiment and modifications thereof, the gas-refrigerant communication tube 14 may be used as a refrigerant tube in which low-pressure, heat-source-side refrigerant flows in the refrigeration cycle by, e.g., placing the second heat-source-side gas refrigerant tube 23b and the heat-source-side intake tube 21c in communication, whereby the second usage-side heat exchangers 101a, 101b are made to function only as evaporators of the heat-source-side refrigerant, and the second usage units 10a, 10b are used as cooling-dedicated usage units. In this case as well, operation in the hot-water supply/air-cooling operation mode is possible and energy savings can be ensured.

<C>

In the heat pump systems 1, 200 of the first and second embodiments and modifications thereof, the second usage units 10a, 10b may be used for refrigeration and/or freezing, and purposes other than air cooling and air warming, rather than as usage units used for indoor air cooling and air warming.

<D>

In the heat pump system 200 of the second embodiment and modifications thereof, HFC-134a is used as the usage-side refrigerant, but no limitation is imposed thereby, and it is also possible to use, e.g., HFO-1234yf (2,3,3,3-tetrafluoro-1-propene) or another refrigerant in which the pressure that corresponds to a saturated gas temperature of 65° C. is a maximum gauge pressure of 2.8 MPa or less, preferably 2.0 MPa or less.

INDUSTRIAL APPLICABILITY

The use of the present invention makes it possible to obtain energy-saving effects in a heat pump system capable of heating an aqueous medium by utilizing a heat pump cycle.

What is claimed is:

1. A heat pump system comprising:
a heat source unit having
a heat-source-side compressor arranged to compress a heat-source-side refrigerant;
a heat-source-side heat exchanger;
a variable-capacity heat-source-side blower configured to adjust heat exchange efficiency of said heat-source-side heat exchanger; and
a heat-source-side switching mechanism switchable between
a heat-source-side radiating operation state in which said heat-source-side heat exchanger functions as a radiator of the heat-source-side refrigerant, and
a heat-source-side evaporating operation state in which said heat-source-side heat exchanger functions as an evaporator of the heat-source-side refrigerant;
a first usage unit having
a first usage-side heat exchanger operable as a radiator of the heat-source-side refrigerant compressed by said heat-source-side compressor,
a radiation amount adjusting element configured to adjust an amount of radiation in an aqueous medium by radiation of the heat-source-side refrigerant in said first usage-side heat exchanger, and
a first usage-side flow rate adjustment valve configured to adjust a flow rate of the heat-source-side refrigerant that flows through said first usage-side heat exchanger, the first usage unit being operable to perform an aqueous medium heating operation in which the aqueous medium is heated by radiation of the heat-source-side refrigerant in said first usage-side heat exchanger; and
a second usage unit having
a second usage-side heat exchanger operable at least as an evaporator of the heat-source-side refrigerant in said heat-source-side radiating operation state of said heat-source-side switching mechanism, and
a second usage-side flow rate adjustment valve configured to adjust a flow rate of the heat-source-side refrigerant that flows through said second usage-side heat exchanger, the second usage unit being operable to perform an air-cooling operation in which an air medium is cooled by evaporation of the heat-source-side refrigerant in said second usage-side heat exchanger,
the amount of radiation adjusted by said radiation amount adjusting element or operating capacity of said heat-source-side blower being controlled in accordance with a state of said first usage-side flow rate adjustment valve and said second usage-side flow rate adjustment valve in a case in which said second usage unit performs said air-cooling operation and said first usage unit performs said aqueous medium heating operation.

2. The heat pump system according to claim 1, wherein
a superheat-degree fixing control is performed in which a degree of superheat of said heat-source-side refrigerant in said second usage-side heat exchanger is fixed at a predetermined degree of superheat by adjusting an opening degree of said second usage-side flow rate adjustment valve; and
a control is performed in which the airflow rate of said heat-source-side blower is decreased in a case in which said second usage-side flow rate adjustment valve reaches an opening degree equal to or greater than a predetermined opening degree.

3. The heat pump system according to claim 2, wherein
said first usage-side heat exchanger is configured to exchange heat between the heat-source-side refrigerant and the aqueous medium.

4. The heat pump system according to claim 3, further comprising:
an aqueous medium circuit configured to circulate an aqueous medium to exchange heat with the heat-source-side refrigerant in said first usage-side heat exchanger,
said radiation amount adjusting element being a variable-capacity circulation pump,
a subcooling-degree fixing control being performed in which a degree of subcooling of said heat-source-side refrigerant in said first usage-side heat exchanger is fixed at a predetermined degree of subcooling by adjusting an opening degree of said first usage-side flow rate adjustment valve, and
a capacity of said circulation pump being controlled so that a flow rate of the aqueous medium circulated through said aqueous medium circuit decreases in a case in which said first usage-side flow rate adjustment valve reaches an opening degree equal to or greater than a predetermined opening degree.

5. The heat pump system according to claim 2, wherein said first usage-side heat exchanger is configured to exchange heat between the heat-source-side refrigerant and a usage-side refrigerant which is other than the heat-source-side refrigerant; and
said first usage unit further includes
a usage-side compressor arranged to compress the usage-side refrigerant, and
a refrigerant/water heat exchanger operable as a radiator of the usage-side refrigerant to heat the aqueous medium,
said first usage unit together with said first usage-side heat exchanger forming parts of a usage-side refrigerant circuit configured to circulate the usage-side refrigerant.

6. The heat pump system according to claim 5, further comprising:
an aqueous medium circuit configured to circulate an aqueous medium to exchange heat with the usage-side refrigerant in said refrigerant/water heat exchanger, the aqueous medium circuit having said radiation amount adjusting element, which is a variable-capacity circulation pump,
a subcooling-degree fixing control being performed in which a degree of subcooling of said heat-source-side refrigerant in said first usage-side heat exchanger is fixed at a predetermined degree of subcooling by adjusting an opening degree of said first usage-side flow rate adjustment valve, and
a capacity of said circulation pump being controlled so that a flow rate of the aqueous medium circulated through said aqueous medium circuit decreases in a case in which said first usage-side flow rate adjustment valve reaches an opening degree equal to or greater than a predetermined opening degree.

7. The heat pump system according to claim 2, further comprising:
a discharge refrigerant communication tube capable of directing the heat-source-side refrigerant outside of said heat source unit from a discharge of said heat-source-side compressor in any of said heat-source-side radiating operation state and said heat-source-side evaporating operation state of said heat-source-side switching mechanism;
a liquid refrigerant communication tube capable of
directing the heat-source-side refrigerant outside of said heat source unit from an outlet of said heat-source-side heat exchanger functioning as a radiator of the heat-source-side refrigerant in said heat-source-side radiating operation state of said heat-source-side switching mechanism, and
introducing the heat-source-side refrigerant into an inlet of said heat-source-side heat exchanger functioning as an evaporator of the heat-source-side refrigerant from outside said heat source unit in said heat-source-side evaporating operation state of said heat-source-side switching mechanism; and
a gas refrigerant communication tube capable of introducing the heat-source-side refrigerant into an intake of said heat-source-side compressor from outside said heat source unit.

8. The heat pump system according to claim 1, wherein said first usage-side heat exchanger is configured to exchange heat between the heat-source-side refrigerant and the aqueous medium.

9. The heat pump system according to claim 8, further comprising:
an aqueous medium circuit configured to circulate an aqueous medium to exchange heat with the heat-source-side refrigerant in said first usage-side heat exchanger,
said radiation amount adjusting element being a variable-capacity circulation pump,
a subcooling-degree fixing control being performed in which a degree of subcooling of said heat-source-side refrigerant in said first usage-side heat exchanger is fixed at a predetermined degree of subcooling by adjusting an opening degree of said first usage-side flow rate adjustment valve, and
a capacity of said circulation pump being controlled so that a flow rate of the aqueous medium circulated through said aqueous medium circuit decreases in a case in which said first usage-side flow rate adjustment valve reaches an opening degree equal to or greater than a predetermined opening degree.

10. The heat pump system according to claim 9, further comprising:
a discharge refrigerant communication tube capable of directing the heat-source-side refrigerant outside of said heat source unit from a discharge of said heat-source-side compressor in any of said heat-source-side radiating operation state and said heat-source-side evaporating operation state of said heat-source-side switching mechanism;
a liquid refrigerant communication tube capable of
directing the heat-source-side refrigerant outside of said heat source unit from an outlet of said heat-source-side heat exchanger functioning as a radiator of the heat-source-side refrigerant in said heat-source-side radiating operation state of said heat-source-side switching mechanism, and
introducing the heat-source-side refrigerant into an inlet of said heat-source-side heat exchanger functioning as an evaporator of the heat-source-side refrigerant from outside said heat source unit in said heat-source-side evaporating operation state of said heat-source-side switching mechanism; and
a gas refrigerant communication tube capable of introducing the heat-source-side refrigerant into an intake of said heat-source-side compressor from outside said heat source unit.

11. The heat pump system according to claim 8, further comprising:
a discharge refrigerant communication tube capable of directing the heat-source-side refrigerant outside of said heat source unit from a discharge of said heat-source-side compressor in any of said heat-source-side radiating operation state and said heat-source-side evaporating operation state of said heat-source-side switching mechanism;
a liquid refrigerant communication tube capable of
directing the heat-source-side refrigerant outside of said heat source unit from an outlet of said heat-source-side heat exchanger functioning as a radiator of the heat-source-side refrigerant in said heat-source-side radiating operation state of said heat-source-side switching mechanism, and
introducing the heat-source-side refrigerant into an inlet of said heat-source-side heat exchanger functioning as an evaporator of the heat-source-side refrigerant from outside said heat source unit in said heat-source-side evaporating operation state of said heat-source-side switching mechanism; and a gas refrigerant communication tube capable of introducing the heat-source-side refrigerant into an intake of said heat-source-side compressor from outside said heat source unit.

12. The heat pump system according to claim 1, wherein
said first usage-side heat exchanger is configured to exchange heat between the heat-source-side refrigerant and a usage-side refrigerant which is other than the heat-source-side refrigerant; and
said first usage unit further includes
  a usage-side compressor arranged to compress the usage-side refrigerant, and
  a refrigerant/water heat exchanger operable as a radiator of the usage-side refrigerant to heat the aqueous medium,
  said first usage unit together with said first usage-side heat exchanger forming parts of a usage-side refrigerant circuit configured to circulate the usage-side refrigerant.

13. The heat pump system according to claim 12, further comprising:
an aqueous medium circuit configured to circulate an aqueous medium to exchange heat with the usage-side refrigerant in said refrigerant/water heat exchanger, the aqueous medium circuit having said radiation amount adjusting element, which is a variable-capacity circulation pump,
a subcooling-degree fixing control being performed in which a degree of subcooling of said heat-source-side refrigerant in said first usage-side heat exchanger is fixed at a predetermined degree of subcooling by adjusting an opening degree of said first usage-side flow rate adjustment valve, and
a capacity of said circulation pump being controlled so that a flow rate of the aqueous medium circulated through said aqueous medium circuit decreases in a case in which said first usage-side flow rate adjustment valve reaches an opening degree equal to or greater than a predetermined opening degree.

14. The heat pump system according to claim 13, further comprising:
a discharge refrigerant communication tube capable of directing the heat-source-side refrigerant outside of said heat source unit from a discharge of said heat-source-side compressor in any of said heat-source-side radiating operation state and said heat-source-side evaporating operation state of said heat-source-side switching mechanism;
a liquid refrigerant communication tube capable of
  directing the heat-source-side refrigerant outside of said heat source unit from an outlet of said heat-source-side heat exchanger functioning as a radiator of the heat-source-side refrigerant in said heat-source-side radiating operation state of said heat-source-side switching mechanism, and
  introducing the heat-source-side refrigerant into an inlet of said heat-source-side heat exchanger functioning as an evaporator of the heat-source-side refrigerant from outside said heat source unit in said heat-source-side evaporating operation state of said heat-source-side switching mechanism; and
a gas refrigerant communication tube capable of introducing the heat-source-side refrigerant into an intake of said heat-source-side compressor from outside said heat source unit.

15. The heat pump system according to claim 12, further comprising:
a discharge refrigerant communication tube capable of directing the heat-source-side refrigerant outside of said heat source unit from a discharge of said heat-source-side compressor in any of said heat-source-side radiating operation state and said heat-source-side evaporating operation state of said heat-source-side switching mechanism;
a liquid refrigerant communication tube capable of
  directing the heat-source-side refrigerant outside of said heat source unit from an outlet of said heat-source-side heat exchanger functioning as a radiator of the heat-source-side refrigerant in said heat-source-side radiating operation state of said heat-source-side switching mechanism, and
  introducing the heat-source-side refrigerant into an inlet of said heat-source-side heat exchanger functioning as an evaporator of the heat-source-side refrigerant from outside said heat source unit in said heat-source-side evaporating operation state of said heat-source-side switching mechanism; and
a gas refrigerant communication tube capable of introducing the heat-source-side refrigerant into an intake of said heat-source-side compressor from outside said heat source unit.

16. The heat pump system according to claim 1, further comprising:
a discharge refrigerant communication tube capable of directing the heat-source-side refrigerant outside of said heat source unit from a discharge of said heat-source-side compressor in any of said heat-source-side radiating operation state and said heat-source-side evaporating operation state of said heat-source-side switching mechanism;
a liquid refrigerant communication tube capable of
  directing the heat-source-side refrigerant outside of said heat source unit from an outlet of said heat-source-side heat exchanger functioning as a radiator of the heat-source-side refrigerant in said heat-source-side radiating operation state of said heat-source-side switching mechanism, and
  introducing the heat-source-side refrigerant into an inlet of said heat-source-side heat exchanger functioning as an evaporator of the heat-source-side refrigerant from outside said heat source unit in said heat-source-side evaporating operation state of said heat-source-side switching mechanism; and
a gas refrigerant communication tube capable of introducing the heat-source-side refrigerant into an intake of said heat-source-side compressor from outside said heat source unit.

\* \* \* \* \*